(12) United States Patent
Damha et al.

(10) Patent No.: US 12,492,220 B2
(45) Date of Patent: Dec. 9, 2025

(54) METHOD FOR THE PREPARATION OF OLIGONUCLEOTIDES

(71) Applicant: THE ROYAL INSTITUTION FOR THE ADVANCEMENT OF LEARNING/MCGILL UNIVERSITY, Montreal (CA)

(72) Inventors: Masad Damha, Montreal (CA); Tomislav Friscic, Verdun (CA); Daniel O'Reilly, Hants (GB); James Thorpe, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 192 days.

(21) Appl. No.: 17/433,460

(22) PCT Filed: May 26, 2021

(86) PCT No.: PCT/CA2021/050714
§ 371 (c)(1),
(2) Date: Aug. 24, 2021

(87) PCT Pub. No.: WO2021/243443
PCT Pub. Date: Dec. 9, 2021

(65) Prior Publication Data
US 2023/0192751 A1   Jun. 22, 2023

Related U.S. Application Data

(60) Provisional application No. 63/033,252, filed on Jun. 2, 2020.

(51) Int. Cl.
C07H 21/00   (2006.01)
C07H 1/00   (2006.01)

(52) U.S. Cl.
CPC ............ *C07H 21/00* (2013.01); *C07H 1/00* (2013.01)

(58) Field of Classification Search
CPC . C07H 21/00; C07H 1/00; C07H 1/02; C07H 21/04
USPC .............................. 536/25.3, 25.31
See application file for complete search history.

(56) References Cited

FOREIGN PATENT DOCUMENTS

CN   1262557 C   * 7/2006   ............. C07H 21/00

OTHER PUBLICATIONS

Wei, Tetrahedron, 2013, 69, 3615-3637.*
Eguaogie et al, Beilstein Journal of Organic Chemistry, Apr. 2018, 955-970.*
Adamo et al, Eur J Org Chem, 2006, 436-448.*
Roy et al, Molecules, 2013, 18, 14268-14284.*
Beaucage et al , Tetrahedron, 1993, 49(28), 6123-6194.*
Thorpe et al, Chem. Eur. J. 2020, 26, 8857-8861.*
Wei, Tetrahedron, 2013, 69, 3615-36370.*
International Searching Authority, International Search Report and Written Opinion regarding International patent application No. PCT/CA2021/050714, Jul. 20, 2021, Quebec, Canada.
James D. Thorpe, et al.: Mechanochemical Synthesis of Short DNA Fragments; Chem. Eur. J. 2020, vol. 26, pp. 8857-8861.
Rightmire, Nicholas et al: Advances in organometallic synthesis with mechanochemical methods; Dalton Transactions.. 2016, vol. 45, pp. 2352-2362.
Eguaogie, Olga et al: Mechanochemistry of nucleosides, nucleotides and related materials; Beilstein Journal of Organic Chemistry; 2018, vol. 14, pp. 955-970.
Johnston, Christopher et al: Applications of Mechanochemistry for the Synthesis of DNA on Ionic Liquid Supports; Chemistry—Methods 2021, vol. 1, 1-8.
Johnston, C. et al: Investigations into the synthesis of a nucleotide dimer via mechanochemical phosphoramidite chemistry; Royal Society Open Science; vol. 8; pp. 1-10.

* cited by examiner

*Primary Examiner* — Ganapathy Krishnan
(74) *Attorney, Agent, or Firm* — Norton Rose Fulbright Canada LLP

(57) ABSTRACT

There is provided herein, processes for synthesizing oligonucleotides using mechanochemical force to induce the formation of internucleotide linkages.

20 Claims, 32 Drawing Sheets

METHOD FOR THE PREPARATION OF OLIGONUCLEOTIDES

CROSS-REFERENCE TO RELATED APPLICATIONS

This application is a 35 U.S.C. 371 national stage application of International Application No. PCT/CA2021/050714 filed on May 26, 2021, claiming priority to U.S. Patent Application No. 63/033,252 filed on Jun. 2, 2020.

FIELD OF THE INVENTION

The invention relates to the chemical synthesis of oligonucleotides. The method applies mechanochemical methods to induce the formation of internucleotide linkages.

BACKGROUND OF THE INVENTION

The demand for synthetic oligonucleotides has grown exponentially as genome editing (CRISPR-Cas), gene silencing (RNAi, antisense), and gene sequencing technologies. Recently, several oligonucleotide-based drugs have recently received regulatory approval for treating a range of important genetic diseases [Shen, X. and Corey, D. R. *Nucleic Acids Res.* 46, pp. 1584-1600 (201)]. However, current methods of synthesis are challenged by problems of cost, scale, and environmental impact associated with extensive use of solvents that subsequently become chemical waste. The present invention method utilizes milling or grinding technology for the chemical synthesis of short DNA fragments, opening a path to eliminate or significantly reduce solvent consumption, thus significantly reducing the negative environmental impact. The method has the potential of a rapid, low-energy and efficient synthesis of di-, tri, and tetranucleotide building blocks and their immediate implementation in the synthesis of oligonucleotides, including chemically modified oligonucleotides currently in clinical development.

Current methods for DNA and RNA synthesis rely on stepwise addition of monomeric phosphoramidite units on solid supports [Caruthers, M. H. et al. *Methods in Enzymology* 154, pp. 287-313 (1987); Alvarado-Urbina, G. et al. *Science* 214, pp. 270-274 (1981)](FIG. 1). Chain elongation from 3'- to 5'-end is preferred, which is achieved by coupling of a nucleoside unit having 3'-phosphorus (III) group (in its activated form) to a free 5'-hydroxyl group of another nucleoside unit. As solid support, 500 to 1000 Å Controlled pore glass (CPG) su port or organic polymer support, such as primer polystyrene support PS200, can be used.

Chain elongation begins by cleavage of the 5'-O-dimethoxytrityl group an organic acid, thus liberating a nucleophilic 5'-hydroxyl group. This terminal nucleophile is then allowed to couple to a protected nucleoside 3'-O-phosphoramidite monomer in the presence of an activator. In the case of RNA synthesis suitable protection of the 2'-hydroxyl group is required. Any unreacted 5'-hydroxyl groups are acetylated in a process referred to as 'capping'. The most commonly used group used for this purpose is an acetyl ester. Thus, 'capping' with acetic anhydride esterifies any unreacted 5'-hydroxyl groups and halts the accumulation of by-products. The newly created phosphite triester 3',5'-linkage is then oxidized to provide the desired and more stable phosphate triester. This process is repeated until an oligomer of the desired length and sequence is obtained. Cleavage of the oligomer from the solid support and removal of the protecting groups from the sugars, phosphates and nucleobases provides the desired target oligomer, which is then separated from shorter failure sequences by ion exchange high pressure liquid chromatography (HPLC), ion-pair reverse phase HPLC, or polyacrylamide gel electrophoresis (PAGE). The full-length oligomer is then characterized by mass spectrometry. Meanwhile a large number of DNA oligomers can be synthesized in parallel on DNA microarrays or "gene chips" [Ramsay G., *Nature Biotechnology* 16, pp. 40-44 (1998)].

The same iterative method may be applied toward the synthesis of DNA and RNA oligonucleotides in solution, for example as described recently by Donga et al. using ionic soluble supports [e.g., Donga, R. A. et al., *J. Org. Chem.* 71, pp. 7907-7910 (2006); Donga, R. A. et al., *Can. J. Chem.* 85, pp. 274-282 (2007); Chan et al., US Patent US2019/0055276A1]. The use of ionic soluble supports allows for selective precipitations of the growing oligonucleotide over all other reagents used in the oligonucleotide synthesis cycle.

Different chemistries for assembly of the oligonucleotide chain have been described [*Nucleic acids in chemistry and biology* (Edited by C. Michael Blackburn and Michael J. Gait); Oxford and New York: Oxford University Press, 1996], e.g., the phosphoramidite method (as described above), the H-phosphonate method [Stawinski, J. and Ströberg, R., Di- and oligonucleotide synthesis using H-phosphonate chemistry. In *Oligonucleotide Synthesis*, Springer: 2005; pp 81-100], the phosphotriester method, and the phosphodiester methods. While in the phosphotriester and phosphodiester methods the reactive phosphorus group is in the oxidation state +V, more reactive phosphorus +III derivatives are used in the coupling reactions according to the phosphoramidite and H-phosphonate approaches. Both the phosphoramidite and the H-phosphonate methods require oxidation of P(III) to P(V) to yield the stable P(V) derivatives; however, in the H-phosphonate approach the oxidation step may be performed either after every cycle, or more conveniently, after the entire olignucleotide chain has been assembled (FIG. 2).

An alternative approach to assemble oligonucleotide chains more rapidly is through "block" condensation reactions, as exemplified by the early work of Khorana et al. in the synthesis of a gene fragment through phosphodiester intermediates [Kossel, H. et al., *J. Am. Chem. Soc.* 89, pp. 2185 (1967); Ohtsuka E. and Khorana, H. G. *J. Am. Chem. Soc.* 89, pp. 2195 (1967)]. This work culminated in the total synthesis of the structural gene for an alanine transfer ribonucleic acid from yeast [Khorana, G. B. et al. *J. Mol. Biol.* 72, pp. 209-217 (1972)]. Short oligonucleotide fragments were made in solution, purified and then connected by specific annealing and ligated enzymatically to generate longer duplexes and the alanine tRNA gene sequence. Their initial approach involved successive condensations in solution between "blocks" of protected di-, tri-, and tetranucleotides (bearing a 5'-phosphate monoester) and the 3'-hydroxyl end of the growing fully-protected oligonucleotide chain. At each step, the products were separated by anion exchange chromatography and then verified for purity by paper chromatography after removal of the protecting groups. The yields decreased as the chain lengths increased even when large excess of "blocks" was used. Nevertheless, this approach demonstrated two advantages of block coupling over monomer coupling: block couplings reduce the number of synthetic steps and yield more appreciable differences between the starting and the product oligonucleotide chain. For example, the length and overall net charge of the sugar-phosphate backbone are the most important characteristics in the separation of the desired full-length DNA sequence.

The principal driver of research into the synthesis of DNA blocks in recent years has been the prospect of oligonucleotides as therapeutic agents. Reese and Yan demonstrated, in their synthesis of Vitravene, that block condensation of trimer units in solution using a modified H-phosphonate method was an achievable goal [Reese, C. B. and Yan, H. *Journal of the Chemical Society, Perkin Transactions 1: Organic and Bio-Organic Chemistry* pp. 2619-33 (2002)].

In all cases the synthesis of oligoribonucleotides is an elaborate multistep process, which entails assembly of the oligonucleotide chain typically from monomeric phosphoramidite or H-phosphonate building blocks (e.g., 5'-O-dimethoxytrityl-N-protected-nucleoside-3'-O-phosphoramidites or 3'-O-phosphonates), deprotection of the base, phosphate, and 2'-hydroxyl protecting groups.

The generation of oligoribonucleotide blocks is more difficult due to the presence of the 2'-hydroxyl group and the protection it requires, thus this line of research has also lagged far behind that of DNA blocks. Nevertheless, there have been several reports describing the synthesis of RNA through block coupling condensation reactions. Ikehara and co-workers coupled RNA trimer and tetramers using the phosphotriester method to give 30% yield after several days [Ohtsuka, E. et al. *J. Am. Chem. Soc.* 100, pp. 8210 (1978)]. Werstiuk and Nielson reported the coupling of an RNA tetramer and an RNA pentamer affording the desired mononucleotide RNA sequence in 50% yield after 16 days [Werstiuk, E. S., Neilson, T. Can. *J. Chem.* 54, pp. 2689 (1976)]. Van Boom and co-workers condensed an RNA tetramer and an RNA decamer in 58% yield in a 3.5 days reaction [van Boom, J. H. et al. *Trav. Chim. Pays-Bas*, 97, pp. 73 (1978)]. Ogilvie and co-workers described the synthesis of 5'-O-monomethoxytrityl-2'-O-tert-butyldimethylsilyl-3'-O-levulinyl ribonucleoside monomers and their use in the assembly of a hexadecauridylic acid via the phosphodichloridite procedure [Nemer, M. J, and Ogilvie, K. K., *Can. J. Chem.* 58, pp. 1389-1397 (1980)]. More recently, Damha and co-workers introduced RNA dimer and trimer phosphoramidites as building blocks for the assembly of oligoribonucleotides on solid supports [Hassler, M. et al. *Tetrahedron Letters* 52, p. 2575-2578 (2011); Damha, M. J. et al., US Patent US2019/0062355A1].

Solid-phase oligonucleotide synthesis is carried out almost exclusively using monomeric phosphoramidite synthons, and for some applications, monomeric H-phosphonate synthons. Current methods consume several liters of solvent for every gram of nucleic acid-based drug made on solid supports. Given the efficiency of the phosphoramidite and phosphonate chemistries, it is highly desirable to have access to a synthesis method that eliminates the use of solvents during assembly of the oligonucleotide chain, thus significantly reducing the negative environmental impact.

SUMMARY OF THE INVENTION

In an aspect there is provided a process for synthesizing an oligonucleotide of Formula 3,

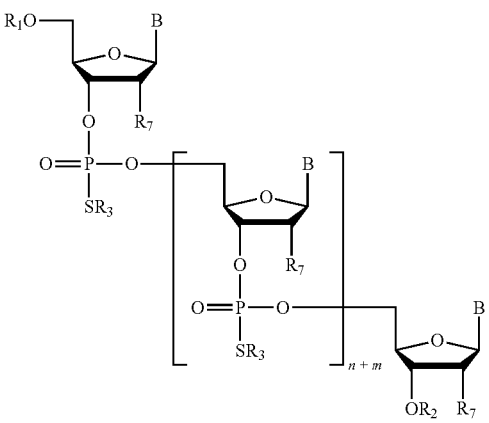

Formula 3 comprising reacting the nucleic acid of Formula 1,

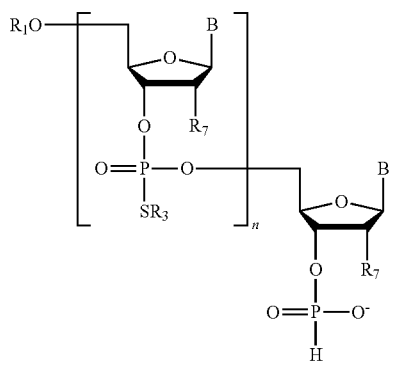

Formula 1 with the nucleic acid of Formula 2,

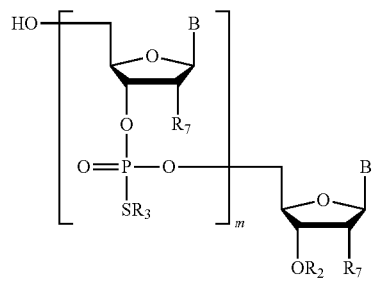

Formula 2 in the presence of an activator and a sulfur transfer reagent having an SR3 moiety, and using mechanochemistry or mechanical activation to induce chemical reaction between the reagents;
wherein
n is an integer from 0 to 20;
m is an integer from 0 to 20;
$R_1$ is a 5' protecting group;
$R_2$ is a 3' protecting group;
$R_3$ is $CH_2CH_2CN$, phenyl, chlorophenyl, or alkyl;

$R_7$ is H, F, Ome, O-methoxyethyl, or OR' in either the ribose or arabinose configuration and wherein R' is a 2' protecting group;

B is a nitrogen-containing base;

the activator is preferably adamantane carbonyl chloride (AdaCl); and $R_1$, $R_2$, $R_3$, $R_7$, and B can be the same or different in each nucleotide in the oligonucleotide.

In a further aspect there is provided a process for synthesizing an oligonucleotide of Formula 4, Formula 4

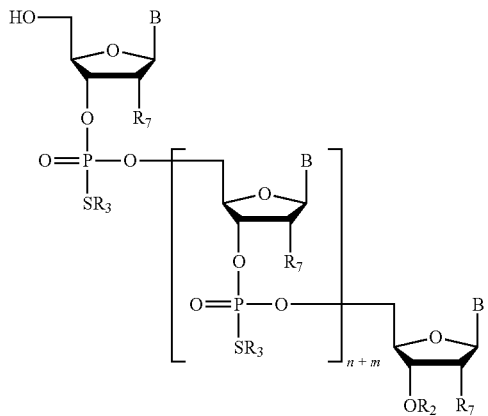

comprising reacting the nucleic acid of Formula 1,

Formula 1

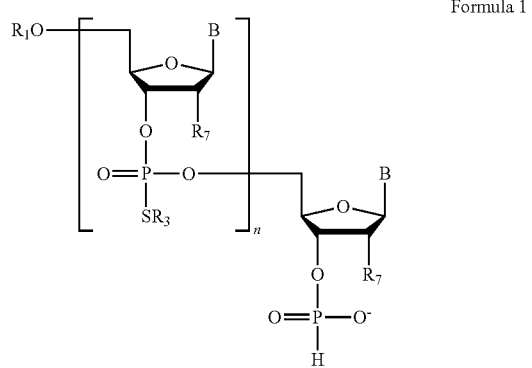

with the nucleic acid of Formula 2,

Formula 2

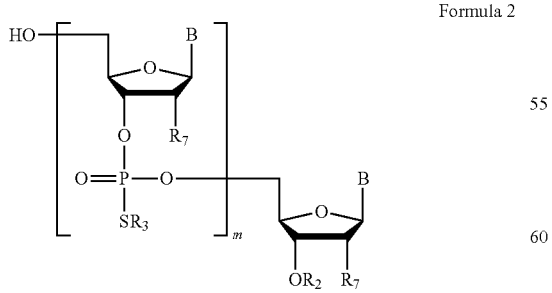

in the presence of an activator and a sulfur transfer reagent having an $SR_3$ moiety, and using mechanochemistry or mechanical activation to induce chemical reaction between the reagents;

wherein n is an integer from 0 to 20;

m is an integer from 0 to 20;

$R_1$ is a 5' protecting group;

$R_2$ is a 3' protecting group;

$R_3$ is $CH_2CH_2CN$, phenyl, chlorophenyl, or alkyl;

$R_7$ is H, F, Ome, O-methoxyethyl, or OR' in either the ribose or arabinose configuration and wherein R' is a 2' protecting group;

B is a nitrogen-containing base; and the activator is preferably diphenyl chlorophosphate (DCP); and $R_1$, $R_2$, $R_3$ and B can be the same or different in each nucleotide in the oligonucleotide.

In a further aspect there is provided a process for synthesizing an oligonucleotide of Formula 7, Formula 7

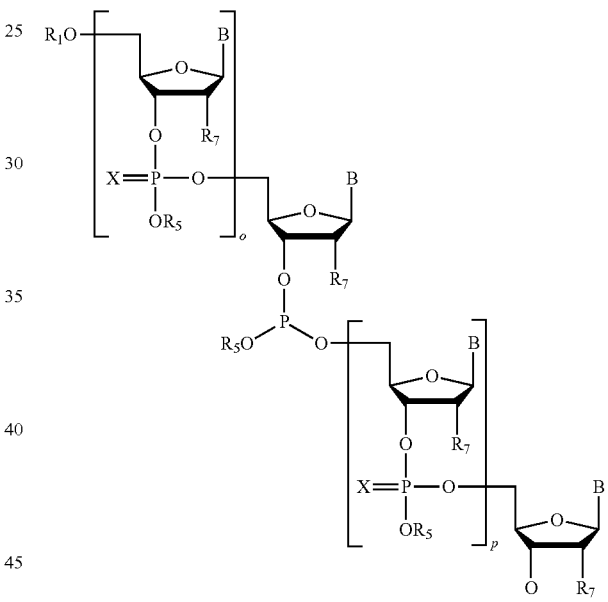

comprising reacting the nucleic acid of Formula 5,

Formula 5

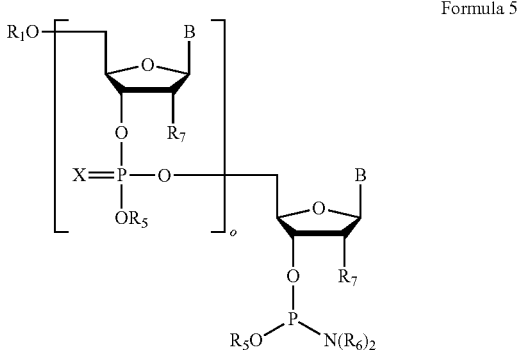

with the nucleic acid of Formula 6,

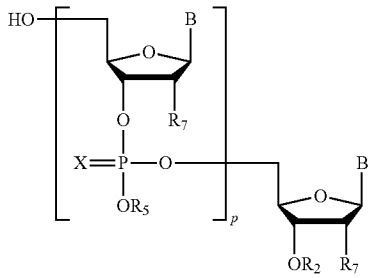

Formula 6 in the presence of an activator and using mechanochemistry or mechanical activation to induce chemical reaction between the reagents;

wherein o is an integer from 0 to 20;

p is an integer from 0 to 20;

$R_1$ is a 5' protecting group;

$R_2$ is a 3' protecting group;

$R_5$ is phosphate protecting group;

$R_6$ is an alkyl group;

$R_7$ is H, F, Ome, O-methoxyethyl, or OR' in either the ribose or arabinose configuration and wherein R' is a 2' protecting group;

X is O or S

B is a nitrogen-containing base; and $R_1$, $R_2$, $R_5$, $R_6$, $R_7$, X and B can be the same or different in each nucleotide in the oligonucleotide.

In a further aspect there is provided a process of for polymerizing nucleic acids of Formula 8 to form an oligonucleotide,

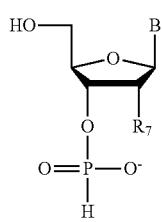

Formula 8 wherein n is 0;

$R_1$ is H;

$R_7$ is H, F, Ome, O-methoxyethyl, or OR' in either the ribose or arabinose configuration and wherein R' is a 2' protecting group;

B is a nitrogen-containing base;

the method comprising using mechanochemistry or mechanical activation to induce chemical reaction between the nucleic acid monomers in the presence of an activator to produce an oligonucleotide; and $R_7$ and B can be the same or different in each nucleotide in the oligonucleotide.

In a further aspect there is provided a process of for polymerizing nucleic acids of Formula 9,

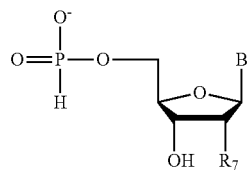

Formula 9

$R_7$ is H, F, Ome, O-methoxyethyl, or OR' in either the ribose or arabinose configuration and wherein R' is a 2' protecting group;

B is a nitrogen-containing base;

the method comprising using mechanochemistry or mechanical activation to induce chemical reaction between the nucleic acid monomers in the presence of an activator;

wherein $R_7$ and B can be the same or different in each nucleotide in the oligonucleotide.

BRIEF DESCRIPTION OF THE DRAWINGS

These and other features of the preferred embodiments of the invention will become more apparent in the following detailed description in which reference is made to the appended drawings wherein.

DETAILED DESCRIPTION

Figure 1:
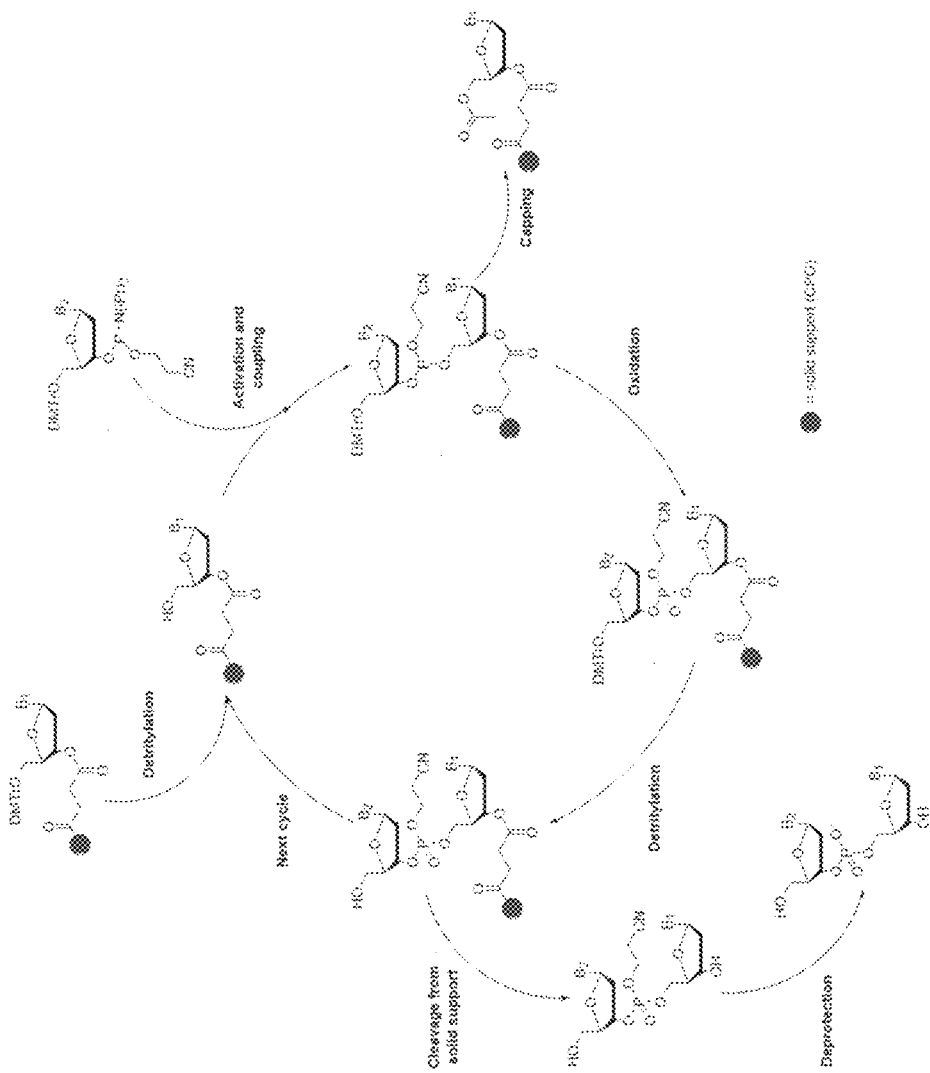
FIG. 1: shows phospharamidite synthesis cycle.
Figure 2:
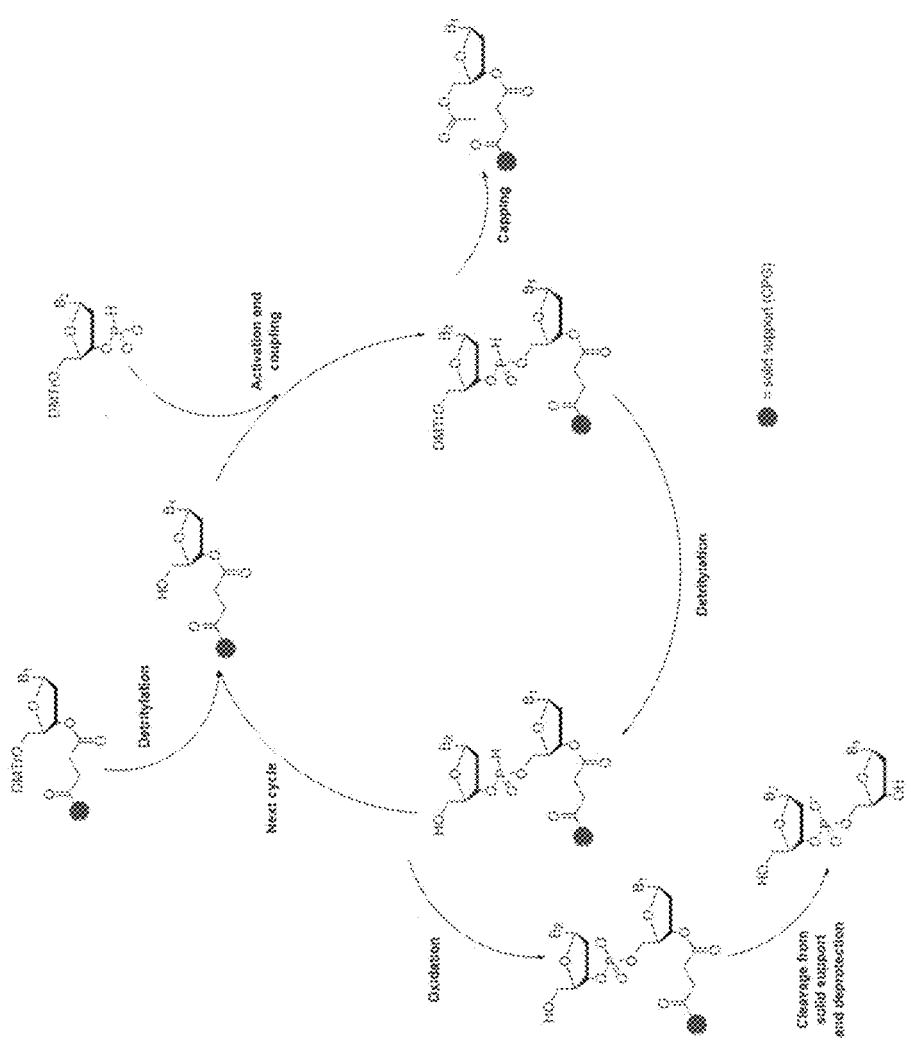
FIG. 2: shows the H-Phosphonate synthesis cycle.

Methods for the solvent-free assembly of short nucleic acid fragments (dimer, trimer, tetramer) are described herein. The method described the use of both phosphoramidite and H-phosphonate chemistry with mechanochemistry. In principle, the method described herein can be extended to the stepwise or block synthesis of higher molecular weight oligonucleotides. As for solid-phase synthesis, the method described therein benefits from speed and efficiency, a critical aspect of oligonucleotide manufacturing. This is demonstrated by performing coupling step (i.e., internucleotide bond formation), oxidation, and deblocking steps in situ without isolating product intermediates. However, unlike current solid-phase and solution-phase methods, the steps of the present invention are carried out in the absence of bulk solvents thus reducing chemical waste.

The use of solvent-free chemistry and/or mechanochemistry or mechanical activation to synthesize oligonucleotides has not been reported. There have been reports of nucleoside and nucleotide synthesis through mechanochemical methods, focused entirely on the assembly of a particular monomer (see: Eguaogie et al. *Beil. J. Org. Chem.* 13, pp. 87-92, (2017)], which have not provided any obvious routes towards oligonucleotide synthesis. Mechanochemical approaches for the synthesis of symmetrical and non-symmetrical oligophosphate-bridged dinucleotide-like structures have been reported, but represent "terminal" or "capping" syntheses, with no obvious application in oligonucleotide synthesis, and neither ability to grow an oligonucleotide chain by the phosphoramidite or H-phosphonate synthesis cycles [Appy et al. *Chem. Eur. J.* 25, pp. 2477-2481 (2019); Eguaogie et al. *Org. Biomol. Chem.* 14, pp. 1201-1205 (2016)].

A recent overview of nucleoside- and nucleotide-related mechanochemistry is given in Eguaogie et al. *J. Org. Chem.* 14, 955-970 (2018), confirming the above.

Recent studies have also reported the coupling of a nucleoside phosphoramidite in the presence of ionic liquids by ball milling [Johnston et al. *R. Soc. Open Sci.* 8 (3), p. 201703 (2021)]. However, this report only synthesized a single phosphite triester dimer and mainly investigated the role of ionic liquids in the reaction and thus bears minimal relation to the methods described herein.

The present invention is based on adapting synthetic routes for oligonucleotide synthesis to the mechanochemical environment, in absence of bulk solvents. Under such conditions, established chemical procedures can and do exhibit different behavior, requiring investigation and development.

Mechanochemistry (or mechanical chemistry) is a branch of chemistry concerned with chemical and physico-chemical changes of substances due to the influence of mechanical energy or mechanical agitation. Mechanochemistry couples mechanical and chemical phenomena. It uses mechanical action to cause, sustain or modify chemical and physico-chemical changes in a substance. For example, ball milling or grinding are a mechanochemical techniques that can be used to impart mechanical force and/or mechanical agitation to a substance to achieve chemical processing and transformations.

Sometimes, mechanical action such as milling or grinding can induce a chemical or a physical transformation in a substance, that continues after mechanical action has ceased, which is known as mechanical or mechanochemical activation.

The mechanisms of mechanochemical transformations are often complex and are often quite different from usual thermal or photochemical mechanisms. Indeed, mechanochemistry is radically different from the traditional way of dissolving, heating, and stirring chemicals in a solution or dispersion. In fact, mechanochemistry can be often conducted in the absence of bulk solvent. Indeed, when a liquid is present (known as liquid-assisted grinding or LAG), it is only used in very small amounts. Hence, mechanochemistry is quite different from wet chemistry, including chemistry of slurries and suspensions.

In fact, it has become clear that removing the solvent from reactions can change reaction pathways considerably. It is therefore not obvious that such process can be applied to oligonucleotide synthesis, which requires multi-steps per synthesis cycle, and considerable washing with solvents between each step.

The absence of a bulk solvent during a mechanochemical synthesis can have varied consequences including, among others the following:
- solid-state and solution syntheses give the same or closely related products;
- solution synthesis gives the desired product, whereas solid state does not; and
- solid-state synthesis gives the desired product, but solution does not.

Which of these is the most likely is not yet readily predictable. Mechanochemistry brings its own challenges and sets of rules to synthesis, and many of the latter are not yet fully understood. Mechanism(s) of reactions in the solid state are by no means required to follow those of their solution-based counterparts. Manipulating solid materials introduces different issues of mass transport and can reduce the effects of steric hindrance to reactivity. These changes can contribute to (as yet) unpredictable patterns of reactivity, whether they involve the promotion of undesired decomposition routes or the generation of products previously believed to be unattainable [reviewed by Rightmire and Hanusa, *Advances in organometallic synthesis with mechanochemical methods, Dalton Trans.*, 455, 2352 (2016); Abstract, section 3, and conclusions].

Indeed, understanding the fundamental nature of mechanochemical reactions remains an important and largely unsolved problem of mechanochemistry and, in fact, mechanochemical reactions are mostly unpredictable and often cannot be explained by only one type of mechanism [Suslick et al. Mechanochemistry and sonochemistry: concluding remarks, Faraday Discuss., 170, on pages 417 and 418 (2014)].

Unpredictability, and the fact that adapting chemical processes is not a straightforward and obvious process is also evidenced from the claim of Andersen and Mack in *Green Chem.* 20, pp. 1435-1443 (2018): "In general, much more work remains to be done towards completing the understanding of the driving forces observed so far, identifying new ones, and finally exploiting them for the development unique chemical opportunities."

Another evidence of lack of understanding and non-obviousness of developing mechanochemical processes is found in Hernandez and Bolm, *J. Org. Chem.* (2017), 82, pp. 4007: "At first glance, the current number of examples where mechanochemistry has led to unexpected reactivities and products might appear small, but we are convinced that this is only the "tip of the iceberg". Most researchers still follow the traditional routes of improving and optimizing a given process, which mostly involves a solvent screening. Performing the reactions in the absence of a solvent is often out of sight, although a much more pronounced reactivity and perhaps even alternative products might result. Mechanochemistry is a powerful tool for synthesis, and we encourage the community to embrace the exploration of mechanochemical transformations boldly and with eyes wide open."

Accordingly, the present disclosure relates generally to the field of oligonucleotide synthesis and provides methods for the synthesis of DNA and their analogues.

In an aspect there is provided a process for synthesizing an oligonucleotide of Formula 3,

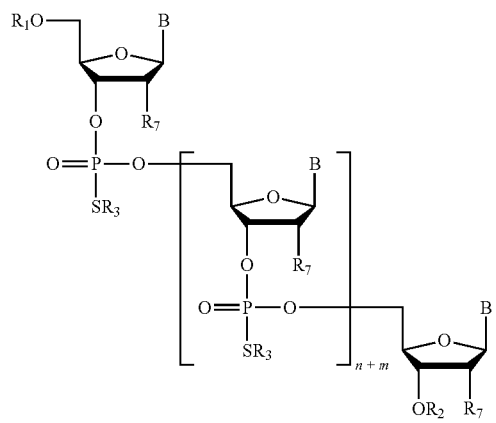

Formula 3 comprising reacting the nucleic acid of Formula 1,

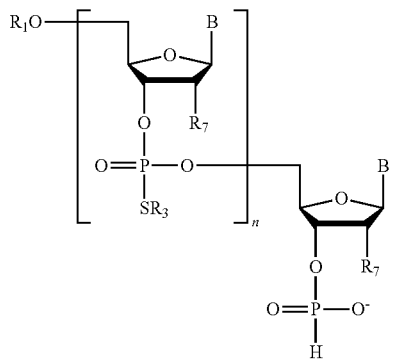

Formula 1 with the nucleic acid of Formula 2,

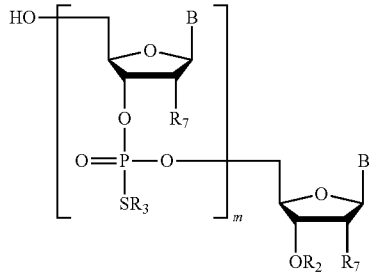

Formula 2 in the presence of an activator and a sulfur transfer reagent having an SR3 moiety, and using mechanochemistry or mechanical activation to induce chemical reaction between the reagents;
wherein
n is an integer from 0 to 20;
m is an integer from 0 to 20;
$R_1$ is a 5' protecting group;
$R_2$ is a 3' protecting group;
$R_3$ is $CH_2CH_2CN$, phenyl, chlorophenyl, or alkyl;
$R_7$ is H, F, Ome, O-methoxyethyl, or OR' in either the ribose or arabinose configuration and wherein R' is a 2' protecting group;

B is a nitrogen-containing base;

the activator is preferably adamantane carbonyl chloride (AdaCl); and $R_1$, $R_2$, $R_3$, $R_7$, and B can be the same or different in each nucleotide in the oligonucleotide.

The entity B in the compounds of formula (II) above and in the compounds described below is a nitrogen-containing base, preferably a base or a protected-base (also referred to herein as a "nucleobase"). The base is preferably a purine or pyrimidine base or analog thereof. Analogs include diaminopurine and its derivatives, inosine and its derivatives, alkylated purines or pyrimidines, acylated purines or pyrimidines, thiolated purines or pyrimidines. More specific analogs include, for example, 1-methyladenine, 2-methyladenine, N6-methyladenine, N6-isopentyladenine, 2-methylthio-N6-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, and the like. A "protected base" is protected on at least one nitrogen by any suitable O- or N-protecting group. Nucleobase protecting groups are known in the art, for example as described in Beaucage, S. et al., *Tetrahedron*. 49, pp. 6123-6194 (1993) and Carpino, L. A. et al. *Journal of Organic Chemistry*. 37 (22), 3404-3409 (1972). Nucleobase protecting groups include levulinyl, acetyl, difluoroacetyl, trifluoroacetyl, isobutyryl, benzoyl, 9-fluorenylmethoxycarbonyl, phenoxyacetyl, dimethylformamidine, N,N-diphenyl carbamate, and the like.

Preferably, the base is selected such that the nucleotide is adenine (A), cytosine (C), guanine (G), thymine (T), uracil (U) or derivatives thereof.

In some embodiments, the process further comprises deprotecting the oligonucleotide of Formula 3 to remove any protecting groups.

In an aspect there is provided a process for synthesizing an oligonucleotide of Formula 4, Formula 4

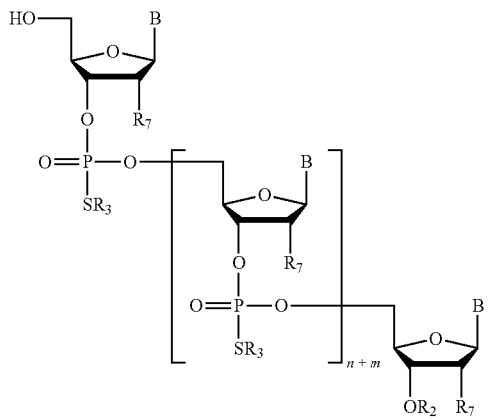

comprising reacting the nucleic acid of Formula 1,

Formula 1

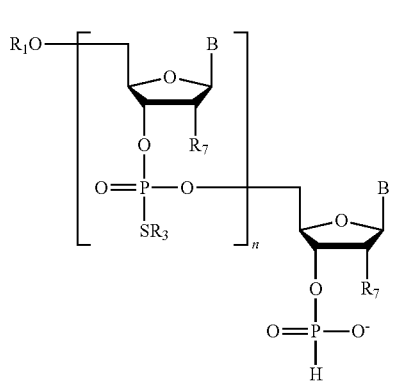

with the nucleic acid of Formula 2,

Formula 2

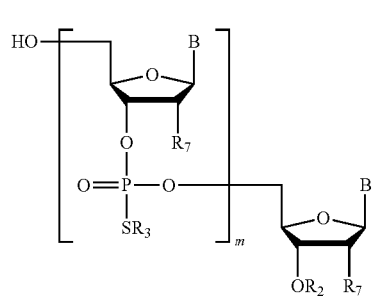

in the presence of an activator and a sulfur transfer reagent having an $SR_3$ moiety, and using mechanochemistry or mechanical activation to induce chemical reaction between the reagents;

wherein n is an integer from 0 to 20;

m is an integer from 0 to 20;

$R_1$ is a 5' protecting group;

$R_2$ is a 3' protecting group;

$R_3$ is $CH_2CH_2CN$, phenyl, chlorophenyl, or alkyl;

$R_7$ is H, F, Ome, O-methoxyethyl, or OR' in either the ribose or arabinose configuration and wherein R' is a 2' protecting group;

B is a nitrogen-containing base; and the activator is preferably diphenyl chlorophosphate (DCP); and $R_1$, $R_2$, $R_3$ and B can be the same or different in each nucleotide in the oligonucleotide.

Sulfur transfer reagents that are suitable in the above H-Phosphonate reactions are known in the art, such as those described in Reese, C. B. and Yan, H. Journal of the Chemical Society, Perkin Transactions 1: Organic and Bio-Organic Chemistry pp. 2619-33 (2002); and Reese, C. B. Org Biomol Chem 21, pp. 3851-3868 (2005). Preferably, in some embodiments, the sulfur transfer reagent is N-(phenylthio)pthalimide (PTP), N-[(2-cyanoethyl)sulfanyl]pthalimide (CSP), 2-methylsulfanyl-1H-isoindole-1,3(2H)-dione, 2-(4-chlorophenyl)sulfanyl-1H-isoindole-1,3(2H)-dione, N-(phenylsulfanyl)succinimide, or N-[(2-cyanoethyl)sulfanyl]succinimide.

Activators that are suitable in the H-phosphonate reactions are known in the art, such as those described in Stawinski, J., Some aspects of H-phosphonate chemistry. In *Handbook of Organophosphorus Chemistry*, Dekker: 1992 pp. 377-434; and Stawinski, J. and Ströberg, R., Di- and oligonucleotide synthesis using H-phosphonate chemistry. In *Oligonucleotide Synthesis*, Springer: 2005; pp 81-100.

For example, exemplary activators include but are not limited to Pivaloyl carbonyl chloride (PvCl), Adamantane carbonyl chloride (AdaCl), Mesitoyl chloride (MsCl), Tris (1,2,4-triazoyl) phosphite, 5'5-dimethyl-2-oxo-2-chloro-1,3,2-dioxaphosphinane (DMOCP), Bis(2-oxo-3-oxazolidinyl) phosphinic chloride (OXP), Diphenyl chlorophosphate (DCP), 2,4,6-triisopropylbenzenesulfonyl chloride (TPS-Cl), Acetic anhydride ($Ac_2O$), Isobutyric anhydride ($iBu_2O$), Pivaloyl anhydride ($Pv_2O$), Pivaloyl bromide (PvBr), Benzoyl chloride (BzCl), Isobutyl chloroformate, including other activators of the types: Arene sulfonyl derivatives (such as TPS-Cl), Acyl chlorides (such as PvCl, AdaCl), Chlorophosphates (such as DCP), and Reactive anhydrides (such as $Pv_2O$, $Ac_2O$).

Methods for deblocking and converting the P(V)-SR compounds to phosphodiesters are known in the art (see, e.g., Reese, C. B. *Org Biomol Chem* 21, pp. 3851-3868 (2005)). Such reagents include E-pyridine-2-carboxaldoxime, E-4-nitrobenzaldoxime, E-2-nitrobenzaldoxime, E-2,4-dinitrobenzaldoxime, Butan-2,3-dione monoxime, and 2-oxopropanal-1-oxime.

In an aspect there is provided a process for synthesizing an oligonucleotide of Formula 7,

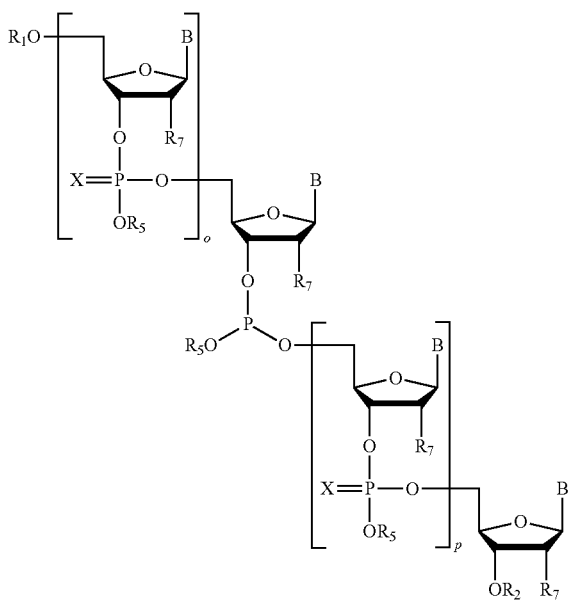

Formula 7 comprising reacting the nucleic acid of Formula 5,

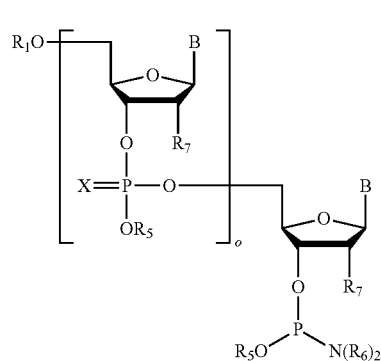

Formula 5 with the nucleic acid of Formula 6,

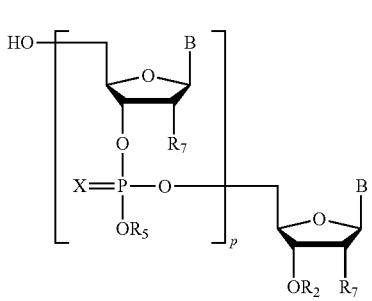

Formula 6 in the presence of an activator and using mechanochemistry or mechanical activation to induce chemical reaction between the reagents;

wherein o is an integer from 0 to 20;
p is an integer from 0 to 20;
$R_1$ is a 5' protecting group;
$R_2$ is a 3' protecting group;
$R_5$ is phosphate protecting group;
$R_6$ is an alkyl group;
$R_7$ is H, F, Ome, O-methoxyethyl, or OR' in either the ribose or arabinose configuration and wherein R' is a 2' protecting group;
X is O or S
B is a nitrogen-containing base; and
$R_1$, $R_2$, $R_5$, $R_6$, $R_7$, X and B can be the same or different in each nucleotide in the oligonucleotide.

Activators that are suitable in the phosphoramidite reactions are known in the art, such as those described in Wei, X., *Tetrahedron* 69, pp. 3615-3637 (2013); Xie, C. et al. *Organic Process Research & Development* 9, pp. 730-737 (2005); Beaucage, S. et al., *Tetrahedron* 49, pp. 6123-6194 (1993); and Hayakawa, Y. *Tetrahedron*, 61, pp. 2203-2209 (2005).

For example, exemplary activators include but are not limited to 1H-Tetrazole (Tetrazole), 5-Nitrophenyl-1H-tetrazole (NPT), 5-(Bis-3,5-trifluoromethylphenyl)-1H-tetrazole (Activator 42), 5-Ethylthio-1H-tetrazole (ETT), 5-Benzylthio-1H-tetrazole (BTT), 5-Methylthio-1H-tetrazole (MTT), 5-Mercapto-tetrazole (MCT), 4,5-Dicyanoimidazole (DCI), Pyridine Hydrochloride (Py-Cl), Pyridine trifluoroacetate (Py TFA), 1-Hydroxy-benzotriazole, Nitrotriazole, as well as acidic salt complexes and carboxylic acids.

In some embodiments, the process further comprises oxidizing the oligonucleotide of Formula 7 to convert the phosphite triester bond to a phosphate triester bond. Oxidizing agents that are suitable for this purpose are known in the art, such as those described in Beaucage, S. et al. *Tetrahedron*, 48 (12), 2223-2311 (1992), Uzagare, M. C. et al. *Bioorganic & Medicinal Chemistry Letters*. 13 (20), 3537-3540 (2003), and Hayakawa, Y. et al. *Tetrahedron Letters*. 27 (35), 4191-4194 (1986).

In some embodiments, the oxidizing is performed with a mixture of Iodine ($I_2$) and water, Meta-Chloroperoxybenzoic acid (mCPBA), Tert-Butyl peroxide (tBuOOH), or N-Bromosuccinamide dimethylsulfoxide (NBS-DMSO).

In some embodiments, the process further comprises deprotecting the oligonucleotide to remove all protecting groups.

In an aspect there is provided a process of for polymerizing nucleic acids of Formula 8 to form an oligonucleotide,

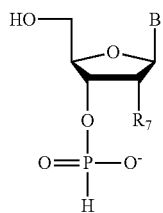

Formula 8 wherein
n is 0;
$R_1$ is H;
$R_7$ is H, F, Ome, O-methoxyethyl, or OR' in either the ribose or arabinose configuration and wherein R' is a 2' protecting group;
B is a nitrogen-containing base;
the method comprising using mechanochemistry or mechanical activation to induce chemical reaction between the nucleic acid monomers in the presence of an activator to produce an oligonucleotide; and
$R_7$ and B can be the same or different in each nucleotide in the oligonucleotide.

In an aspect there is provided a process of for polymerizing nucleic acids of Formula 9,

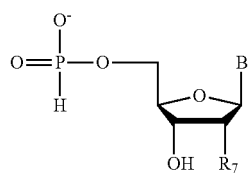

Formula 9

$R_7$ is H, F, Ome, O-methoxyethyl, or OR' in either the ribose or arabinose configuration and wherein R' is a 2' protecting group;
B is a nitrogen-containing base;
the method comprising using mechanical energy to induce chemical reaction between the nucleic acid monomers in the presence of an activator;
wherein $R_7$ and B can be the same or different in each nucleotide in the oligonucleotide.

In some embodiments, the use of mechanical energy, mechanochemistry or mechanical activation comprises the use of a pestle and mortar, a ball miller such as a mixer mill or a planetary miller, an extruder, a shaker miller, or a gravity miller.

The processes described herein may be used to prepare oligonucleotides from monomeric nucleic acids, or from existing or follow-on reactions using oligonucleotides, including but not limited to dimers, trimers and tetramers. Accordingly, m, n, o, and p may be any integer, such as from 0-40. In preferably embodiments, m, n, o, and p is any integer from 0-20, 0-10, or 0-5; or further preferably any of 0, 1, 2, 3 or 4.

The functional groups of the compounds disclosed herein may be protected by a variety of protecting groups known to those of skill in the art. A "protecting group" is used in the conventional chemical sense to reference a group which reversibly renders unreactive a functional group under specified conditions of a desired reaction. Some protecting groups are well known to one skilled in the art. Examples of the protection/deprotection process as well as various protecting groups are described in Wuts and Greene, 2006, *Greene's Protective Groups in Organic Synthesis*, Wiley-Interscience, New York, NY. Any suitable protecting group known to one skilled in the art may be used. After the desired reaction, protecting groups may be removed to deprotect the protected functional group. All protecting groups should be removable (and hence, labile) under conditions which do not degrade a substantial proportion of the molecules being synthesized. In contrast to a protecting group, a "capping group" permanently binds to a segment of a molecule to prevent any further chemical transformation of that segment. It should be noted that the functionality protected by the protecting group may or may not be a part of what is referred to as the protecting group.

Protecting groups used to protect the 5' and 3' ends for oligonucleotide synthesis are known in the art, such as those described in Beaucage, S. et al., *Tetrahedron*. 49, pp. 6123-6194 (1993), Beaucage, S. et al. *Tetrahedron* 48, pp. 2223-2311 (1992); Scaringe, S. *Journal of the American Chemical Society* 120, pp. 11820-11821 (1998), Misetic, A. et al. *Tetrahedron Letters* 39, pp. 1653-1656 (1998).

In some embodiments, the 5' protecting group is Dimethoxytrityl (DMTr), Monomethoxytrityl (MMTr), Trityl (Tr), Benzoyl (Bz), Acetyl (Ac) Tert-butyldimethylsilyl (TBDMS), Levulinic acid (Lev), Pixyl (Px), or (2-Nitrophenyl)propyloxycarbonyl (NPPOC).

Exemplary 3' protecting groups include Levulinyl (Lev), Acetyl (Ac), tert-butyldimethylsilyl (TBDMS), benzoyl (Bz), or acetallevulinyl (ALE). Ionic protecting groups, also referred to as ionic tags are also possible. Suitable ionic tags are known to those of skill in the art. These may include those described in PCT Application Publication No. WO 2006/096963 of Chan, T.-H. et al., the contents of which are incorporated herein by reference in its entirety. Suitable cationic ionic tags may include, for example, imidazolium and phosphonium ionic moieties having linkers selected from alkyl linkers, glycol linkers, etc. Suitable anionic counterions may include bromide ($Br^-$), chloride ($Cl^-$), tetrafluoroborate ($BF_4^-$), hexafluorophosphate ($PF_6^-$), acetate, trifluoro acetate, triflate ($TF^-$), bistriflimide anion ($NTF_2^-$), tris(pentafluoroethyl) trifluorophosphate (FAP), and others.

Furthermore, the methods of the present invention may be used to prepare oligoribonucleotides (RNA) comprising ribonucleotide units.

The 2'-hydroxyl of RNA chains must be appropriately protected in order to prevent phosphodiester bond isomerization or degradation and to allow for efficient monomer coupling during oligonucleotide synthesis (Reese, Org. Biomol. Chem. 3, pp. 3851-3868 (2005)). The most widely used 2'-protecting group is the 2'-O-t-butyldimethylsilyl (TBDMS) group, introduced in the oligonucleotide area by Ogilvie et al., *Tetrahedron Letters* 15, pp. 2861-2867 (1974). This protecting group is removed at the end of RNA chain assembly by fluoride ions. Other silyl protecting groups such as 2'-O-TOM (2'-O-triisopropylsilyloxymethyl) have been used in the synthesis of RNA (Pitsch et al., Helv. Chim. Acta 82, pp. 1753-1761 (1999)). Alternate protecting groups are the photolabile group 2'-(2-nitrophenyl)ethoxycarbonyl, 2'-(2-nitrophenyl)ethylsulfonyl and 2'O—(O-nitrobenzyl) substituents and the acid labile acetals such as the 2'-tetrahydropyranyl, 2'-O-Fpmp (1-(2-fluorophenyl)-4-methoxypiperidin-4-yl), 2'-O-Cpep (1-(4-chlorophenyl)-4-ethoxypiperidin-4-yl), 2'-O-4-MABOM (2'-O-[4-(N-methylamino)benzyloxy]methyl, and 2'-ACE (2'-O-bis(2-acetoxyethoxy)methyl). Yet other suitable 2' protecting groups are the levulinyl (Lev) and acetallevulynyl (Lev) protecting groups (Lackey et al. *Organic Letters* 9, pp. 789-792 (2007); Lackey et al. *Journal of the American Chemical Society* 131, pp. 8496-8502 (2009)).

The phosphate protecting group ($R_5$ as shown) above and in the various compounds below may be methyl (Me), 2-cyanoethyl (CNEt), p-nitro-phenylethyl (NPE), and para- and ortho-chloro-phenyl (p- or o-ClPh).

In some embodiments, the process is solvent-free.

In some embodiments, the process is performed in the presence of a base.

In some embodiments, the process further comprises reacting the product with a sulfurizing agent.

Sulfurizing agents for use in both the H-phosphonate and phosphoramidite methods are known in the art, such as those described in Stawinski, J., Some aspects of H-phosphonate chemistry. In *Handbook of Organophosphorus Chemistry*, Dekker: 1992 pp. 377-434, and Beaucage, S. et al., *Tetrahedron* 49, pp. 6123-6194 (1993).

In some embodiments, the sulfurizing agent is elemental sulfur ($S_8$), 3-[(dimethylaminomethylene)amino]-3H-1,2,4-dithiazole-5-thione (DDTT), Dimethyl sulfoxide (DMSO), 2,2'-dipyridyl disulfide, Diphenyl disulfide, Dibenzoyl tetrasulfide, Phenylacetyl disulfide, or Beaucage reagent.

The oligonucleotides obtained by the processes described herein may be, or may be modified to obtain any of the following internucleotide linkages: phosphorothioate, phosphorodithioate, thioalkyl phosphodiester, phosphoramidate, phosphoroselenoate, phosphotriester, alkyl phosphonate, alkyl phosphonothioate, boranophosphate, or phosphoroazolide. Methods of producing phosphate analogues are known to a person skilled in art (see, e.g., Stawinski, J., Some aspects of H-phosphonate chemistry. In *Handbook of Organophosphorus Chemistry*, Dekker: 1992 pp. 377-434, Beaucage, S. et al., *Tetrahedron* 49, pp. 6123-6194 (1993)).

Furthermore, the methods of the present invention may be used to prepare oligonucleotides comprising modified nucleic acids, such as 2'-O-Me RNA (2'OMe-RNA), 2'-O-Methoxyethyl RNA (2'MOE-RNA), 2'-Fluoro-RNA (2'F-RNA), 2'-Fluoro-arabinose nucleic acid (2'F-ANA), 2'4'-Bridged (locked) nucleic acids (LNA, BNA), Oxepane nucleic acid (ONA), 2'4'-Disubstituted RNA or ANA (2'F-4'OMe-RNA, 2'OMe-4'F-RNA, 2'F-4'F-RNA, etc), Morpholino nucleic acids (PMO) and Amide Linked nucleic acids. Reference may be made in this regard to the following references of the art: Deleavey, G. F. et al. *Chemistry & Biology* 19, pp. 937-954 (2012); Wan, W. B. et al. *Journal of Medicinal Chemistry* 59, pp. 9645-9667 (2016); Selvam, C. et al. *Chemical Biology & Drug Design* 90, pp. 665-678 (2017); Shen, X. et al. *Nucleic Acids Research* 46, pp. 1584-1600 (2018); Malek-Adamian, E. et al. *Nucleic Acids Therapeutics* 29, pp. 187-194 (2019).

The term "lower alkyl" as used herein refers to acyclic, straight or branched chain alkyl groups containing from one to six carbons.

Preferred lower alkyl groups include, for example, isopropyl, methyl, and ethyl.

The methods described herein provide dimer, trimer and tetramer synthons in high yields. Such dimer and trimer synthons can be coupled in solution, solid phase, or the method reported here to allow longer chain extensions at each coupling stage of oligonucleotide synthesis, significantly reducing the total number of steps required in the synthesis of target oligomers [Hassler, M. et al. *Tetrahedron Letters* 52, pp. 2575-2578 (2011); Damha, M. J. et al., US Patent US2019/0062355A1].

The advantages of the present invention are further illustrated by the following examples. The examples and their particular details set forth herein are presented for illustration only and should not be construed as a limitation on the claims of the present invention.

EXAMPLES

A. Synthesis of Oligonucleotides—General Methods

All vibrational ball milling reactions were performed in a Form Tech Scientific FTS100 vibrational ball mill. The milling reactions were performed in steel jars from Retsch of from Form Tech Scientific or Teflon jars purchased from Form Tech Scientific. $^1$H and $^{31}$P NMR were recorded on a Bruker-400 or Bruker-500 NMR spectrometers. MS data were obtained by using either a Thermo Scientific Exactive Plus Orbitrap mass spectrometer or a Bruker Daltonics Maxis Impact quadrupole time-of-flight (QTOF) mass spectrometer, using ESI ionization methodology. All anhydrous reagents were dried over molecular sieves purchased from Sigma Aldrich. Purification was done using silica gel (F60) from Silicycle. All chemicals were purchased from Sigma Aldrich or Fisher Scientific. 5-Ethylthio-tetrazole (ETT) was purchased from Tokyo Chemical Industries (TCI). All nucleosides, phosphoramidites, H-phosphonates, and oligonucleotide synthesis reagents were purchased from ChemGenes Corporation.

B. Synthesis of Oligonucleotides Via H-Phosphonate Chemistry.

Figure 3:
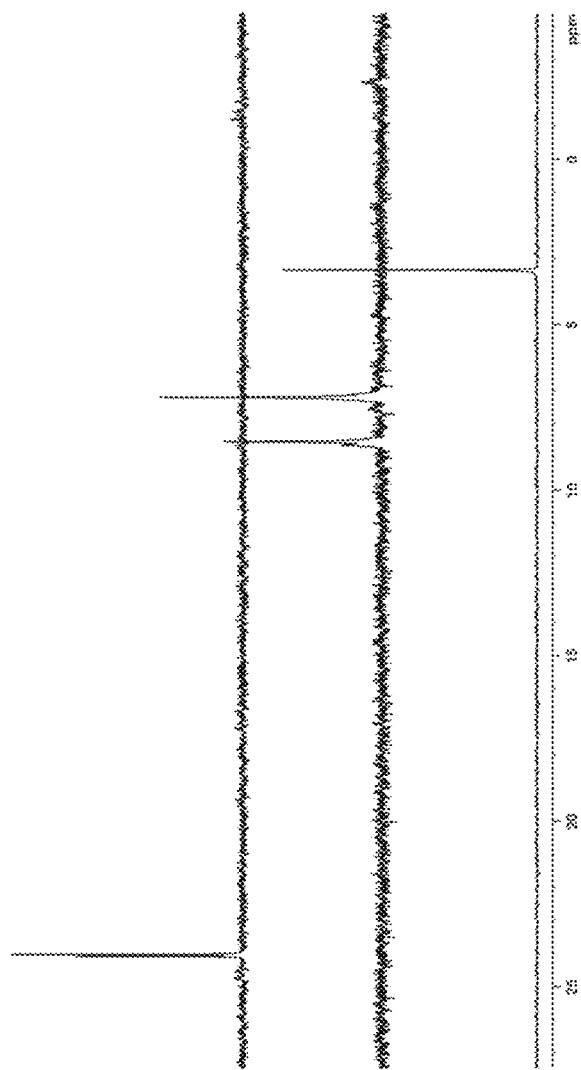
FIG. 3: shows a) Starting material H-phosphonate monoester 1a. b) Crude reaction mixture after precipitation of the reaction between 1a and 2 with 5 eq. of AdaCl and 5 eq. of pyridine at 25 Hz for 15 min. c) 3a after purification of column chromatography, synthesized by the method outlined in Scheme 1.

Initial efforts at coupling nucleotide 1a and nucleoside 2 using vibration ball milling at 25 Hz for 15 minutes were successful using 5 equivalents of adamantane carbonyl chloride as an activator and 10 equivalents of pyridine as a base. We confirmed the coupling occurred by the appearance of two new peaks around 7-9 ppm in the crude $^{31}$P NMR spectrum corresponding to the H-phosphonate dimer (FIG. 3). However, we had difficulty in isolating the products of this reaction due to the known low stability of H-phosphonate diesters under basic conditions [Westheimer, F. et al. *Journal of the American Chemical Society* 110, pp. 181-185 (1988); Froehler, B. C. et al. *Nucleic Acids Research* 14, pp. 5399-5407 (1986)].

For this reason, we decided to turn to a modified H-phosphonate approach where we employed the use of thiophosphoric esters as protecting groups for the linkage [Reese, C. B.; Yan, H., *Journal of the Chemical Society, Perkin Transactions* 1, pp, 2619-2633 (2002); Dreef, C. et al. *Synlett* 1990, pp. 481-483 (1990)]. From our initial studies we knew that H-phosphonate dimers could be prepared using vibration ball milling in 15 minutes, and, gratifyingly upon subsequent addition of N-(phenylthio)phthalimide (PTP) and base (pyridine or DIPEA) to the crude reaction mixture we were able to form protected dimers 3a-d (Scheme 1) in 15 minutes under the same vibration ball milling conditions. This was evidenced once again by the formation of two new peaks around 24 ppm in the $^{31}$P NMR spectrum (FIG. 3) and was also supported by High-Resolution Mass Spectral (HRMS) analysis. We found these dimers to be much more stable to basic conditions and were easily isolable by simple column chromatography (FIGS. 4-7). Nucleotide H-phosphonates protected with a thiophenyl group such as compounds 3a-d can be treated with 2-nitrobenzaldoxime and tetramethyl guanidine to yield naturally occurring phosphodiesters.

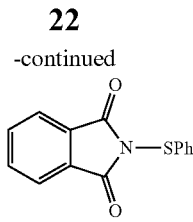

Interestingly, in our screenings of various activators for the coupling reaction, we discovered that the coupling reaction and sulfurization step could be carried out in one-pot simultaneously using diphenyl phosphoryl chloride (DPC) as the activator in place of the adamantane carbonyl chloride we were using previously. However, using this strategy we noticed partial cleavage of the 5'DMTr protecting group, even when using an excess of pyridine. We hypothesized that the addition of the liquid activator and pyridine separately caused the reaction to occur locally in the milling jars leading to partial detritylation before any milling had occurred. We tried different strategies to avoid this detritylation such as partial mixing of nucleic acids with pyridine prior to addition of activator and preparation of a pyridine/DPC solution which was added as one portion. None of these strategies were effective in eliminating detritylation. Given that all our attempts to eliminate detritylation with DPC failed, we decided to take advantage of this unexpected observation, giving us an efficient route to the synthesis of partially protected nucleic acid dimers (Scheme 2). Subsequently, we did not neutralize the silica prior to performing column chromatography leading to fully detritylated dimers 4a-d (FIGS. 8-11).

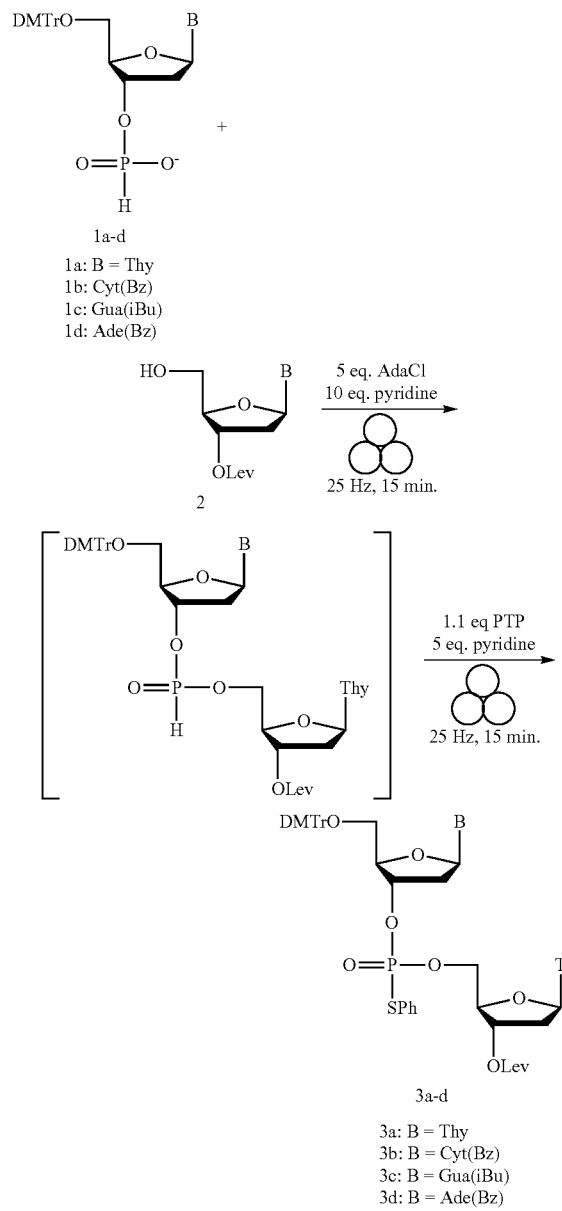

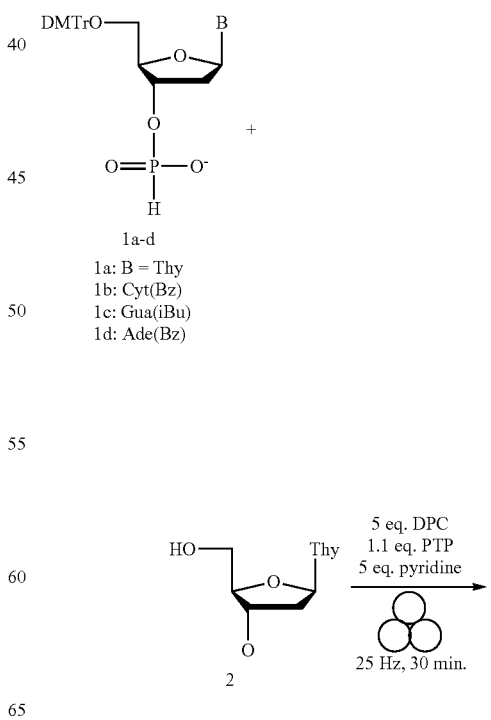

Scheme 2: One-step vibration ball milling process to synthesize partially protected thiophosphoric ester (SPh) nucleic acid dimers

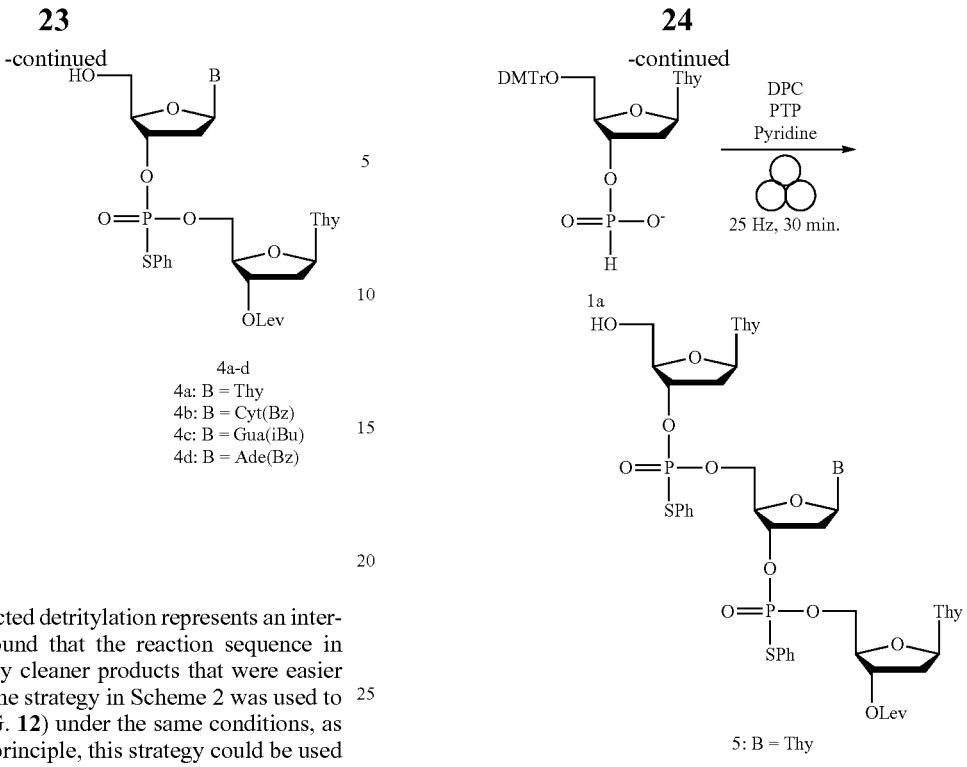

4a-d
4a: B = Thy
4b: B = Cyt(Bz)
4c: B = Gua(iBu)
4d: B = Ade(Bz)

DPC = PhO—P(=O)(Cl)—OPh

Although this unexpected detritylation represents an interesting discovery, we found that the reaction sequence in Scheme 1 gave generally cleaner products that were easier to purify. Nonetheless, the strategy in Scheme 2 was used to synthesize trimer 5 (FIG. 12) under the same conditions, as shown in Scheme 3. In principle, this strategy could be used to continue to grow oligonucleotides in a stepwise manner.

Scheme 3: Vibration ball milling strategy for synthesis of thiophosphoric ester (SPh) nucleic acid trimers

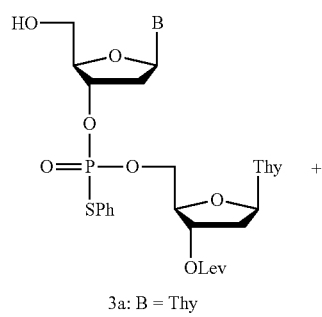

3a: B = Thy

5: B = Thy

Given the general utility of the strategy in Scheme 1, we adopted this approach to synthesize dimer "blocks". This block coupling strategy is outlined in Scheme 4. Fully protected dimers of the type 3a-d can be detritylated highly efficiently in solution to yield compounds 4a-d in a different way. As stated above, we found this strategy to be generally higher yielding and facilitated purification. Alternatively, dimers 3a-d can be treated with hydrazine in solution to remove the 3' levulinyl protecting group to yield partially protected dimers 6a-d with free 3'-hydroxyl components (FIGS. 13-16). These dimers could be further treated with diphenyl hydrogen phosphite (DPHP) in pyridine to yield dimers with 3'-H-phosphonates 7a-d (FIGS. 17-20).

Scheme 4: Solution-phase synthesis of dimer "blocks with either 5'-hydroxyl components or 3'-H-phosphonate components.

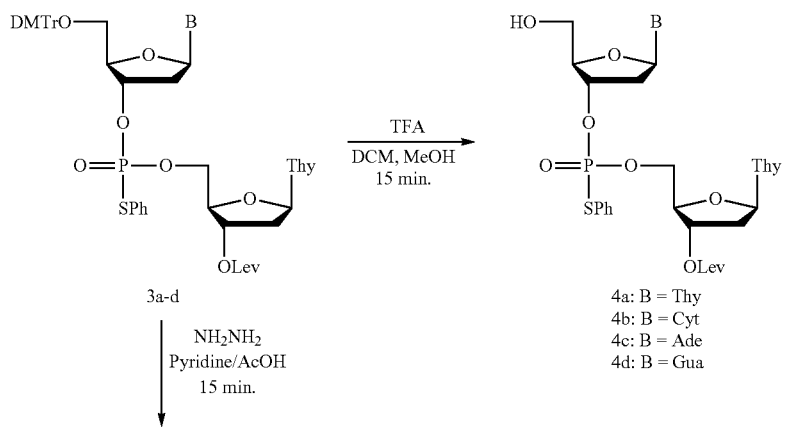

3a-d

NH₂NH₂
Pyridine/AcOH
15 min.

4a: B = Thy
4b: B = Cyt
4c: B = Ade
4d: B = Gua

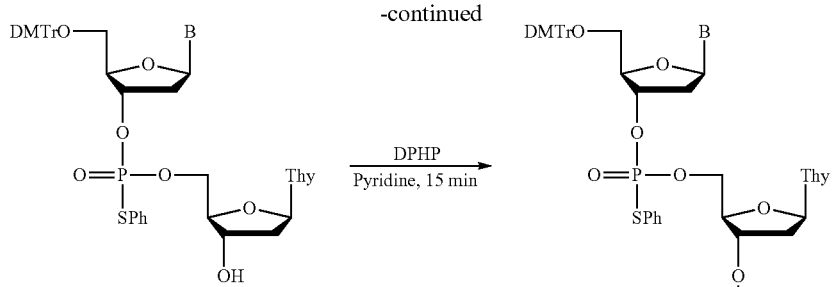

6a: B = Thy
6b: B = Cyt
6c: B = Ade
6d: B = Gua

7a: B = Thy
7b: B = Cyt
7c: B = Ade
7d: B = Gua

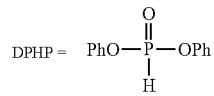

Figure 21:
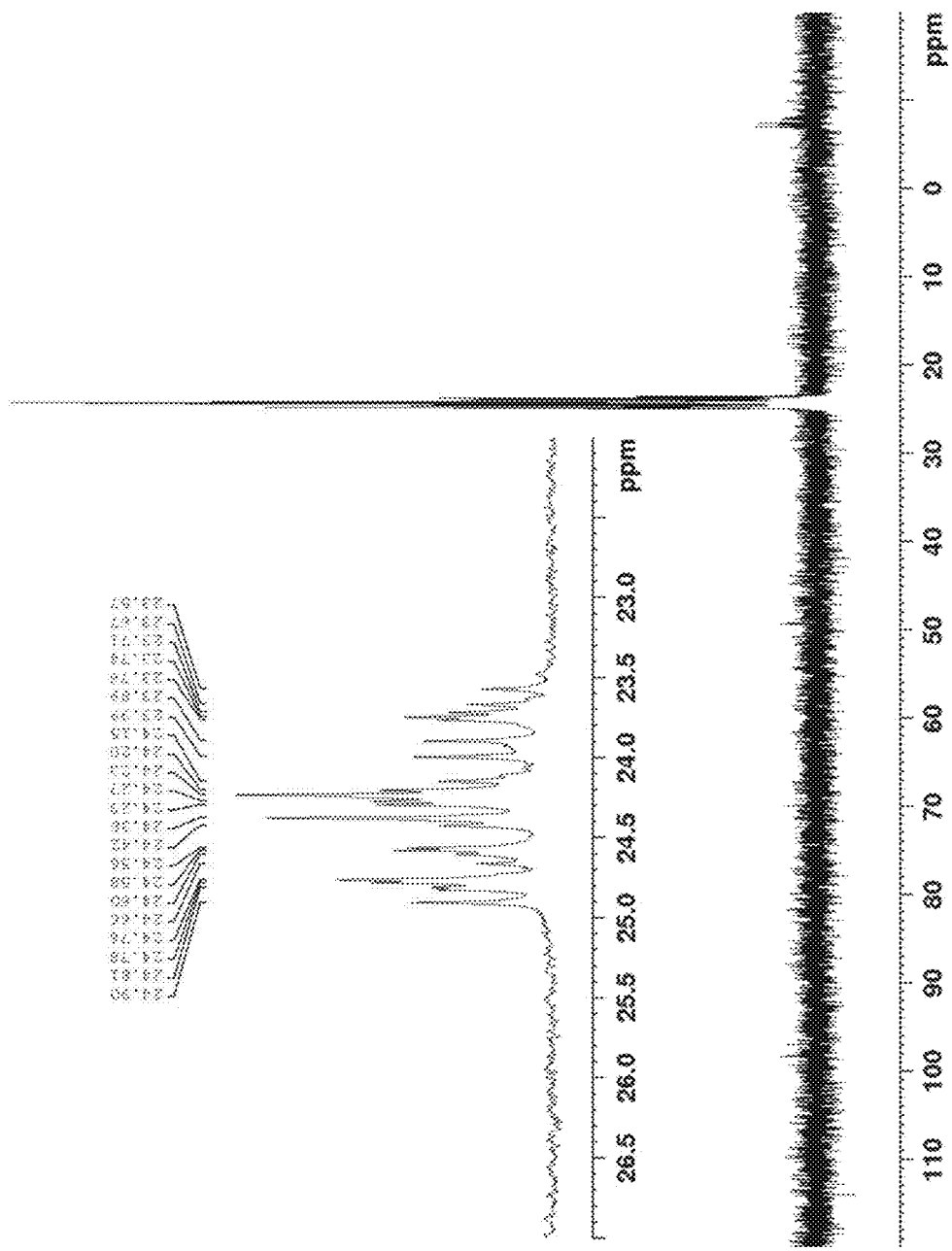
FIG. 21: shows $^{31}$P NMR spectrum of fully protected tetramer 8 with S-(phenyl) protection after purifications by column chromatography with zoom of relevant peaks.

With these dimer blocks in hand we performed analgous reactions to Scheme 1, but instead of coupling monomers to yield dimers, we coupled dimers to yield a tetramer 8 (FIG. 21). This strategy is outlined in Scheme 5 and allows us to grow an oligonucleotide chain much faster and greatly facilitates purification.

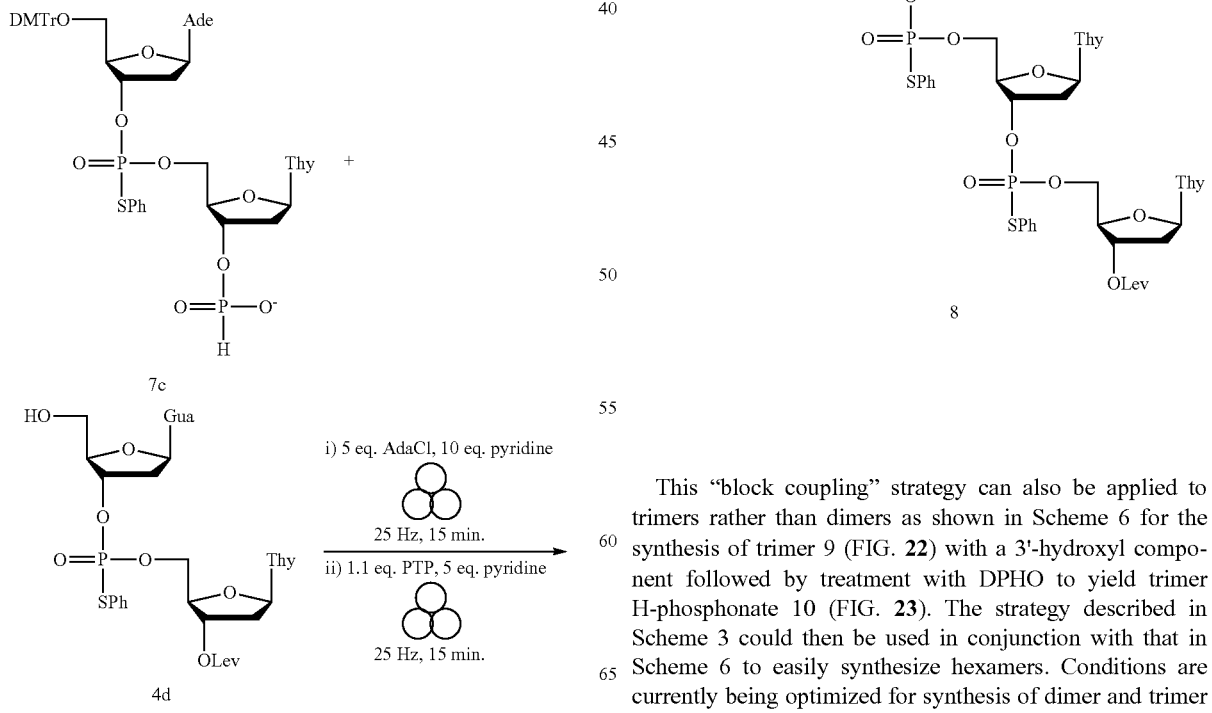

Figure 22:
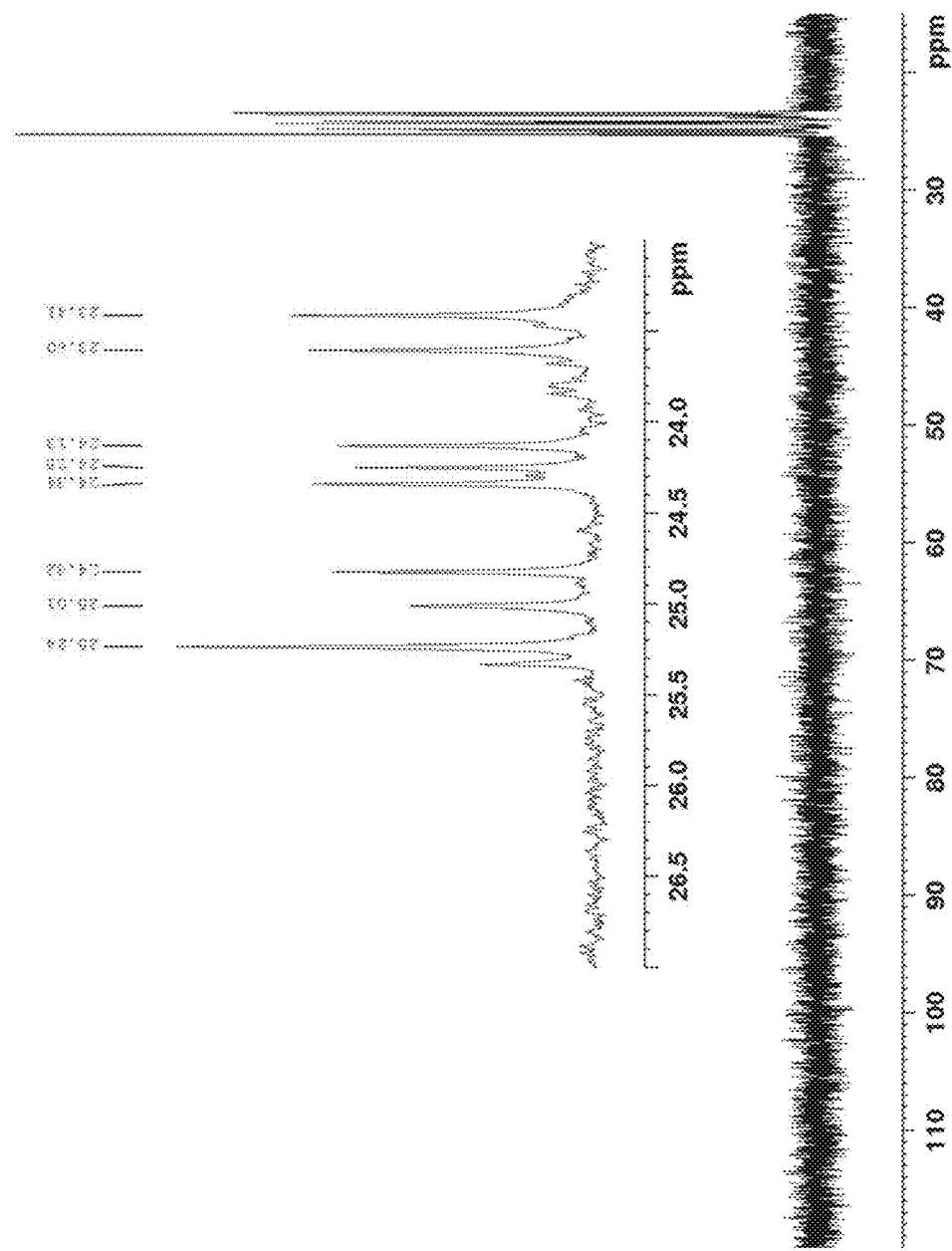
FIG. 22: shows $^{31}$P NMR spectrum of partially protected trimer 9 with S-(phenyl) protection after purification by column chromatography with zoom of relevant peaks.
Figure 23:
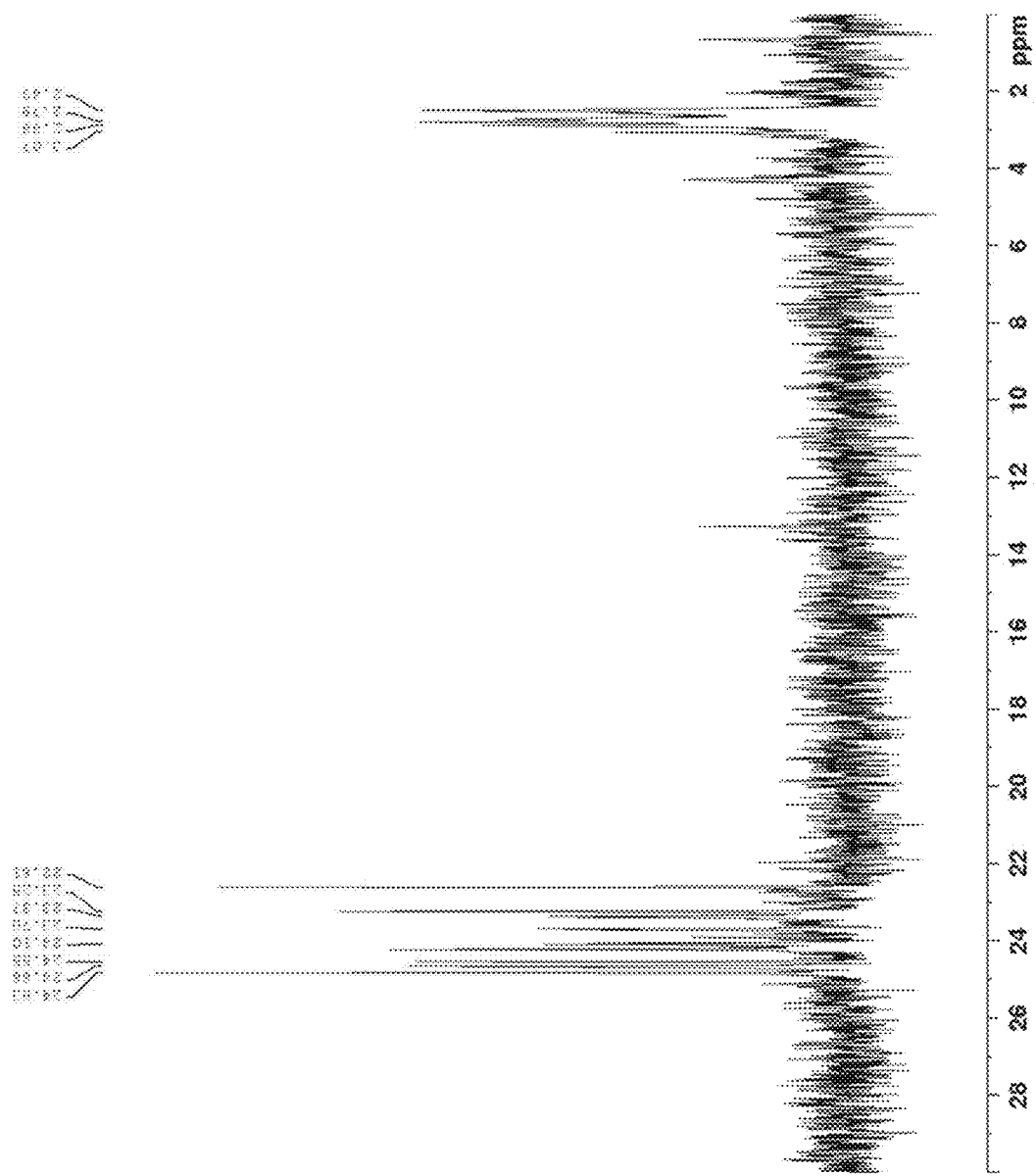
FIG. 23: shows $^{31}$P NMR spectrum of trimer H-phosphonate 10 with S-(phenyl) protection after purification by column chromatography with zoom of relevant peaks.

This "block coupling" strategy can also be applied to trimers rather than dimers as shown in Scheme 6 for the synthesis of trimer 9 (FIG. 22) with a 3'-hydroxyl component followed by treatment with DPHO to yield trimer H-phosphonate 10 (FIG. 23). The strategy described in Scheme 3 could then be used in conjunction with that in Scheme 6 to easily synthesize hexamers. Conditions are currently being optimized for synthesis of dimer and trimer H-phosphonates.

Scheme 6: Solution-phase synthesis of trimer "blocks" with 3'-H-phosphonate components.

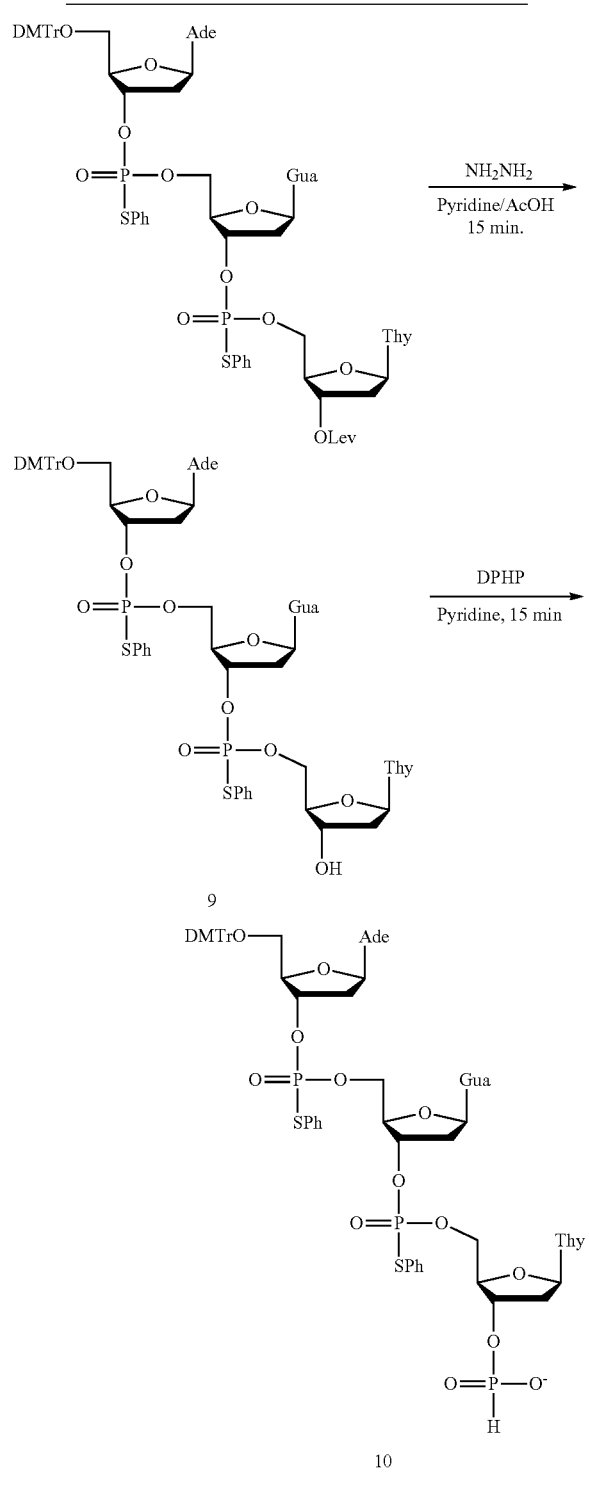

We also explored the use of a different group than thiophenyl to protect the H-phosphonate linkage. Particularly, we used N-[(2-cyanoethyl)sulfanyl]phthalimide (CSP) instead of PTP to synthesize backbones with a thio(cyanoethyl) protecting group. The cyanoethyl protecting group is widely used in traditional solid-phase DNA and RNA synthesis and is cleaved through simple treatment with ammonium hydroxide to yield the natural phosphodiester backbone of DNA and RNA.

Our strategy takes advantage of the base-labile cyanoethyl group, not to synthesize phosphodiester backbones, but to synthesize phosphorothioate backbones which are extremely important in therapeutic applications of oligonucleotides [Khvorova, A.; Watts, J. K., The chemical evolution of oligonucleotide therapies of clinical utility. *Nature biotechnology* 35, pp. 238-248 (2017)]. This strategy is outlined in Scheme 8 and uses the exact same conditions as above, except we use a different sulfur-transfer reagent to produce the thiophosphoric ester dimer with thio(cyanoethyl) protecting group instead of thiophenyl to synthesize dimer 11. The new sulfur transfer reagent, CSP, was synthesized according to the literature [Reese, C. B.; Yan, H., *Journal of the Chemical Society, Perkin Transactions* 1, pp. 2619-2633 (2002); Klose, J. et al. *Tetrahedron* 53, pp. 14411-14416 (1997)]. We can also apply the coupling strategies of Scheme 1 or Scheme 2 to this strategy to synthesize fully protected or partially protected dimers. We purified this dimer by column chromatography once again and two peaks around 27 ppm in the $^{31}$P NMR spectrum, along with HRMS, confirmed the production of the dimer 11. Efforts are currently underway to combine this strategy for phosphorothioate synthesis with the block coupling approach described above.

Scheme 8: One-step vibration ball milling strategy to synthesize partially protected thiophosphoric ester (S(cyanoethyl)) nucleic acid dimers.

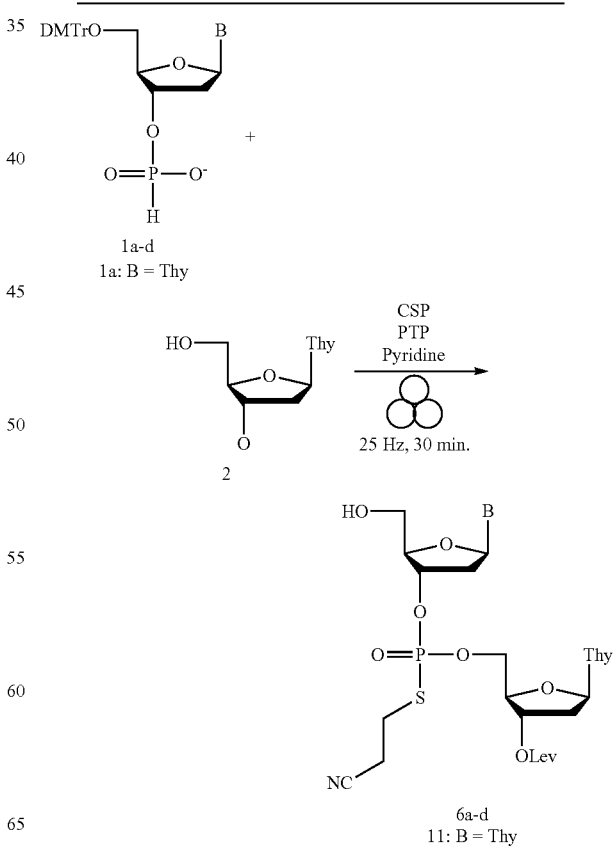

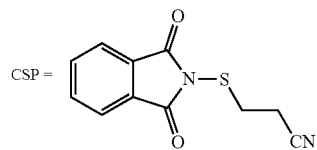

Current work is aiming at optimizing the above reactions with DNA nucleosides, but will soon include RNA and modified nucleosides with both phosphodiester and phosphorothioate backbones.

C. Synthesis of Oligonucleotides Via the Phosphoramidite Chemistry.

In addition to the H-phosphonate chemistry described above, we have also explored the use of phosphoramidite chemistry for mechanochemical reactions. Initial efforts were focused on the coupling of nucleosides 3'-phosphoramidites with the 5'-hydroxyl of a 3'-protected nucleoside. This was demonstrated by the synthesis of phosphite triester DNA dimers 14a-d by coupling of nucleoside 13 with an excess of an excess of phosphoramidites 12a-d in the presence of 5-ethylthio-1H-tetrazole (ETT) (ball milling at 30 Hz, 30 min) (Scheme 9). In addition to the desired products, we observed formation of H-phosphonate byproducts resulting from hydrolysis of excess 12a-d used in these reactions. Purification of the crude material by silica gel column chromatography provided 14a-d in high yields. When 14a was prepared using alternative activators such as 5-benzylthio-1H-tetrazole (BTT) or 4,5-dicyano-imidazole (DCI) instead of ETT, similar results where obtained. All phosphite triester display the expected chemical shifts (139-141 ppm) in the $^{31}$P-NMR spectra (FIGS. 25-28).

Scheme 8: Vibration ball milling synthesis of phosphite triester DNA dimers.

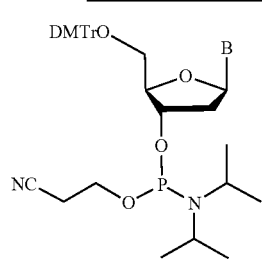

12a: B = Thy
12b: B = Cyt(Bz)
12c: B = Gua(iBu)
12d: B = Ade(Bz)

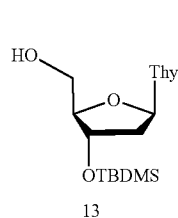

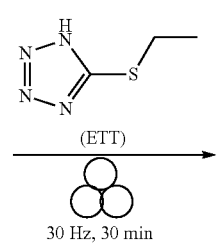

30 Hz, 30 min

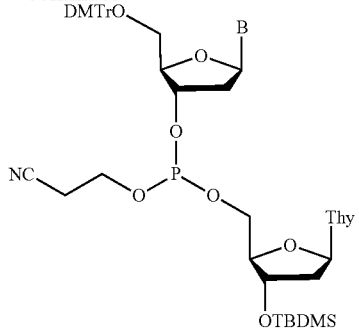

14a: B = Thy
14b: B = Cyt(Bz)
14c: B = Gua(iBu)
14d: B = Ade(Bz)

Figure 29:
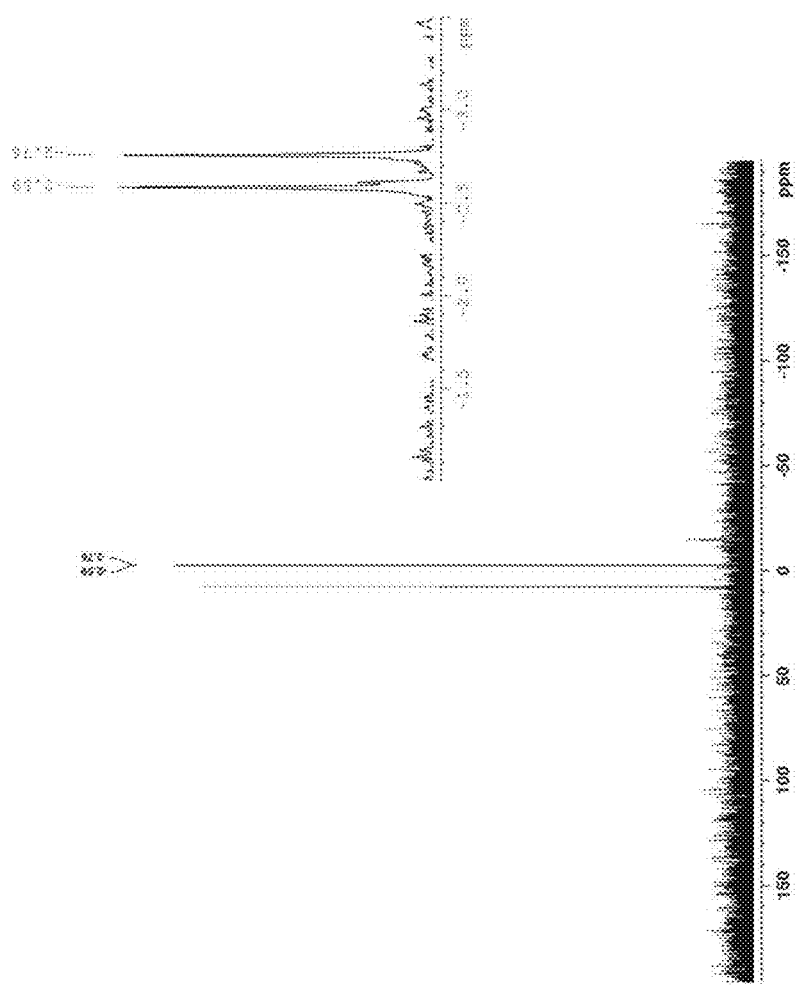
FIG. 29: shows crude $^{31}$P NMR spectrum of fully protected phosphate triester 15a with zoom of relevant peaks.

Given the general instability of phosphite triesters, coupling and oxidation steps were attempted in situ (i.e., without isolation of the phosphite triester intermediate) as shown in Scheme 9. This was carried out by first coupling 12a to 13 using vibrational ball milling (30 min), followed by oxidation by treatment of the resulting phosphite triester intermediate (14a) with iodine (1 eq), water (2 eq), and pyridine (2 eq) for 20 min. The $^{31}$P NMR of the crude mixture indicated formation of the desired phosphate (P(V)) triester 15a as a pair of diastereomers (−2.59 and −2.76 ppm) and hydrolyzed 12a (phosphonate peaks at 7.36 and 7.41 ppm) with no starting material (12a) present (FIG. 29). The oxidation reaction proceeded significantly more slowly when pyridine was replaced with alternate bases such as 4-dimethylaminopyridine (DMAP) or imidazole.

Scheme 9: In situ coupling and oxidation (or sulfurization) of phosphite triester DNA dimers by vibrational ball milling.

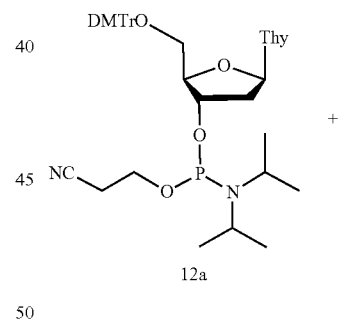

12a

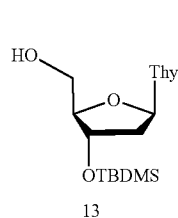

i) ETT, 30 Hz, 30 min, ii) I$_2$, H$_2$O, Pyridine,
30 min, 30 Hz
or
Sulfurizing reagent,
40 min, 30 Hz

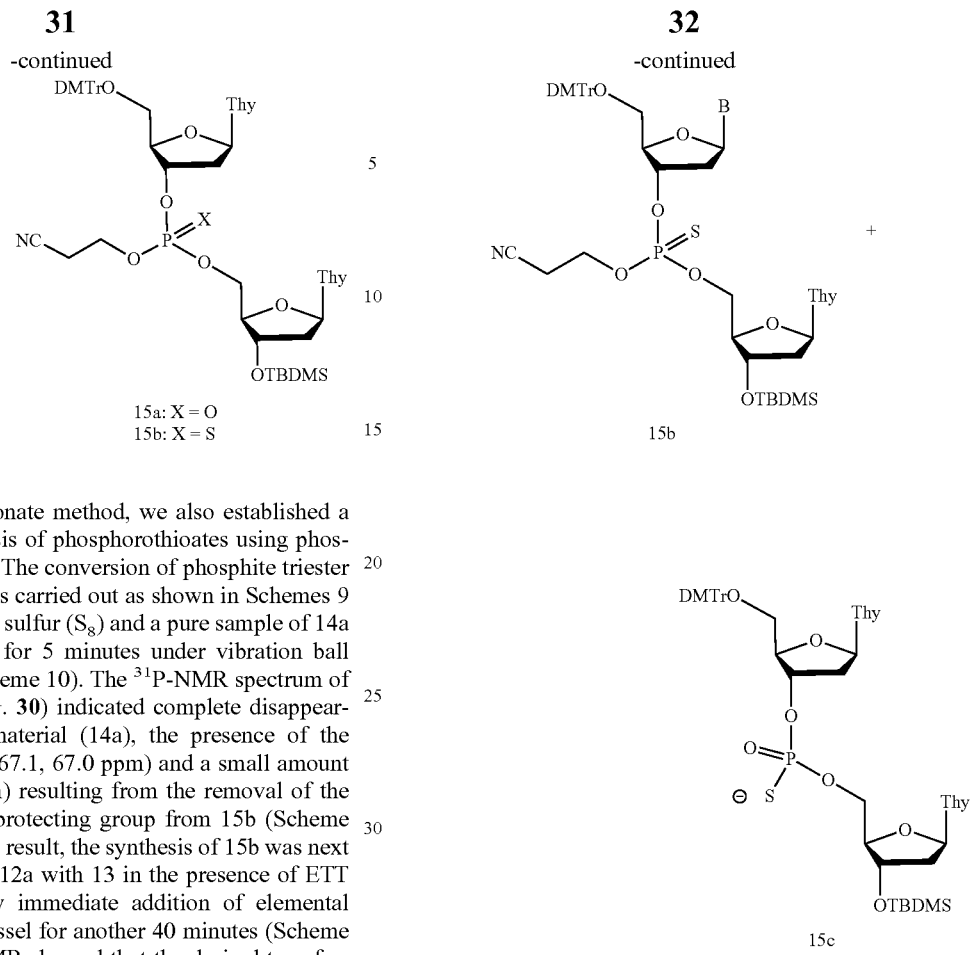

15a: X = O
15b: X = S

15b

15c

Figure 30:
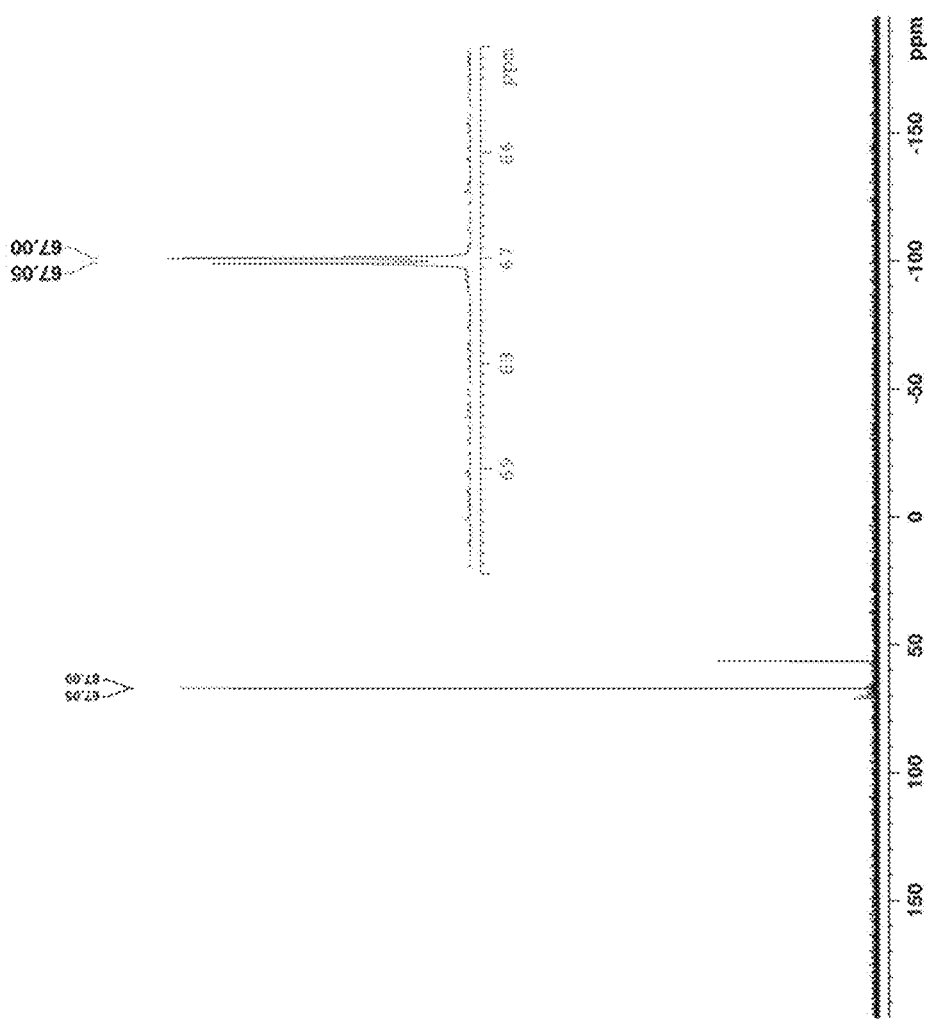
FIG. 30: shows crude $^{31}$P NMR spectrum of 15b by reaction of 14a with $S_8$ with zoom of relevant peaks.
Figure 31:
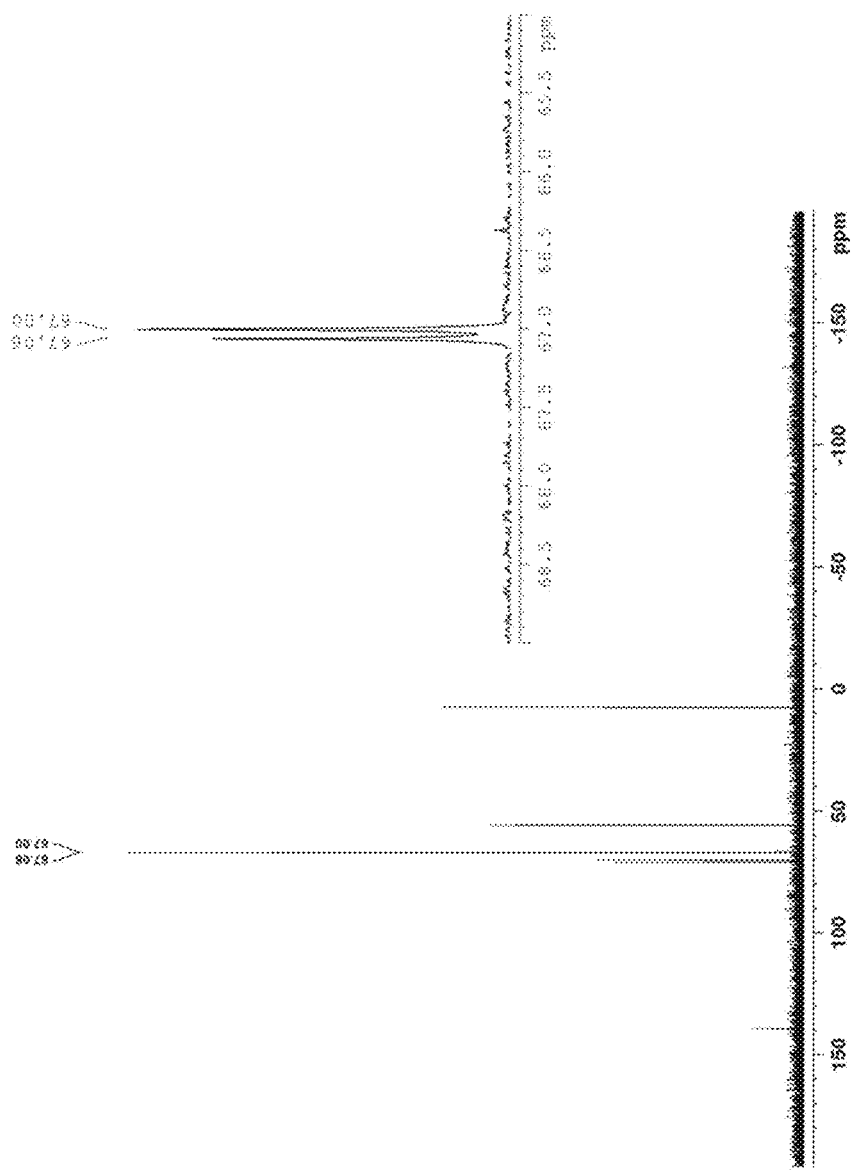
FIG. 31: shows crude $^{31}$P NMR spectrum of 15b by reaction 12a with 13 followed by in situ sulfurization with $S_8$ with zoom of relevant peaks.

As in the H-phosphonate method, we also established a strategy for the synthesis of phosphorothioates using phosphoramidite chemistry. The conversion of phosphite triester to phosphorothioate was carried out as shown in Schemes 9 and 10. First, elemental sulfur ($S_8$) and a pure sample of 14a were allowed to react for 5 minutes under vibration ball milling conditions (Scheme 10). The $^{31}$P-NMR spectrum of the crude product (FIG. 30) indicated complete disappearance of the starting material (14a), the presence of the expected product 15b (67.1, 67.0 ppm) and a small amount of 15c (55.6, 55.8 ppm) resulting from the removal of the cyanoethyl phosphate protecting group from 15b (Scheme 10). Encouraged by this result, the synthesis of 15b was next attempted by coupling 12a with 13 in the presence of ETT (30 min), followed by immediate addition of elemental sulfur to the milling vessel for another 40 minutes (Scheme 9). Analysis by $^{31}$P-NMR showed that the desired transformations had taken place (FIG. 31). The crude material contained mainly the desired sulfurized products [15b (55%) and 15c (21%)], and small amounts of unreacted 12a (2%) and byproducts resulting from the sulfurization (70.1, 70.9 ppm; 19%) and hydrolysis (7.38, 7.41 ppm; 3%) of the excess starting material 12a used. Other common sulfurizing reagents such as 3-[(Dimethylaminomethylene)amino]-3H-1,2,4-dithiazole-5-thione (DDTT), and 3H-1,2-benzodithiol-3-one 1,1-dioxide (popularly known as Beaucage Reagent) were not as efficient or clean as elemental sulfur.

The final step in the standard oligonucleotide synthesis cycle is the removal of the 5'-DMTr protecting group using antacid. To replicate this using mechanochemistry, 14a was again prepared by reacting 12a and 13 in the presence of ETT (Scheme 11), followed by in situ oxidation ($I_2$/water/py, 20 min), and finally addition of trichloroacetic acid (TCA, 2 eq) in methanol (4 eq, 20 µl). The resulting mixture was reacted for an additional 20 minutes at 30 Hz. The addition of methanol is necessary to quench the DMTr-cation, pushing the desired reaction to completion. The desired dimer 16 was isolated in 60% yield after purification.

Scheme 10: Sulfurization of phophite triester DNA dimers by vibrational ball milling.

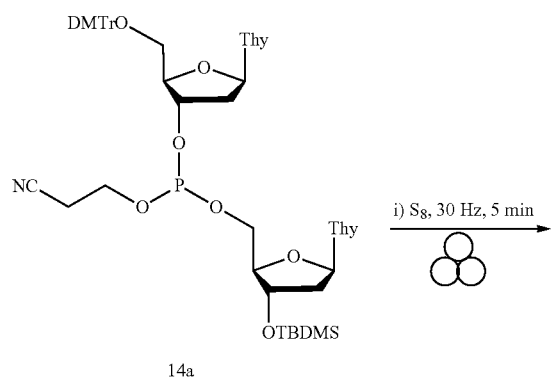

14a i) $S_8$, 30 Hz, 5 min

Scheme 11: In situ coupling, oxidation and detritylation by vibrational ball milling.

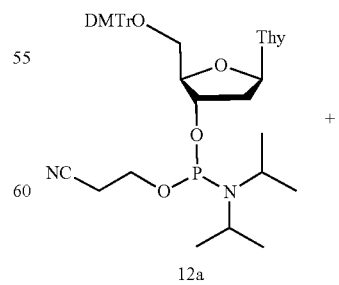

12a

+

-continued

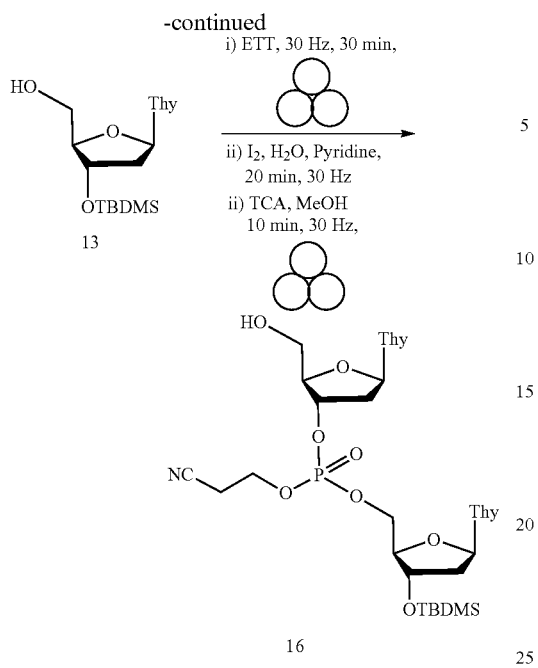

Figure 4:
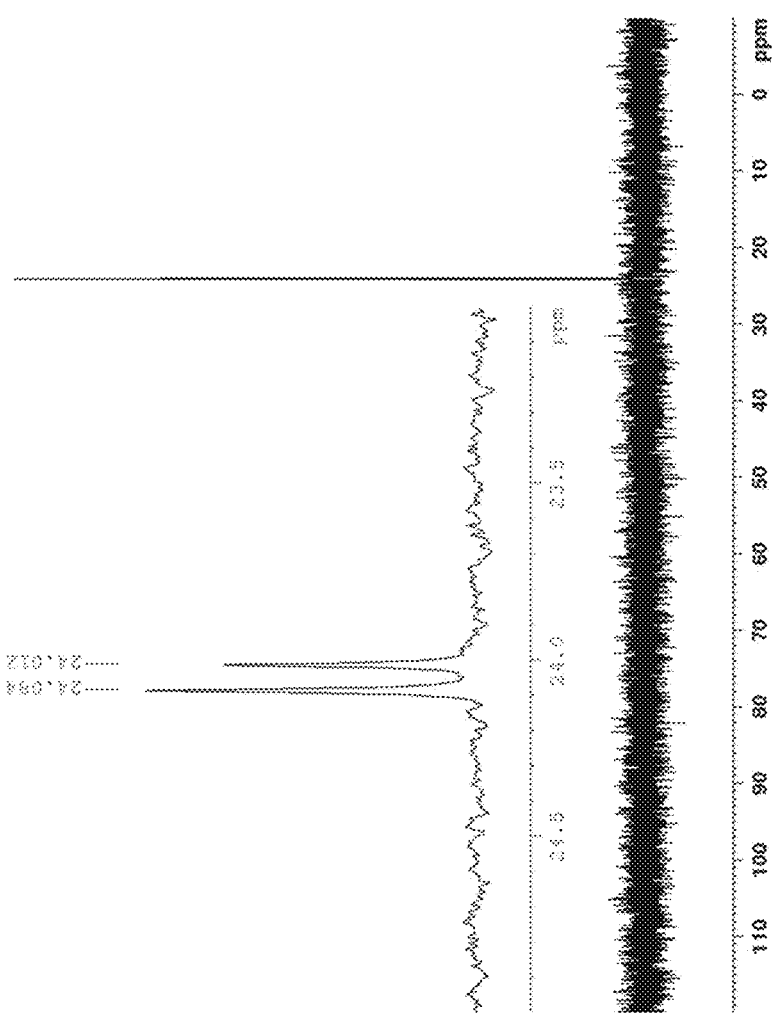
FIG. 4: shows $^{31}$P NMR spectrum of fully protected dimer 3a with S-(phenyl) protection after purification by column chromatography with zoom of relevant peaks.
Figure 5:
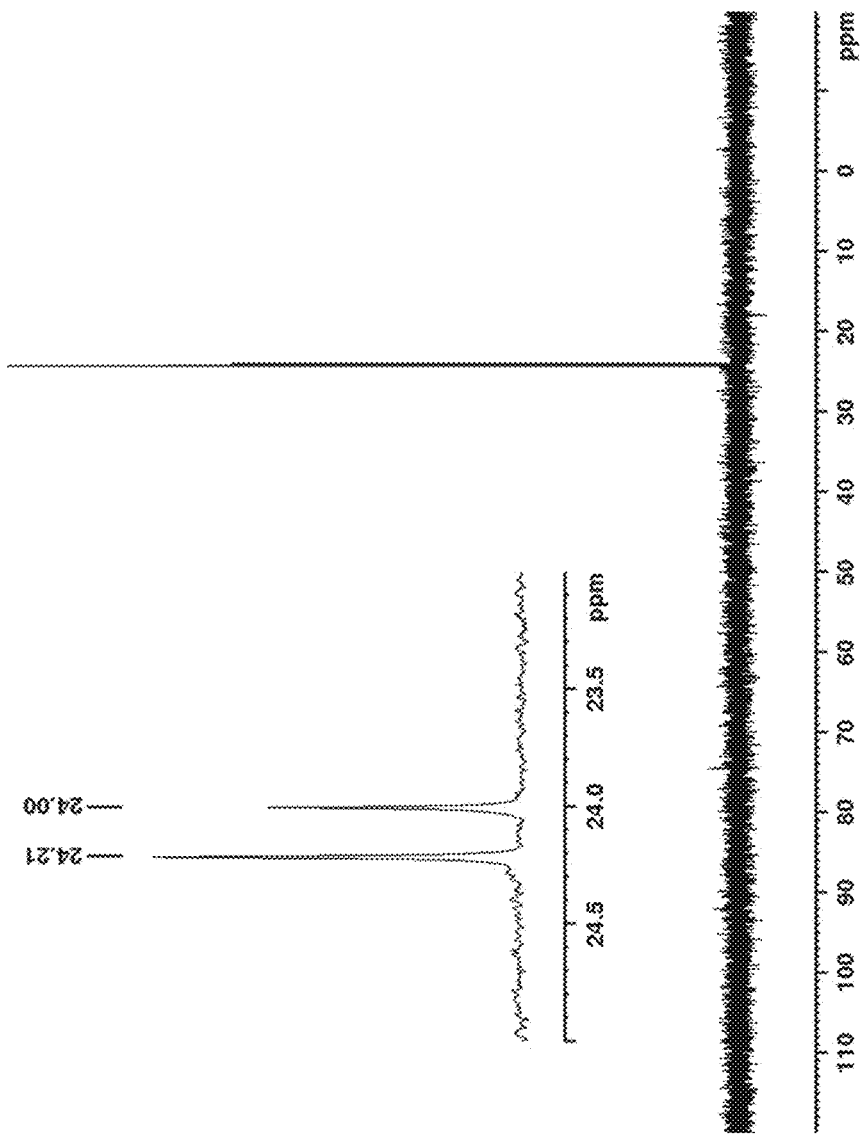
FIG. 5: shows $^{31}$P NMR spectrum of fully protected dimer 3b with S-(phenyl) protection after purification by column chromatography with zoom of relevant peaks.
Figure 6:
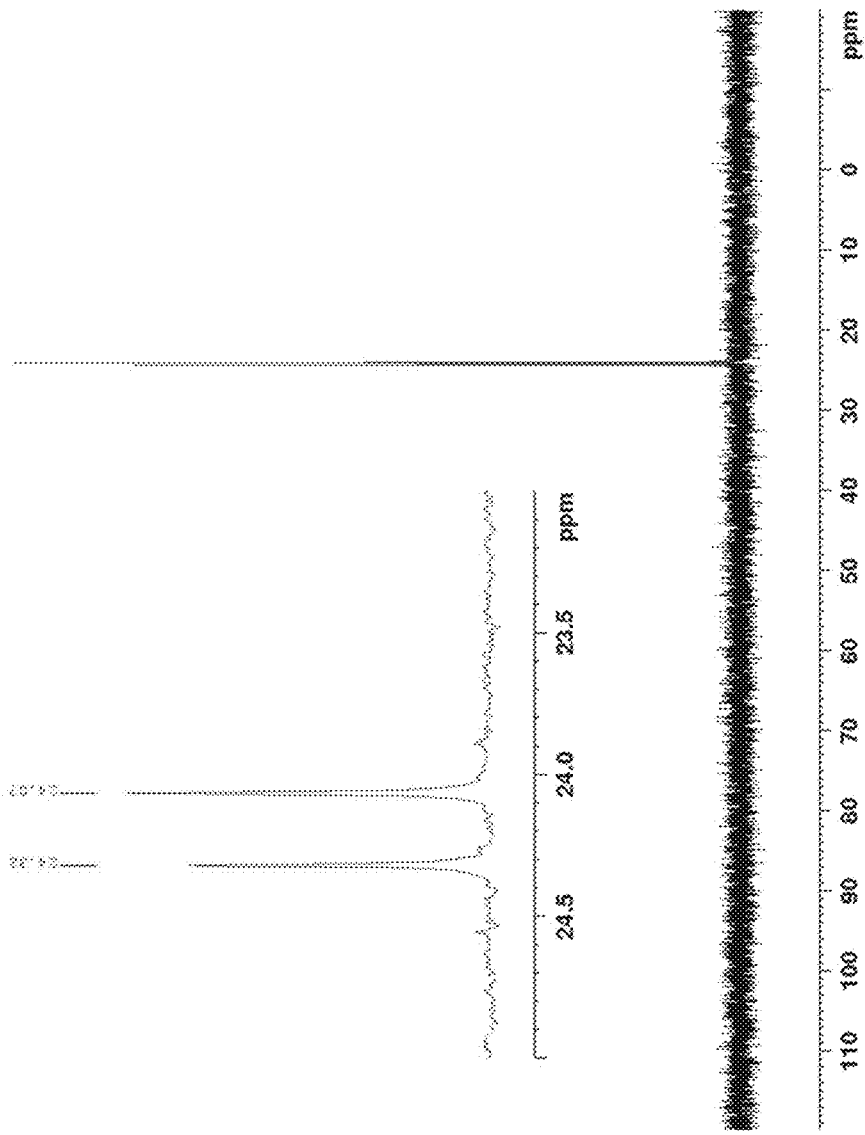
FIG. 6: shows $^{31}$P NMR spectrum of fully protected dimer 3c with S-(phenyl) protection after purification by column chromatography with zoom of relevant peaks.
Figure 7:
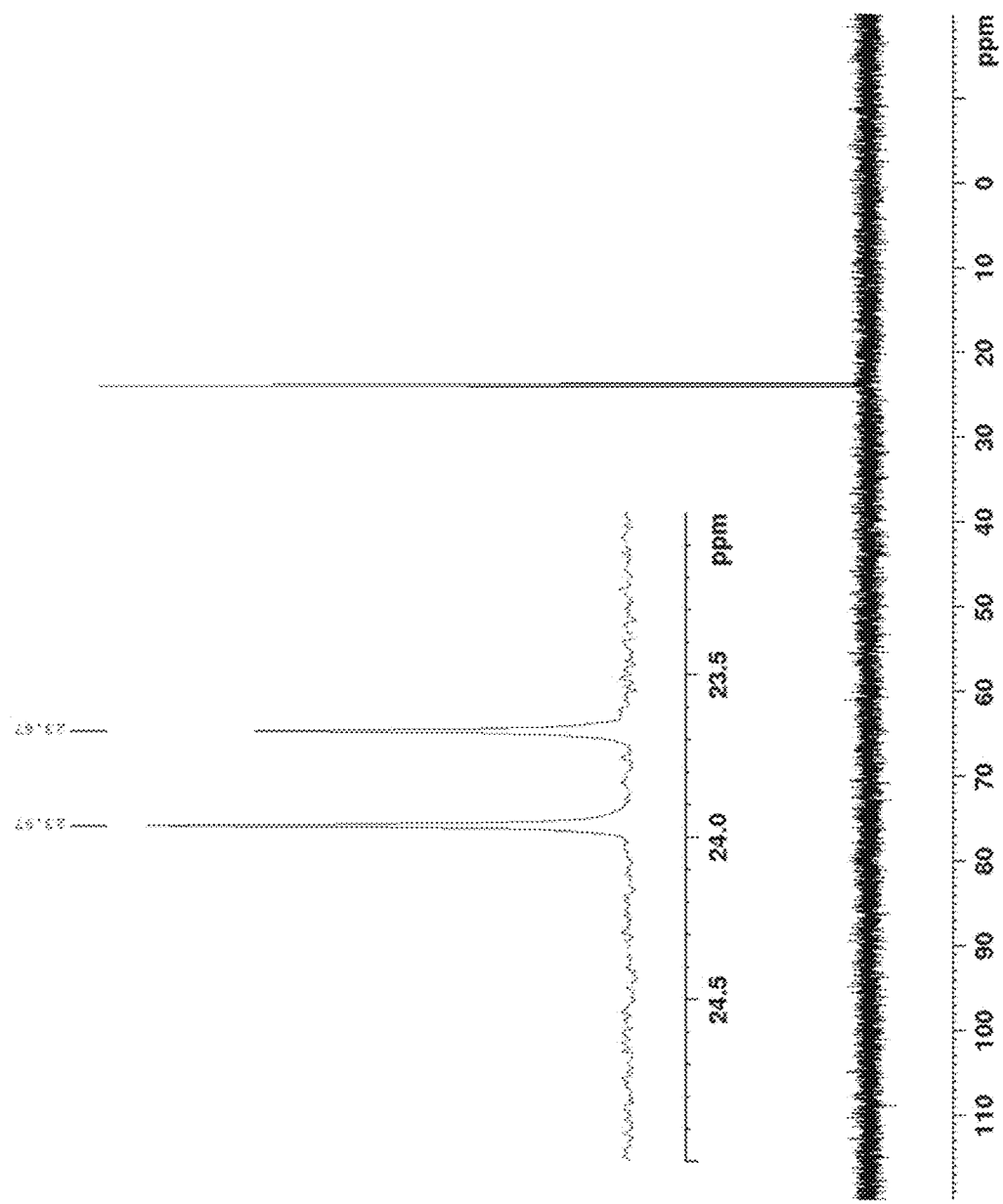
FIG. 7: shows $^{31}$P NMR spectrum fully protected dimer 3d with S-(phenyl) protection after purification by column chromatography with zoom of relevant peaks.

Example 1. Three-Step One Pot Synthesis of Fully-Protected Dinucleoside Thiophenyl Phosphoric Esters a) DMTrO-Tp(SPh)T-OLev 3a (B=Thy). A 30 mL stainless steel milling jar was charged with a 10 mm stainless steel milling ball, 1a (212 mg, 0.3 mmol) and 2 (102 mg, 0.3 mmol) and dried under high vacuum for a minimum of 1 hour. N-(phenylthiol)phthalimide (84 mg, 0.33 mmol) and adamantane carbonyl chloride (298 mg, 1.5 mmol) were also dried in a separate vials under high vacuum for a minimum of 1 hour. After drying, adamantane carbonyl chloride and pyridine (0.240 mL, 3.0 mmol) were added sequentially to the milling jar and allowed to react on a vibration ball mill at 25 Hz for 15 minutes. N-(phenylthiol)phthalimide and pyridine (0.120 mL, 1.5 mmol) were added sequentially to the milling jar and were allowed to react on a vibration ball mill at 25 Hz for another 15 minutes. After the reaction was complete, an off-white paste was obtained and was taken up in DCM and evaporated under reduced pressure. The resulting oil was taken up in a small amount of DCM and precipitated from a stirring mixture of cold 1:1 (v/v) hexanes and diethyl ether to yield a fine white precipitate. The mixture was filtered over Celite then taken up in DCM and evaporated under reduced pressure. The crude mixture was purified on a short silica gel column using DCM-MeOH as the eluent (gradient: 99:1-97:3 v/v). The appropriate fractions were combined and concentrated under reduced pressure to yield 3a as a white solid (178.0 mg, 57.1%). HRMS calc. [M+Na]=1061.3014. HRMS [M+Na]=1061.3052. $^{31}$P-NMR $\delta_P$ (CDCl$_3$) 24.01, 24.08 (FIG. 4).

b) DMTrO-Cp (SPh) T-OLev 3b (C=Cyt$^{Bz}$). This compound was prepared from 1b (240 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 3b as a white solid (172 mg, 51%) HRMS calc. [M+Na]=1150.3280. HRMS found [M+Na]=1150.3258. $^{31}$P-NMR $\delta_P$ (CDCl$_3$) 24.00, 24.21 (FIG. 5).

c) DMTrO-Gp (SPh) T-OLev 3c (B=Gua$^{iBu}$). This compound was prepared from 1c (241 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 3c as a white solid (128 mg, 51%) HRMS calc. [M+H]=1156.3498. HRMS found [M+H]=1156.3483. $^{31}$P-NMR $\delta_P$ (CDCl$_3$) 24.07, 24.32 (FIG. 6).

d) DMTrO-Ap (SPh) T-OLev 3d (B=Ade$^{Bz}$). This compound was prepared from 1d (247 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 3d as a white solid (217 mg, 63%) HRMS calc. [M+H]=1152.3573. HRMS found [M+H]1152.3571. $^{31}$P-NMR $\delta_P$(CDCl$_3$) 23.67, 23.97 (FIG. 7).

Figure 8:
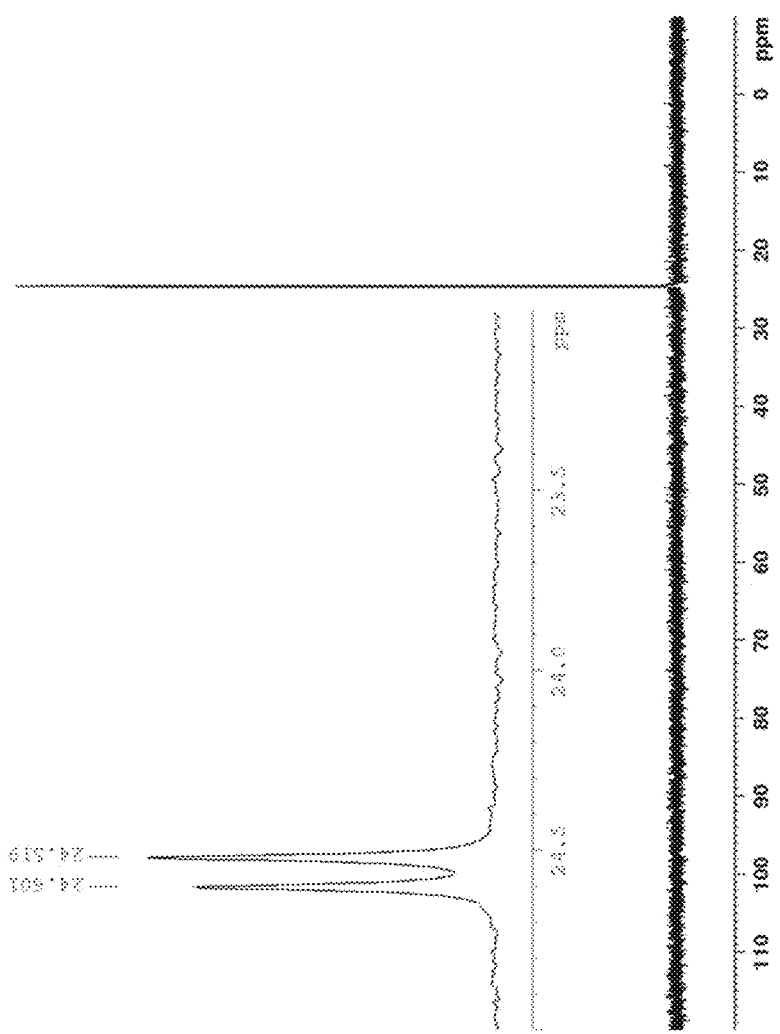
FIG. 8: shows $^{31}$P NMR spectrum of partially protected dimer 4a with S-(phenyl) protection after purification by column chromatography with zoom of relevant peaks.
Figure 9:
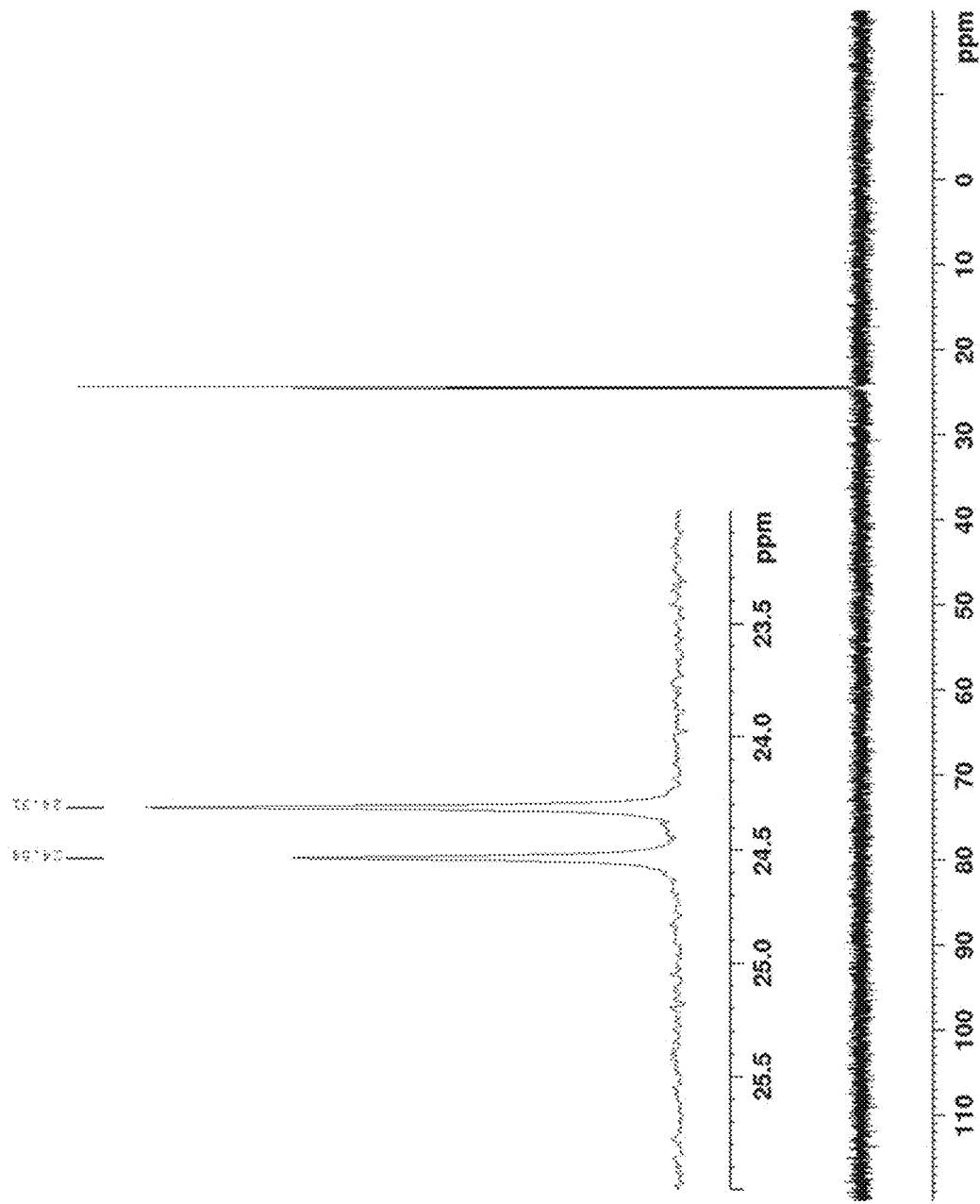
FIG. 9: shows $^{31}$P NMR spectrum of partially protected dimer 4b with S-(phenyl) protection after purification by column chromatography with zoom of relevant peaks.
Figure 10:
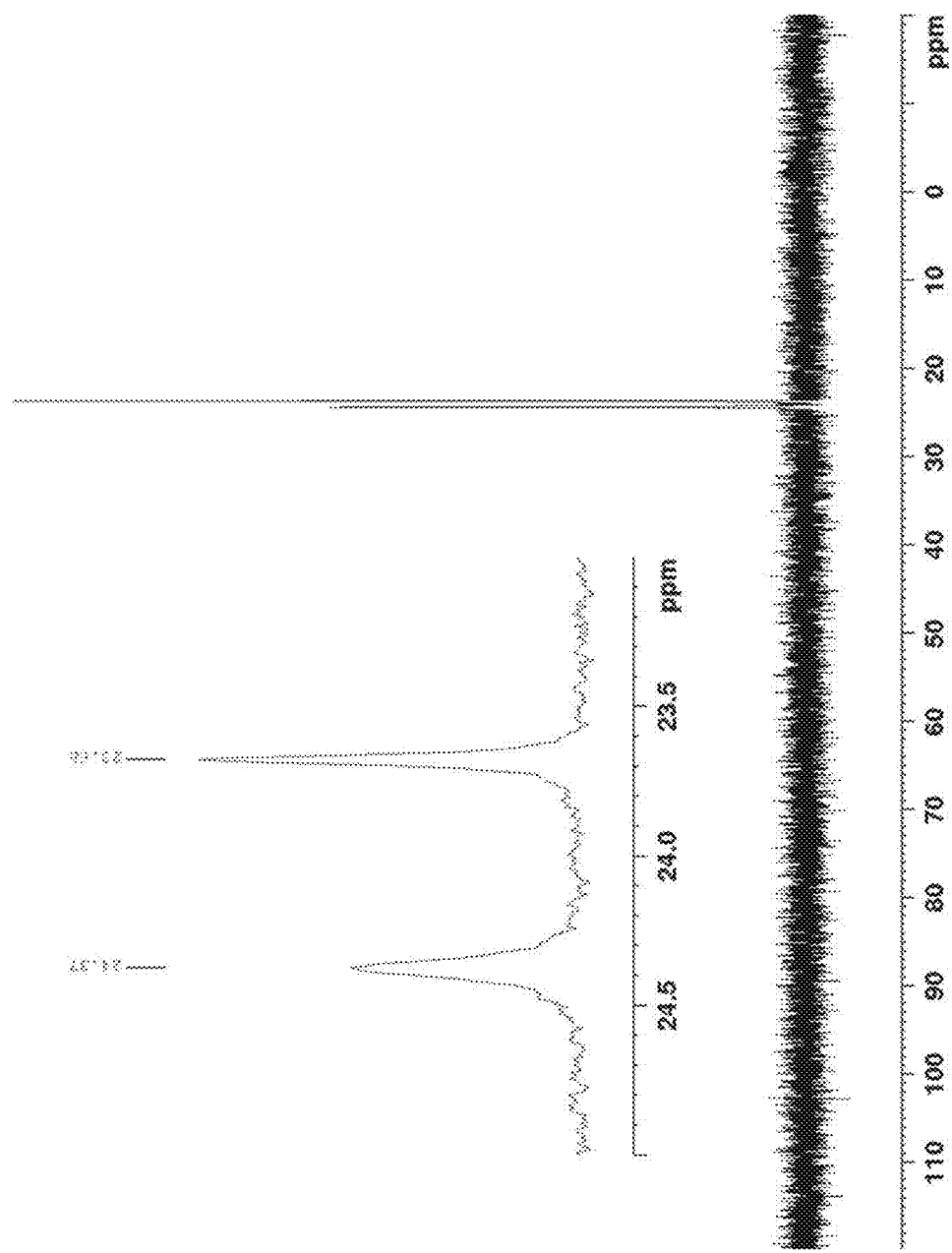
FIG. 10: shows $^{31}$P NMR spectrum of partially protected dimer 4c with S-(phenyl) protection after purification by column chromatography with zoom of relevant peaks.
Figure 11:
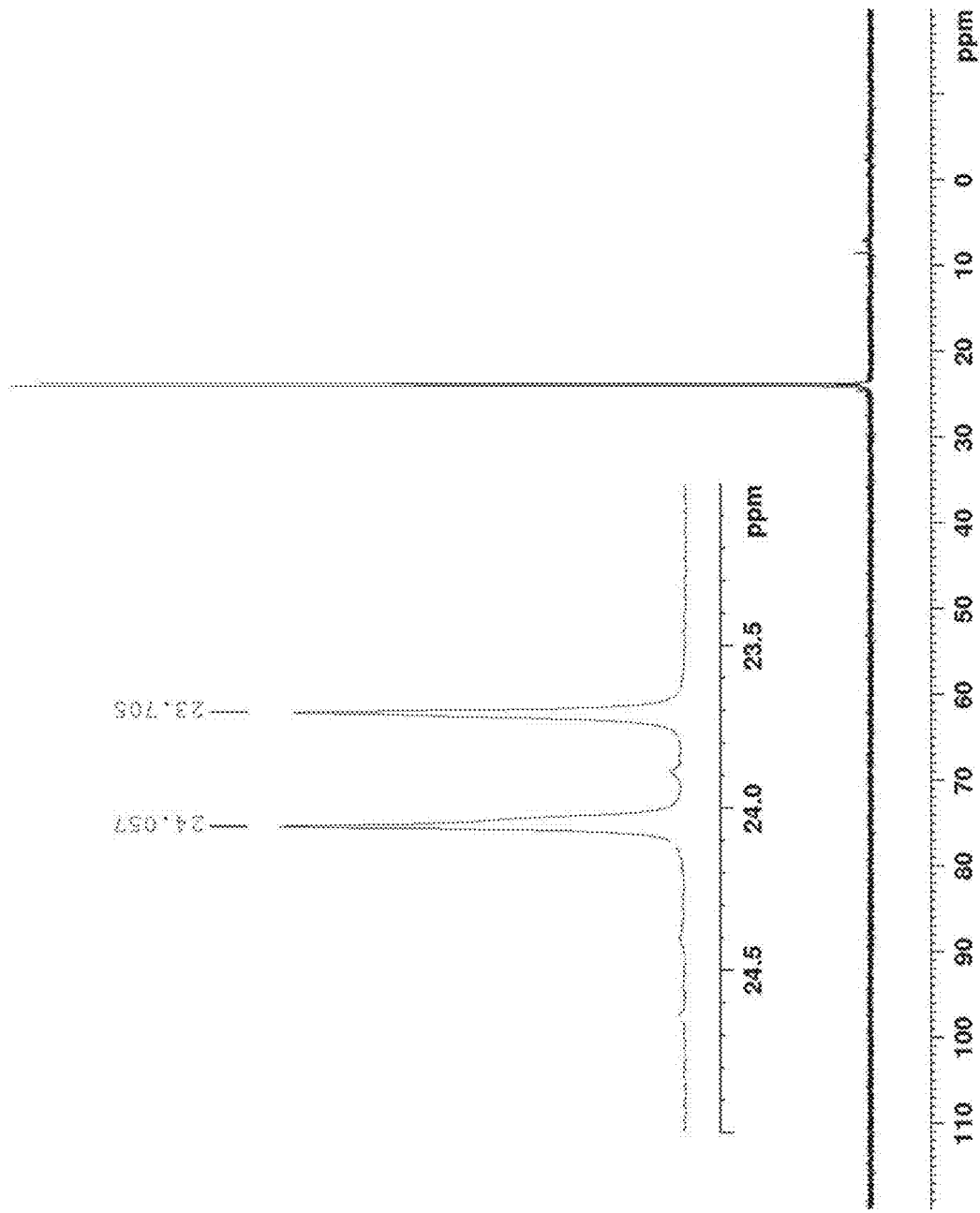
FIG. 11: shows $^{31}$P NMR spectrum of partially protected dimer 4d with S-(phenyl) protection after purification by column chromatography with zoom of relevant peaks.

Example 2. Three-Step One-Pot Synthesis of Partially-Protected Dinucleoside Thiophenyl Phosphoric Esters a) HO-Tp(SPh) T-OLev 4a (B=Thy). A 10 mL stainless steel milling jar was charged with a 10 mm stainless steel milling ball, 1a (212 mg, 0.3 mmol) and 2 (102 mg, 0.3 mmol) and dried under high vacuum for a minimum of 1 hour. N-(phenylthiol)phthalimide (84 mg, 0.33 mmol) was also dried in a separate vial under high vacuum for a minimum of 1 hour. After drying, N-(phenylthiol)phthalimide, pyridine (0.120 mL, 1.5 mmol) and diphenyl phosphoryl chloride (0.311 mL, 1.5 mmol) were added sequentially to the milling jar and allowed to react on a vibration ball mill at 25 Hz for 30 minutes. After the reaction was complete, an off-white paste was obtained and was taken up in DCM and evaporated under reduced pressure. The resulting oil was taken up in a small amount of DCM and precipitated from a stirring mixture of cold 1:1 (v/v) hexanes and diethyl ether to yield a fine white precipitate. The mixture was filtered over Celite then taken up in DCM and evaporated under reduced pressure. The crude mixture was purified on a short silica gel column using DCM-MeOH as the eluent (gradient: 99:1-95:5 v/v). The appropriate fractions were combined and concentrated under reduced pressure to yield 4a as a white solid (143 mg, 65%). HRMS calc. [M+Na]=759.1708. HRMS found [M+Na]=759.1723. $^{31}$P-NMR $\delta_P$ (CDCl$_3$) 24.52, 24.60 (FIG. 8).

b) HO-Cp (SPh) T-OLev 4b (C=Cyt$^{Bz}$). This compound was prepared from 1b (240 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 4b as a white solid (102 mg, 41%) HRMS calc. [M+Na]=848.1973. HRMS found [M+Na]=848.1959. $^{31}$P-NMR δ$_P$ (CDCl$_3$) 24.31, 24.54. (FIG. 9)

c) HO-Gp (SPh) T-OLev 4c (B=Gua$^{iBu}$). This compound was prepared from 1c (241 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 4c as a white solid (128 mg, 51%) HRMS calc. [M+H]=832.2372. HRMS found [M+H]=832.2347. $^{31}$P-NMR δ$_P$(CDCl$_3$) 23.68, 24.37. (FIG. 10)

d) HO-Ap (SPh) T-OLev 4d (B=Ade$^{Bz}$). This compound was prepared from 1d (247 mg, 0.3 mmol) and 2 following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 4d as a white solid (154 mg, 60%) HRMS calc. [M+H]=850.2266. HRMS found [M+H]850.2253. $^{31}$P-NMR δ$_P$ (CDCl$_3$) 23.71, 24.06. (FIG. 11)

Figure 12:
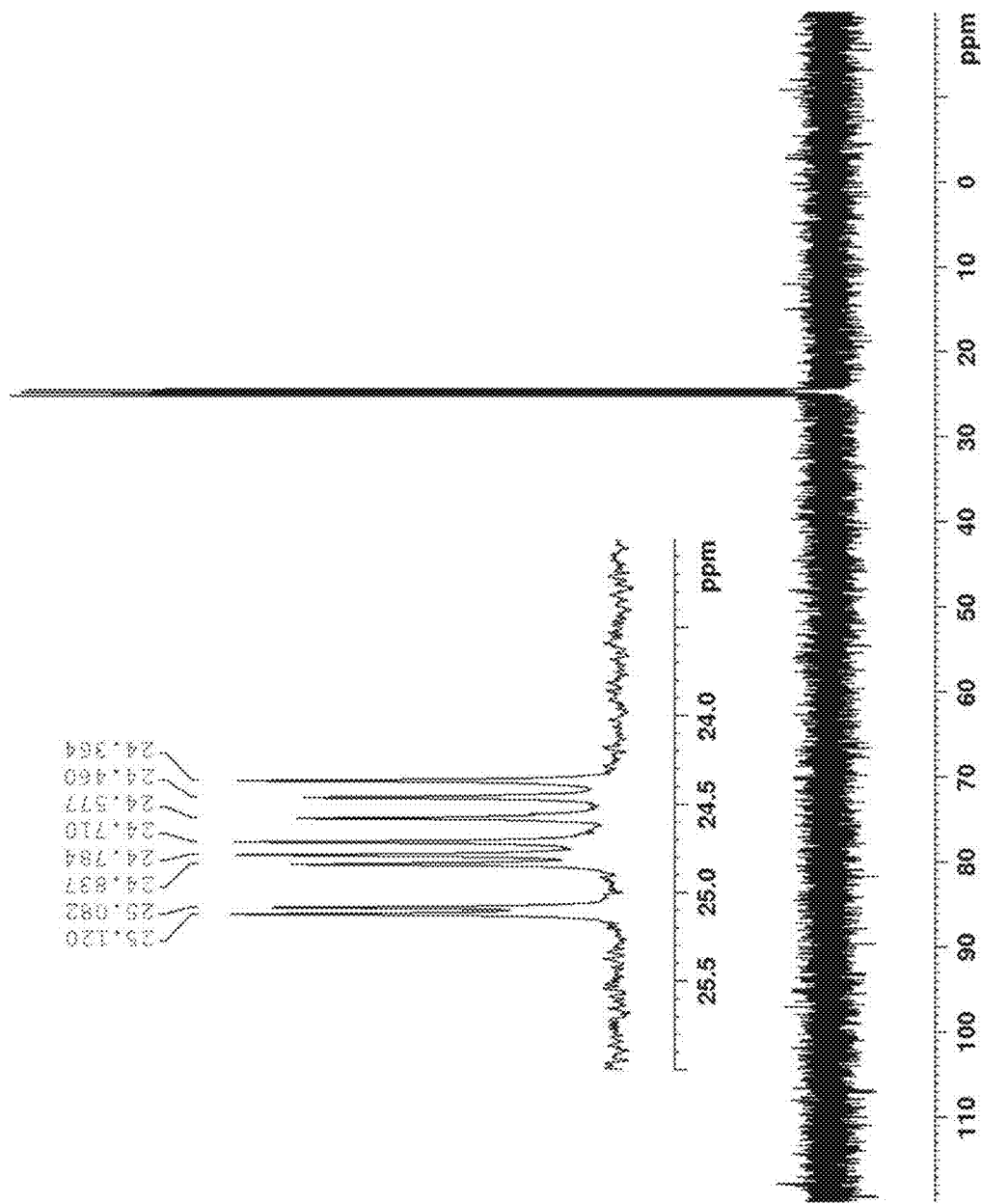
FIG. 12: shows $^{31}$P NMR spectrum of partially protected trimer 5 with S-(phenyl) protection after purification by column chromatography with zoom of relevant peaks.

Example 3. Three-Step One-Pot Synthesis of a Partially-Protected Trinucleoside Thiophenyl Phosphoric Ester HO-Tp(SPh)Tp(SPh)T-OLev 5 (B=Thy). A 10 mL stainless steel milling jar was charged with 3a (84 mg, 0.114 mmol) and 1a (81 mg, 0.114 mmol) and dried under high vacuum for a minimum of 1 hour. N-(phenylthiol)phthalimide (32 mg, 0.126 mmol) was also dried in a separate vial under high vacuum for a minimum of 1 hour. After drying, N-(phenylthiol)phthalimide, pyridine (46 µL, 0.572 mmol) and diphenyl phosphoryl chloride (0.119 mL, 0.572 mmol) were added sequentially to the milling jar and allowed to react on a vibration ball mill at 25 Hz for 30 minutes. After the reaction was complete, an off-white paste was obtained and was taken up in DCM and evaporated under reduced pressure. The resulting oil was taken up in a small amount of DCM and precipitated from a stirring mixture of cold 1:1 (v/v) hexanes and diethyl ether to yield a fine white precipitate. The mixture was filtered over Celite and the precipitate was taken up in DCM and evaporated under reduced pressure. The crude mixture was purified on a short silica gel column using DCM-MeOH as the eluent (gradient: 99:1-95:5 v/v). The appropriate fractions were combined and concentrated under reduced pressure to yield 5 as a white solid (83 mg, 64%). HRMS calc. [M+Na]=1155.2253. HRMS found [M+Na]=1155.2250. $^{31}$P-NMR δ$_P$(CDCl$_3$) 24.36, 24.46, 24.58, 24.71, 24.78, 24.84, 25.08, 25.12 (FIG. 12).

Example 4. Solution-Phase Detritylation of Dinucleoside Thiophosphoric Esters

Dinucleoside (3a-d) was dissolved in a small amount of DCM (~10 mL) and MeOH (~5 mL). While stirring, TFA (10 eq.) was added. The mixture was stirred at room temperature for 30 minutes until completion of the reaction by TLC analysis. If after 30 minutes, the reaction was not complete a further portion of TFA (10 eq) was added and the reaction was stirred for a further period of 10 minutes. The reaction mixture was then partitioned between saturated NaHCO$_3$ (30 mL) and washed once more with saturated NaHCO$_3$ (30 mL) and once with brine (30 mL). Combined aqueous layers were back-extracted with DCM (60 mL). The combined organic layers were dried over Na$_2$SO$_4$ and concentrated under reduced pressure. The resulting residue was purified on a short silica gel column using DCM-MeOH as the eluent (gradient: 99:1-95:5 v/v). The appropriate fractions were combined and concentrated under reduced pressure to yield compounds 4a-d as white solids in high yields (90-95%). These compounds were the exact same as those prepared in Example 2.

Figure 13:
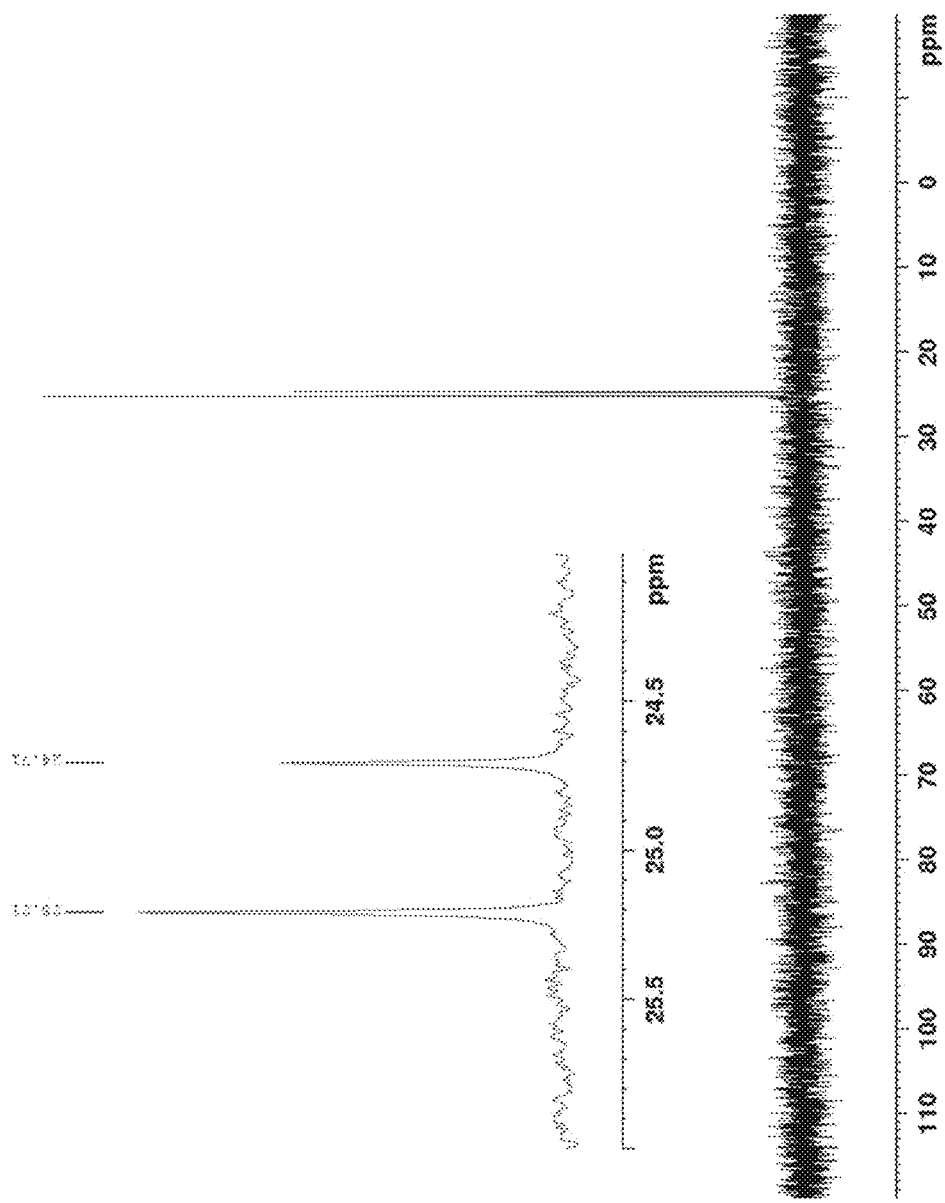
FIG. 13: shows $^{31}$P NMR spectrum of partially protected dimer 6a with S-(phenyl) protection after purification by column chromatography with zoom of relevant peaks.
Figure 14:
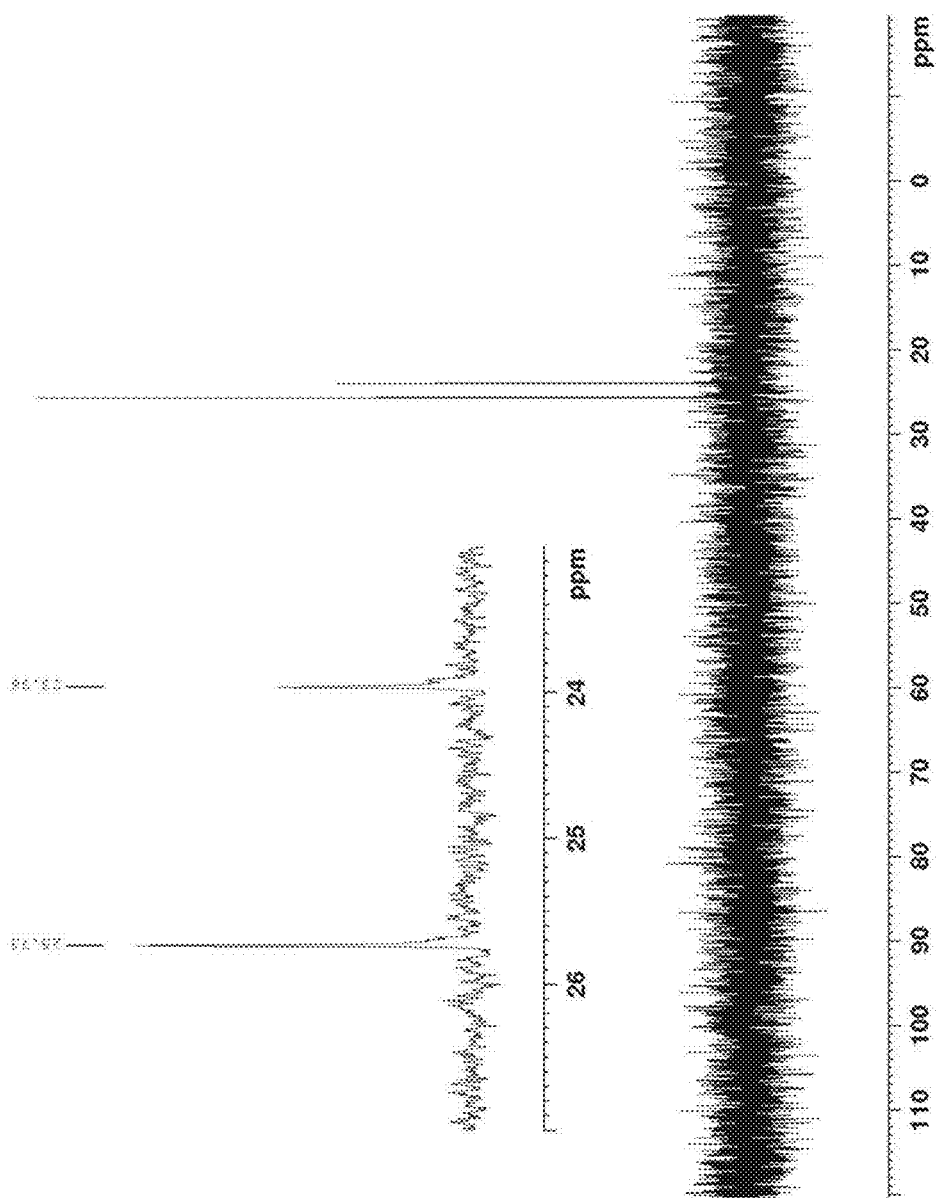
FIG. 14: shows $^{31}$P NMR spectrum of partially protected dimer 6b with S-(phenyl) protection after purification by column chromatography with zoom of relevant peaks.
Figure 15:
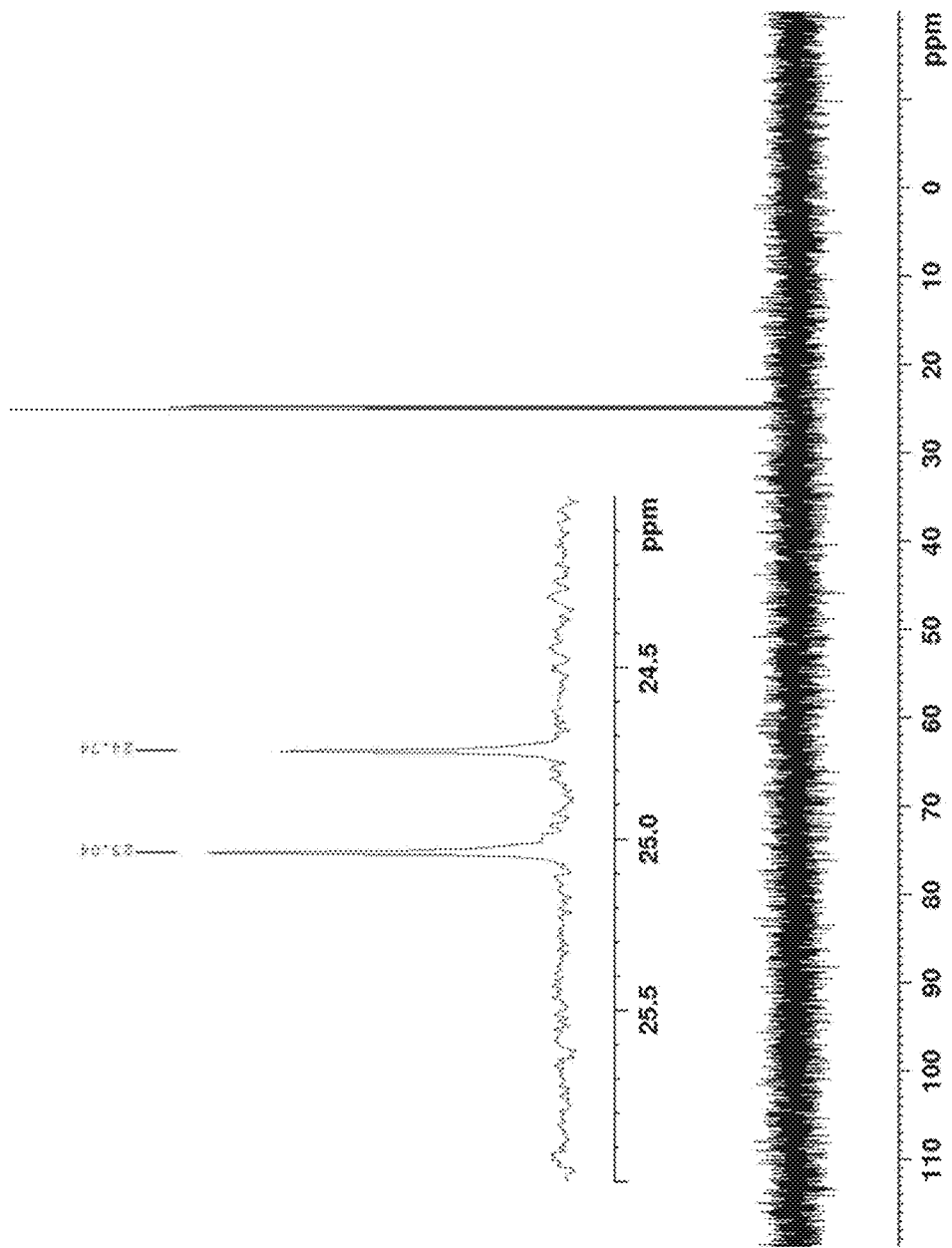
FIG. 15: shows $^{31}$P NMR spectrum of partially protected dimer 6c with S-(phenyl) protection after purification by column chromatography with zoom of relevant peaks.
Figure 16:
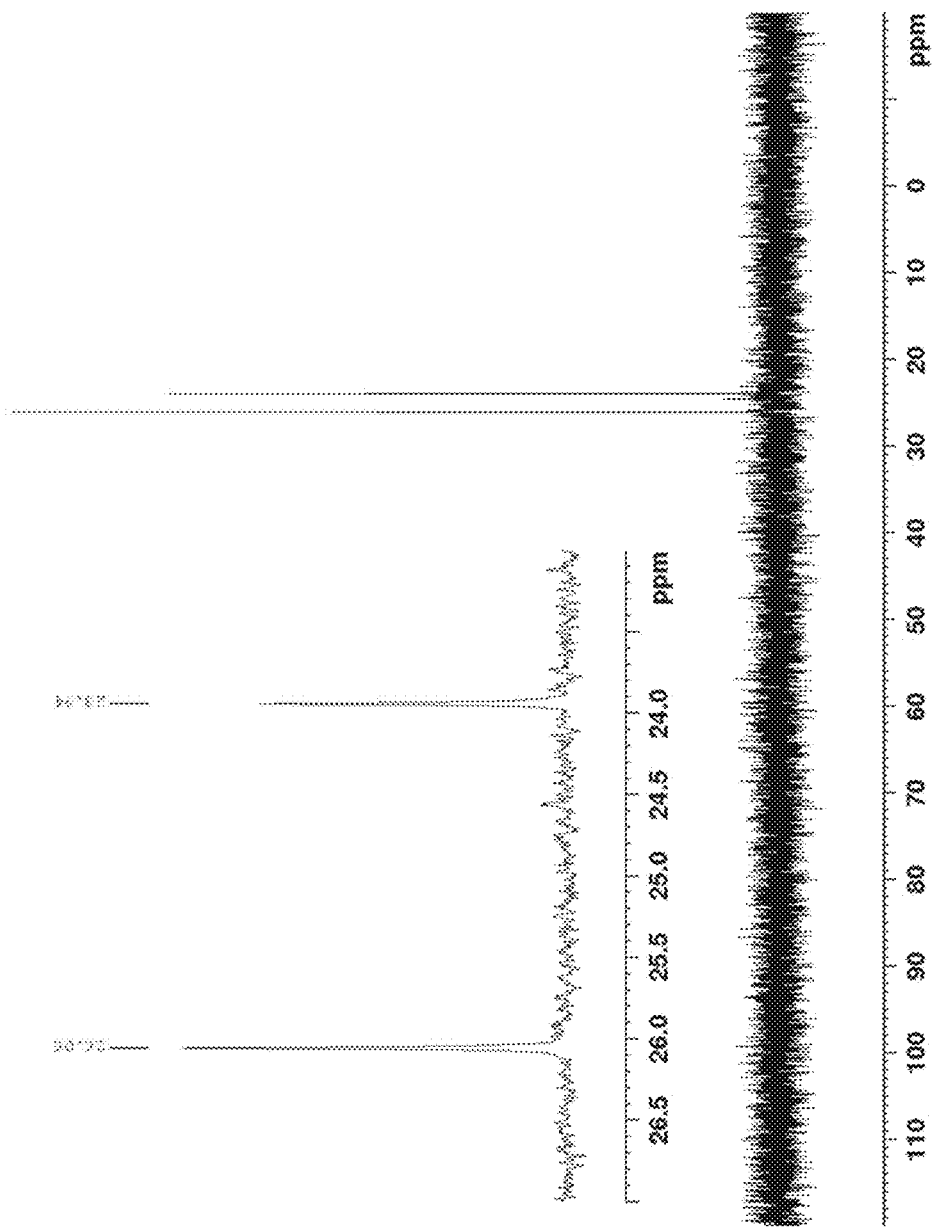
FIG. 16: shows $^{31}$P NMR spectrum of partially protected dimer 6d with S-(phenyl) protection after purification by column chromatography with zoom of relevant peaks.
Figure 17:
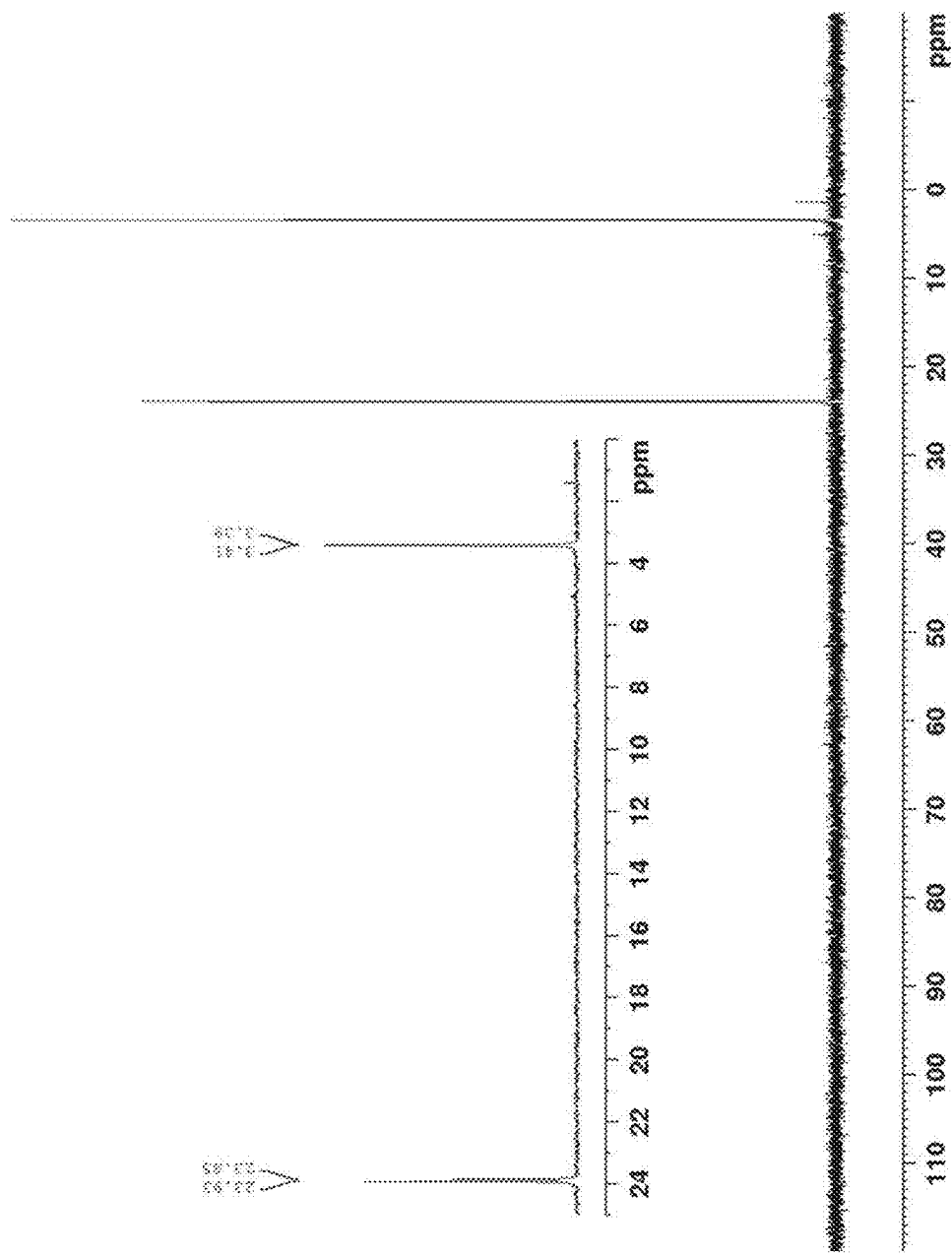
FIG. 17: shows $^{31}$P NMR spectrum of dimer H-phosphonate 7a with S-(phenyl) protection after purification by column chromatography with zoom of relevant peaks.

Example 5. Solution-Phase Delevulination of Dinucleoside and Trinucleoside Thiophosphoric Esters a) DMTrO-Tp(SPh)T-OH 6a (B=Thy). 3a (0.357 g, 0.3438 mmol) was dissolved in a small amount of DCM (~10 mL). Separately, 4.2 mL pyridine, 2.8 mL AcOH, and hydrazine hydrate (0.17 mL, 3.438 mmol) were mixed. While stirring, the hydrazine hydrate solution was added in one portion to the solution containing 3a. The mixture was stirred at room temperature for 15 minutes until completion of the reaction by TLC analysis. 2,4-pentanedione (0.35 mL, 3.438 mmol) was added to the solution and it was stirred at room temperature for a further period of 15 minutes. The reaction mixture was then partitioned between 5% aqueous NaHCO$_3$ (25 mL) and washed twice more with 5% aqueous NaHCO$_3$ (2×25 mL) and once with brine (25 mL). The combined aqueous layers were back-extracted with DCM (75 mL). The combined organic layers were dried over Na$_2$SO$_4$ and concentrated under reduced pressure. The resulting residue was purified on a short silica gel column using DCM-MeOH as the eluent (gradient: 99:1-95:5 v/v). The appropriate fractions were combined and concentrated under reduced pressure to yield compound 6a (0.306 g, 95%) as a white solid. $^{31}$P-NMR δ$_P$ (CDCl$_3$) 24.71, 25.21. (FIG. 13)

b) DMTrO-Cp(SPh)T-OH 6b (B=Cyt$^{Bz}$) This compound was prepared from 3b (0.503 g, 0.4461 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 6b (0.340, 74%) as a white solid. $^{31}$P-NMR δ$_P$ (CDCl$_3$) 23.96, 25.73 (FIG. 14).

c) DMTrO-Gp(SPh) T-OH 6c (B=Gua$^{iBu}$) This compound was prepared from 3c (0.331 g, 0.2918 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 6c (0.207 g, 69%) as a white solid. $^{31}$P-NMR δ$_P$ (CDCl$_3$) 24.72, 25.04 (FIG. 15).

d) DMTrO-Ap(SPh)T-OH 6d (B=Ade$^{Bz}$) This compound was prepared from 3d (0.411 g, 0.3565 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 6d (0.327 g, 87%) as a white solid. $^{31}$P-NMR $\delta_P$ (CDCl$_3$) 23.94, 26.06 (FIG. 16).

e) DMTrO-Ap(SPh)Gp(Sph)T-OH 9. The starting compound for this reaction was prepared from 1d and 4c using the same conditions as stoichiometry as described in Example 1. Trinucleoside (0.429 g, 0.2981 mmol) was delevulinated following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 9 (0.235 g, 58%) as a white solid. HRMS calc. $^{31}$P-NMR $\delta_P$ (CDCl$_3$) 23.41, 23.60, 24.13, 24.25, 24.34, 24.82, 25.01, 25.24 (FIG. 17).

Figure 18:
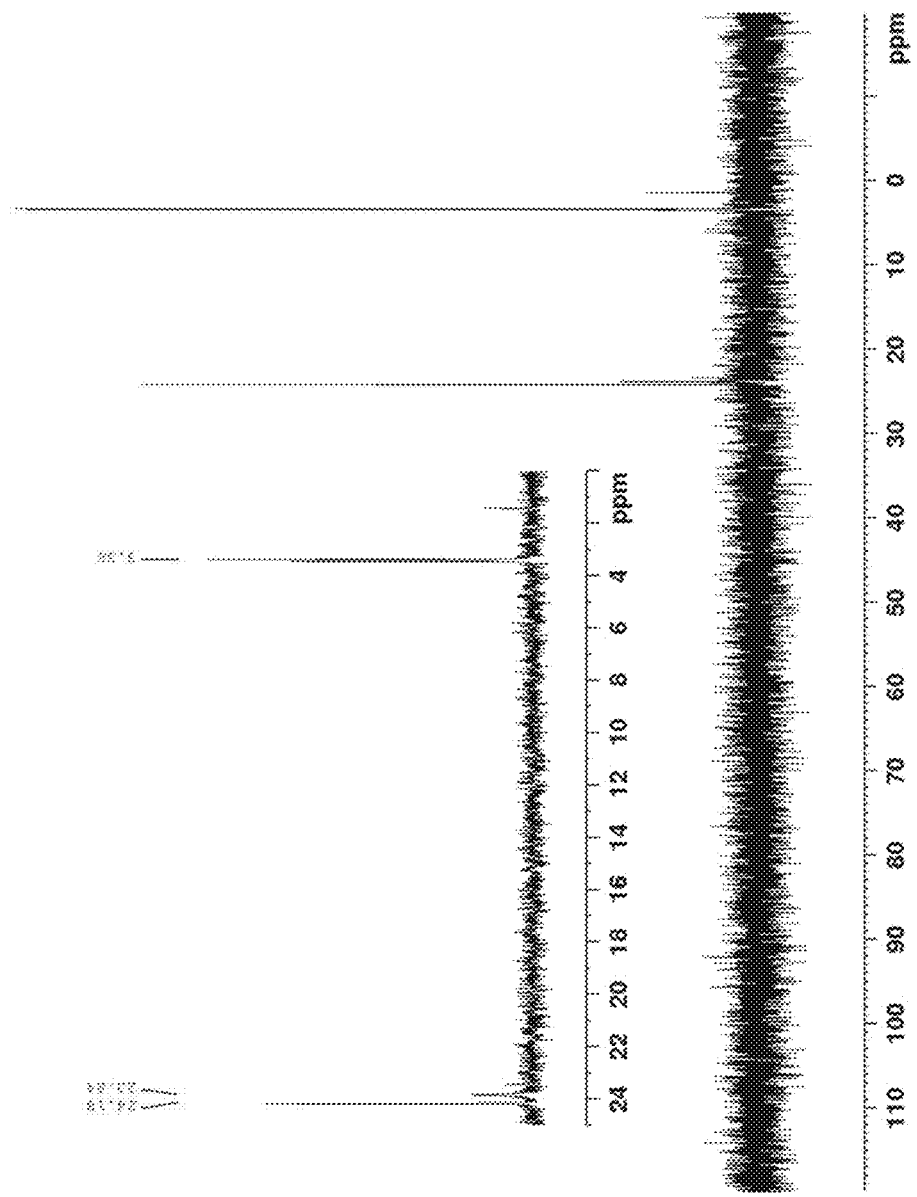
FIG. 18: shows $^{31}$P NMR spectrum of dimer H-phosphonate 7b with S-(phenyl) protection after purification by column chromatography with zoom of relevant peaks.
Figure 19:
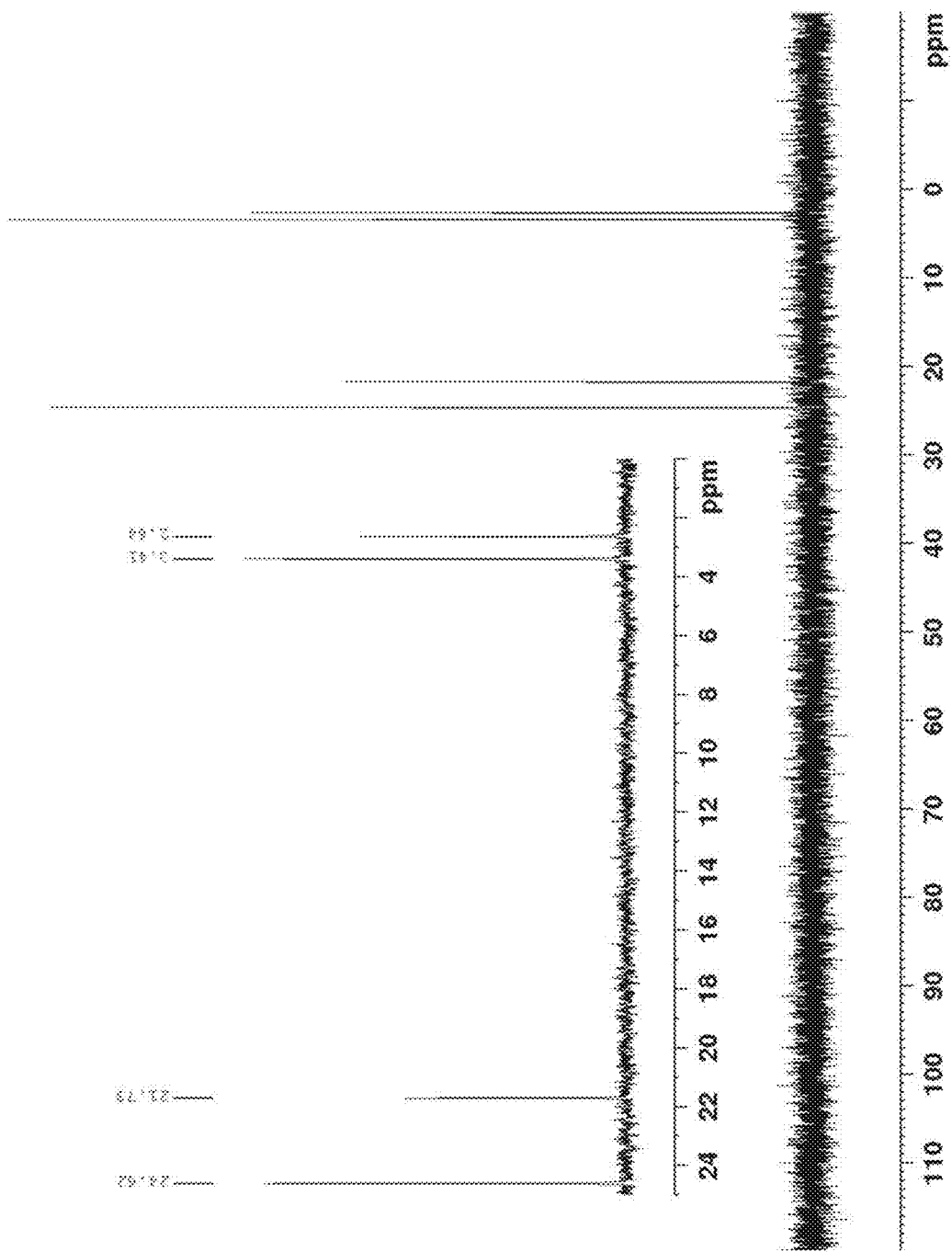
FIG. 19: shows $^{31}$P NMR spectrum of dimer H-phosphonate 7c with S-(phenyl) protection after purification by column chromatography with zoom of relevant peaks.
Figure 20:
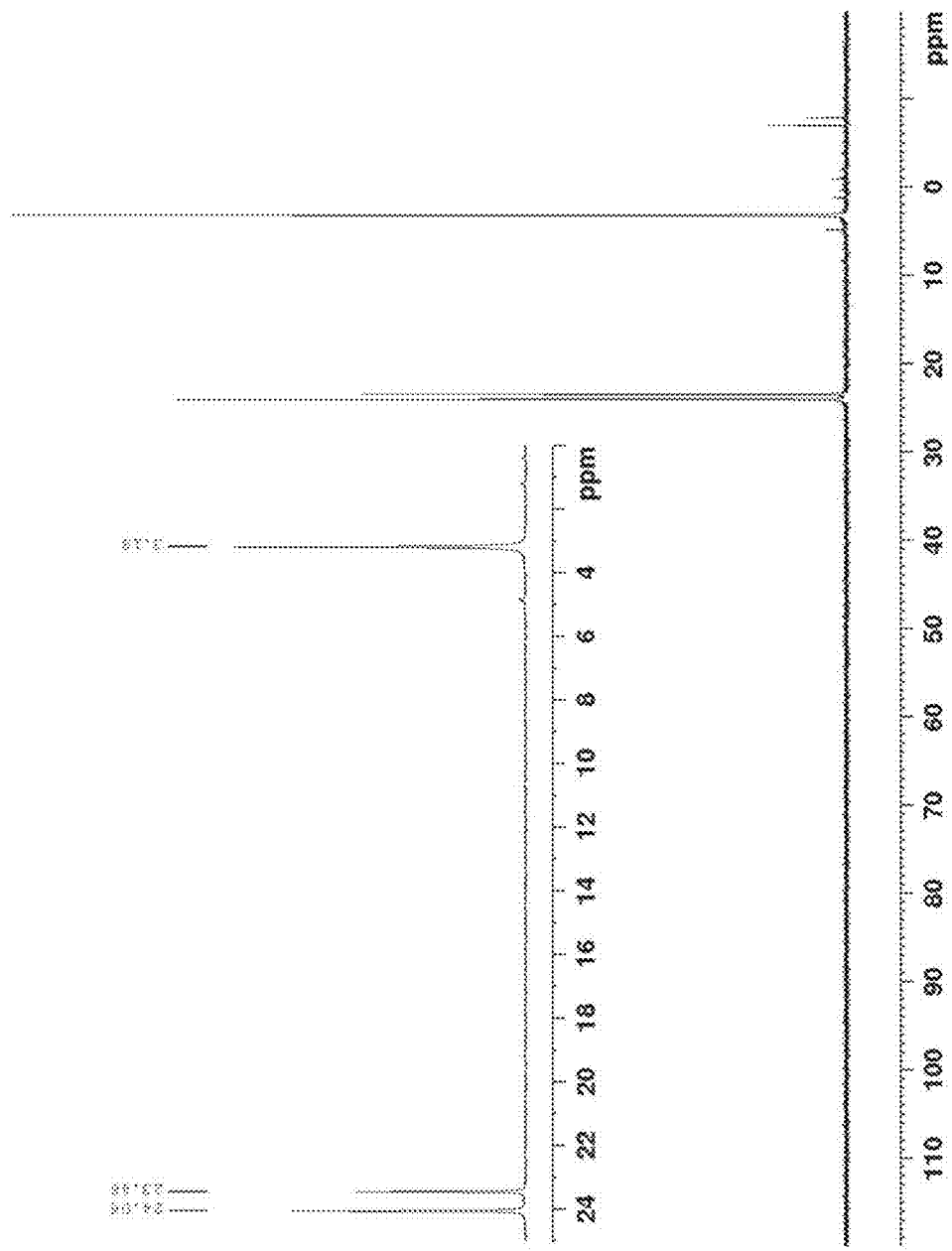
FIG. 20: shows $^{31}$P NMR spectrum of dimer H-phosphonate 7d with S-(phenyl) protection after purification by column chromatography with zoom of relevant peaks.

Example 6. Solution-Phase Preparation of Dinucleoside and Trinucleoside Thiophosphoric Esters with 3'-H-Phosphonate Components a) DMTrO-Tp(SPh)T-O(PO$_2$H) 7a (B=Thy). 6a (0.324 g, 0.3438 mmol) was dissolved in pyridine. While stirring, DPHP (0.46 mL, 2.41 mmol) was added in one portion. The mixture was stirred for 15 minutes at room temperature until the reaction was complete by TLC analysis. TEA (2 mL) and water (2 mL) were added sequentially, and the reaction was allowed to stir at room temperature for an additional period of 15 minutes. The reaction mixture was then concentrated under reduced pressure then partitioned between DCM (15 mL) and 5% aqueous NaHCO$_3$ (15 mL). The organic layer was washed twice more 5% NaHCO$_3$ (2×15 mL). The combined aqueous layers were back-extracted with DCM (25 mL). The combined organic layers were dried over Na$_2$SO$_4$ and concentrated under reduced pressure. The resulting residue was purified on a short silica gel column using DCM-MeOH as the eluent (gradient: 95:5-75:25 v/v). The appropriate fractions were combined and concentrated under reduced pressure to yield compound 7a (0.182 g, 48%) as a white solid. HRMS calc. [M+Na]=1027.2361. HRMS found [M+Na]=1027.2340. $^{31}$P-NMR $\delta_P$ (CDCl$_3$) 3.39, 3.41, 23.85, 23.93 (FIG. 18).

b) DMTrO-Cp(SPh) T-O(PO$_2$H) 7b (B=Cyt$^{Bz}$) This compound was prepared from 6b (0.340 g, 0.3298 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 7b (0.252, 64%) as a white solid. HRMS calc. [M-]=1092.2661. HRMS found [M-]=1092.2673. $^{31}$P-NMR $\delta_P$ (CDCl$_3$) 3.38, 23.84, 24.18 (FIG. 19)

c) DMTrO-Gp(SPH) T-O(PO$_2$H) 7c (B=Gua$^{iBu}$) This compound was prepared from 6c (0.207 g, 0.1999 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 7c (0.135 g, 56%) as a white solid. HRMS calc. [M+2Na]=1144.2644. HRMS found [M+2Na]=1144.2653. $^{31}$P-NMR $\delta_P$ (CDCl$_3$) 2.64, 3.41, 21.73, 24.62 (FIG. 20).

d) DMTrO-Ap(SPh) T-O(PO$_2$H) 7d (B=Ade$^{Bz}$) This compound was prepared from 6d (0.327 g, 0.3105 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 7d (0.168 g, 44%) as a white solid. HRMS calc. [M+Na]=1162.2558. HRMS found [M+Na]=1162.2539. $^{31}$P-NMR $\delta_P$ (CDCl$_3$) 3.18, 23.46, 24.06 (FIG. 21).

e) DMTrO-Ap(SPh)Gp(Sph)T-O(PO$_2$H) This compound was prepared from 9 (0.235 g, 0.1521 mmol) following the procedure described in a) above with the same stoichiometry of all reagents. The title compound was purified on a short silica gel column using DCM-MeOH as the eluent (gradient: 99:1-95:5 v/v). The appropriate fractions were combined and concentrated under reduced pressure to yield 10 (0.109 g, 42%) as a white solid. HRMS calc. [M+Na]=1631.3767. HRMS found [M+Na]=1631.3812. $^{31}$P-NMR $\delta_P$ (CDCl$_3$) 2.49, 2.79, 2.88, 3.07, 22.61, 23.25, 23.37, 23.70, 24.10, 24.55, 24.66, 24.83 (FIG. 22).

Example 7. Two-Step One-Pot Synthesis of a Fully Protected Tetranucleoside Thiophosphoric Ester Via Dimer Coupling A 30 mL stainless steel milling jar was charged with a 10 mm stainless steel milling ball, 7c (60 mg, 0.04954 mmol) and 4d (41 mg, 0.04954 mmol) and dried under high vacuum for a minimum of 1 hour. N-(phenylthiol)phthalimide (14 mg, 0.05449 mmol) and adamantane carbonyl chloride (49 mg, 0.2477 mmol) were also dried in a separate vials under high vacuum for a minimum of 1 hour. After drying, adamantane carbonyl chloride and pyridine (40 µL, 0.4954 mmol) were added sequentially to the milling jar and allowed to react on a vibration ball mill at 25 Hz for 15 minutes. N-(phenylthiol)phthalimide and pyridine (20 µL, 0.2477 mmol) were added sequentially to the milling jar and were allowed to react on a vibration ball mill at 25 Hz for another 15 minutes. After the reaction was complete, an off-white paste was obtained and was taken up in DCM and evaporated under reduced pressure. The crude mixture was purified on a short silica gel column using DCM-MeOH as the eluent (gradient: 99:1-95:5 v/v). The appropriate fractions were combined and concentrated under reduced pressure to yield 8 as a white solid (84 mg, 83%). HRMS calc. [M+H]=2039.5146. HRMS found [M+H]=2039.5136. $^{31}$P-NMR $\delta_P$ (CDCl$_3$) 23.57, 23.67, 23.71, 23.74, 23.76, 23.89, 23.99, 24.15, 24.20, 24.23, 24.27, 24.29, 24.38, 24.42, 24.56, 24.58, 24.60, 24.66, 24.76, 24.78, 24.81, 24.90 (FIG. 23).

Figure 24:
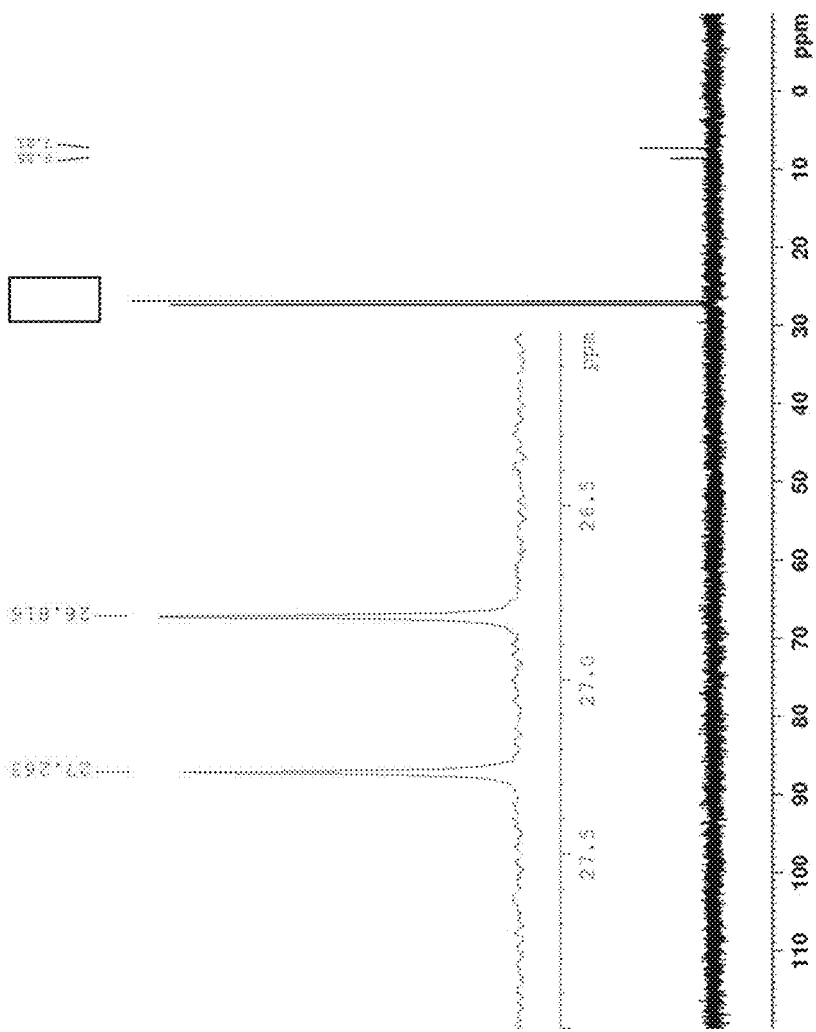
FIG. 24: shows $^{31}$P NMR spectrum of dimer 11 with S-(cyanoethyl) protecting group after purification by column chromatography with zoom of relevant peaks.

Example 9. Three-Step One-Pot Synthesis of a Partially Protected Dinucleoside Thio(Cyanoethyl) Phosphoric Esters HO-Tp[S(cyanoethyl)]T-OLev 10 (B=Thy). A 10 mL stainless steel milling jar was charged with 1a (212 mg, 0.3 mmol) and 2 (102 mg, 0.3 mmol) and dried under high vacuum for a minimum of 1 hour. N-[(2-cyanoethyl)sulfanyl]phthalimide (66 mg, 0.33 mmol) was also dried in a separate vial under high vacuum for a minimum of 1 hour. After drying, N-(phenylthiol)phthalimide, pyridine (0.120 mL, 1.5 mmol) and diphenyl phosphoryl chloride (0.311 mL, 1.5 mmol) were added sequentially to the milling jar and allowed to react on a vibration ball mill at 25 Hz for 30 minutes. After the reaction was complete, an off-white paste was obtained and was taken up in DCM and evaporated under reduced pressure. The resulting oil was taken up in a small amount of DCM and precipitated from a stirring mixture of cold 1:1 (v/v) hexanes and diethyl ether to yield a fine white precipitate. The mixture was filtered over Celite then taken up in DCM and evaporated under reduced pressure. The crude mixture was purified on a short silica gel column using DCM-MeOH as the eluent (gradient: 99:1-94:6 v/v). The appropriate fractions were combined and concentrated under reduced pressure to yield 10 as a white solid (82 mg, 38%). HRMS calc. [M+Na]=736.1660. HRMS found [M+Na]736.1578. $^{31}$P-NMR $\delta_P$ (CDCl$_3$) 26.77, 27.26 (FIG. 24).

Figure 25:
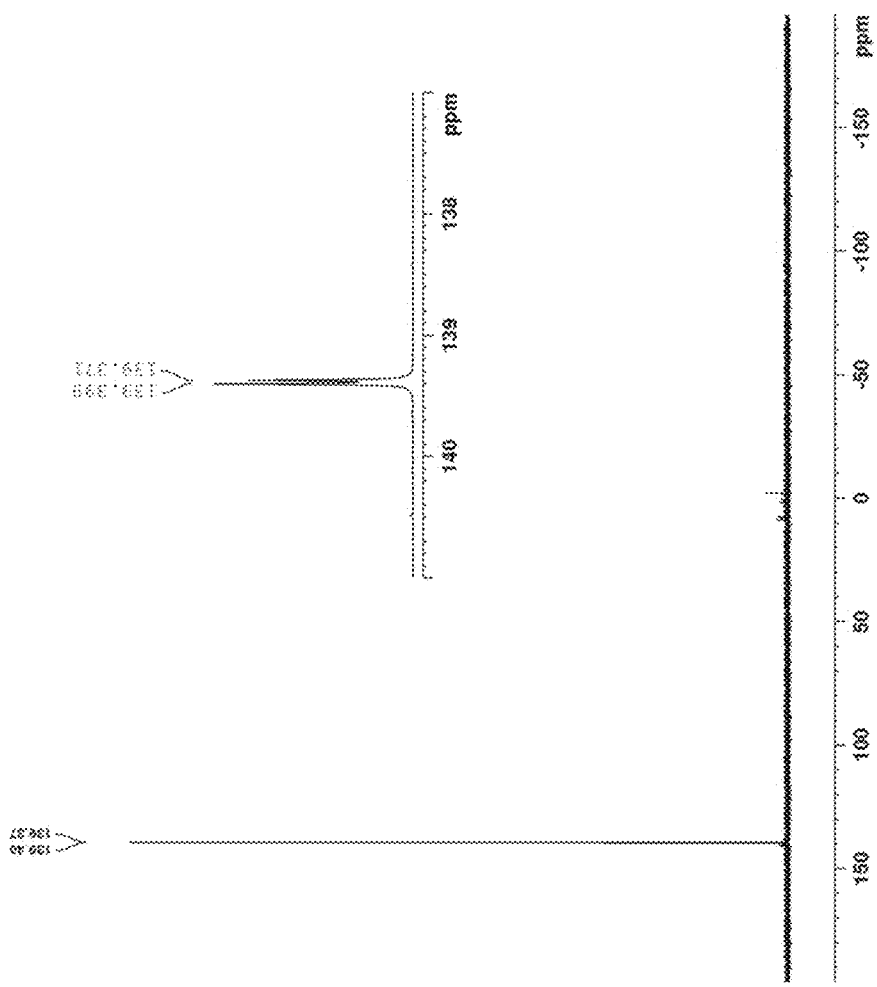
FIG. 25: shows $^{31}$P NMR spectrum of fully protected phosphite triester dimer 14a after purification by column chromatography with zoom of relevant peaks.
Figure 26:
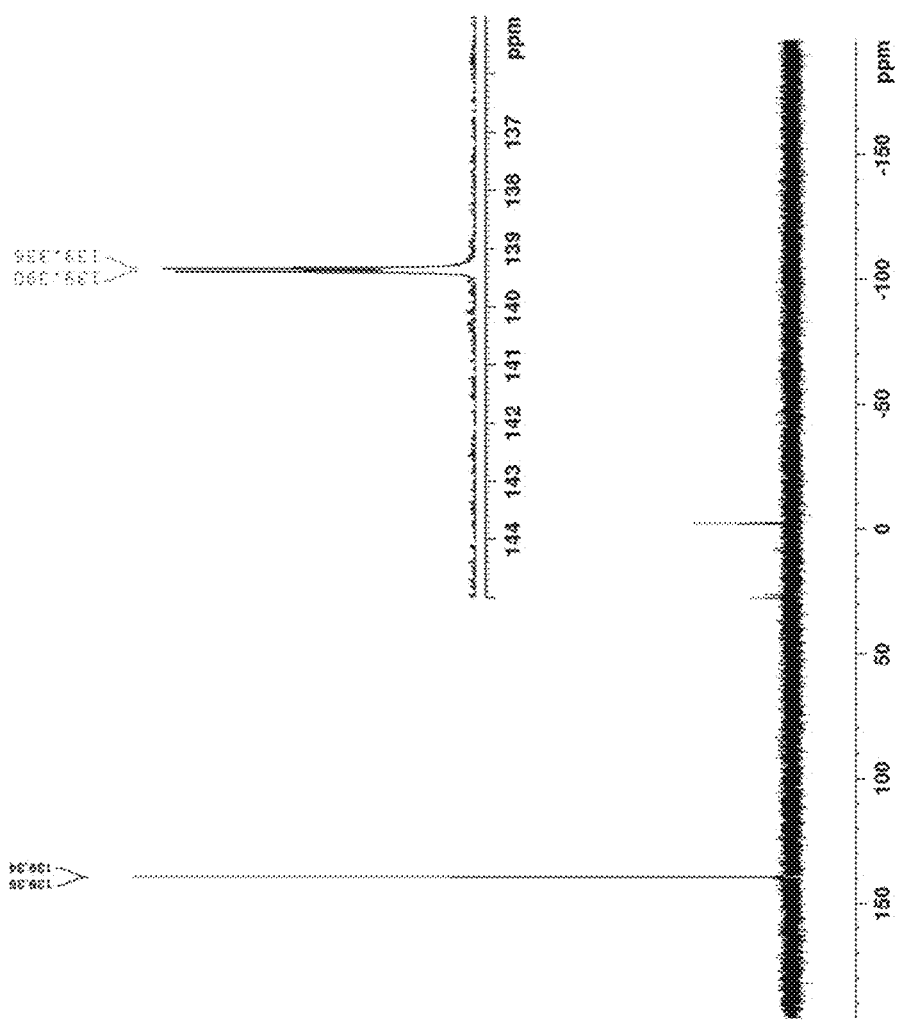
FIG. 26: shows $^{31}$P NMR spectrum of fully protected phosphite triester dimer 14b after purification by column chromatography with zoom of relevant peaks.
Figure 27:
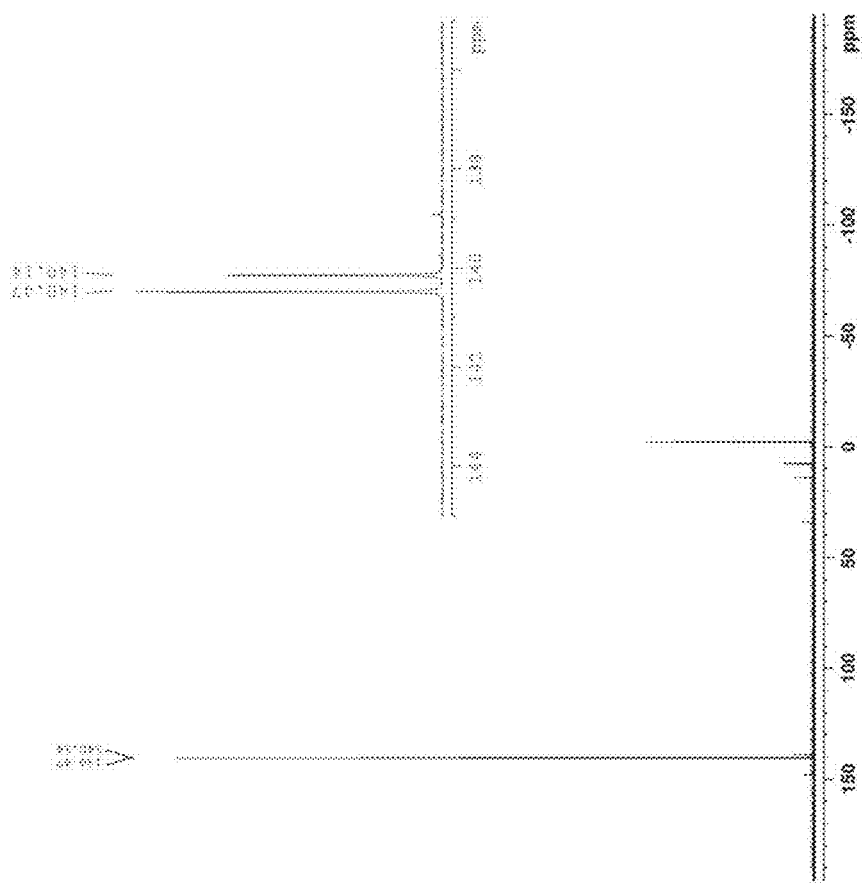
FIG. 27: shows $^{31}$P NMR spectrum of fully protected phosphite triester dimer 14c after purification by column chromatography with zoom of relevant peaks.
Figure 28:
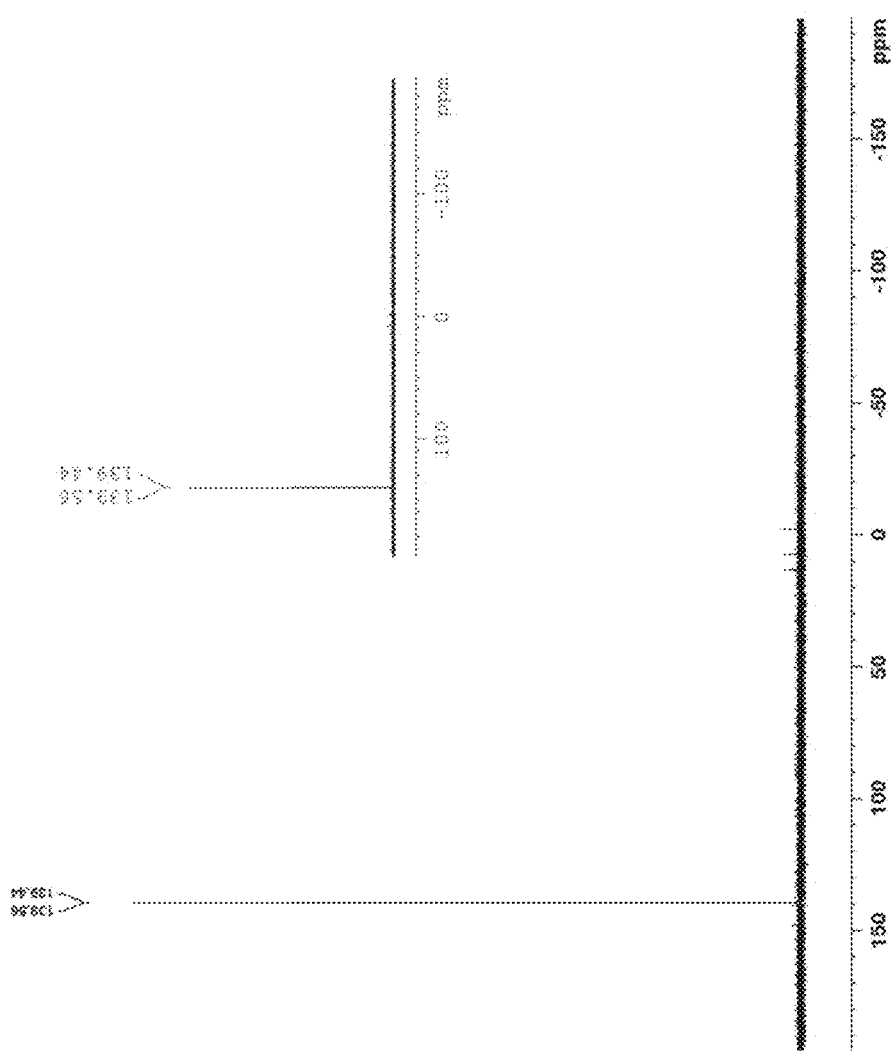
FIG. 28: shows $^{31}$P NMR spectrum of fully protected phosphite triester dimer 14d after purification by column chromatography with zoom of relevant peaks.

Example 9. Synthesis of Dinucleoside Phosphite Triesters (14a-d) Using Vibrational Ball Milling a) 5'-DMTrO-dTdT-3'TBDMS phosphite triester 13a (B=Thy). 12a (167 mg, 0.224 mmol, 2 eq), ETT (46 mg, 0.336 mmol, 3 eq) and 13 (41 mg, 0.112 mmol, 1 eq) were added to a 15 mL steel ball milling jar with a 10 mm steel milling ball. The jar was placed under vacuum for 15 minutes before being closed and was milled at 30 Hz for 30 minutes. The resulting solid was dissolved in EtOAc:ACN (50:50) and washed with: 3×10 ml (sat NaHCO$_3$), 3×10 ml (H$_2$O) and dried over Na$_2$SO$_4$. The dried organic layer was evaporated in vacuo. The crude was then purified by column chromatography (DCM 100%—DCM: MeOH) with silica neutralized by Et$_3$N. This yielded a white solid 14a (94 mg, 84%). HRMS calc: [M+Na]1022.32 HRMS found: ESI+[M+Na]$^+$ 1022.32 $^{31}$P-NMR $\delta_P$ (500 MHz, d$_3$-ACN) 139.40, 139.37 (FIG. 25)

b) 5'-DMTrO-dC(nBz)dT-3'TBDMS phosphite triester 14b (B=Cyt (nBz)). 12b (168 mg, 0.224 mmol, 2 eq), ETT (46 mg, 0.336 mmol, 3 eq) and 13 (41 mg, 0.112 mmol, 1 eq) were added to a 15 ml steel ball milling jar with a 10 mm steel milling ball. The jar was placed under vacuum for 15 minutes before being closed and was milled at 30 Hz for 30 minutes. The resulting solid was dissolved in EtOAc:ACN (50:50) and washed with: 3×10 ml (sat NaHCO$_3$), 3×10 ml (H$_2$O) and dried over Na$_2$SO$_4$. The dried organic layer was evaporated in vacuo. The crude was then purified by column chromatography (DCM 100%—DCM: MeOH) with silica neutralized by Et$_3$N. This yielded a white solid 14b (96 mg, 80%). HRMS calc: 1111.40 [M+Na] HRMS found: ESI+[M+Na]$^+$ 1111.40 $^{31}$P-NMR $\delta_P$ (500 MHz, d$_3$-ACN) 139.34, 139.39. (FIG. 26)

c) 5'-DMTrO-dG(nibu)dT-3'TBDMS phosphite triester 14c (B=Gua(iBu)). 12c (189 mg, 0.224 mmol, 2 eq), ETT (46 mg, 0.336 mmol, 3 eq) and 13 (42 mg, 0.112 mmol, 1 eq) were added to 15 ml steel ball milling jar with a 10 mm steel ball. The jar was placed under vacuum for 15 minutes before being closed and was milled at 30 Hz for 30 minutes. The resulting solid was dissolved in EtOAc:ACN (50:50) and washed with: 3×10 ml (sat NaHCO$_3$), 3×10 ml (H$_2$O) and dried over Na$_2$SO$_4$. The dried organic layer was evaporated in vacuo. The crude was then purified by column chromatography (DCM 100%—DCM: MeOH) with silica neutralized by Et$_3$N. This yielded a white solid 14c (78 mg, 63%). HRMS calc: 1117.42 [M+Na] HRMS found: ESI+[M+Na]$^+$ 1117.42 $^{31}$P-NMR $\delta_P$ (d$_3$-ACN) 140.41, 140.47 (FIG. 27).

d) 5'-DMTrO-dA(nBz)dT-3'TBDMS phosphite triester 14d (B=Ade(nBz)): 12d (194 mg, 0.224 mmol, 2 eq), ETT (46 mg, 0.336 mmol, 3 eq) and 13 (41 mg, 0.112 mmol, 1 eq) were added to 15 ml steel milling jar. The jar was placed under vacuum for 15 minutes before being closed and was milled at 30 Hz for 30 minutes. The resulting solid was dissolved in EtOAc:ACN (50:50) and washed with: 3×10 ml (sat NaHCO$_3$), 3×10 ml (H$_2$O) and dried over Na$_2$SO$_4$. The dried organic layer was evaporated in vacuo. The crude was then purified by column chromatography (DCM 100%—DCM: MeOH) with silica neutralized by Et$_3$N. This yielded a white solid 14d (100 mg, 80%). HRMS calc: 1135.41 [M+Na] HRMS found: ESI+[M+Na]$^+$ 1135.41. $^{31}$P-NMR $\delta_P$ (d$_3$-ACN) 139.34, 139.39 (FIG. 28).

Example 6. Oxidation Reaction of Dinucleoside Phosphite Triester Using Vibrational Ball Milling 5'DMTrO-dTdT-3'TBDMS phosphotriester 15a: 12a (169 mg, 0.224 mmol, 2 eq), ETT (47 mg, 0.336 mmol, 3 eq) and 13 (41 mg, 0.112 mmol, 1 eq) were added to 15 ml steel ball milling jar. The jar was placed under vacuum for 15 minutes before being closed and was milled at 30 Hz for 30 minutes. The jar was opened and I$_2$ (31 mg, 0.112 mmol, 1 eq), H$_2$O (4 µl, 0.224 mmol, 2 eq) and pyridine (18 µl, 0.224 mmol, 2 eq) were added. The new mixture was milled at 30 Hz for 20 minutes. The resulting solid was dissolved in EtOAc:ACN (50:50) and washed with: 3×10 ml (H$_2$O), Brine (10 ml) and dried over Na$_2$SO$_4$. The dried organic layer was evaporated in vacuo to yield 15a. HRMS calc: 1038.37. HRMS found: ESI+[M+Na]+$^{31}$P-NMR $\delta_P$ (d$_3$-ACN) −2.59, −2.76 (FIG. 29).

Example 7. Sulfurization of Dinucleoside Phosphite Triesters Using Vibrational Ball Milling a) 5'DMTrO-dTdT-3'-TBDMS phosphorothioate 15b: 14a (106 mg, 0.11 mmol, 1 eq) and S$_8$ (46 mg, 0.1 mmol, 1 eq), and a 10 mm steel ball were added to a 15 ml steel jars and placed under vacuum for 15 minutes. The solids were milled at 30 Hz for 5 minutes and the crude mixture was analyzed. HRMS calc: [M+Na]1054.35. HRMS found: ESI+[M+Na]$^+$ 1054.35 $^{31}$P-NMR $\delta_P$ (d$_3$-ACN) 67.00, 67.05 (FIG. 30).

b) 5'DMTrO-dTdT-3'-TBDMS phosphorothioate 15b: 12a (167 mg, 0.224 mmol, 2 eq), ETT (46 mg, 0.336 mmol, 3 eq) and 13 (41 mg, 0.112 mmol, 1 eq) were added to a 15 ml steel ball milling jar with a 10 mm steel ball. The jar was placed under vacuum for 15 minutes before being closed and milled at 30 Hz for 30 minutes. Sulfur (5 mg, 0.112 mmol, 1 eq) was added and the solids were milled at 30 Hz for 40 minutes. The resulting solid was dissolved in EtOAc:ACN (50:50) and washed with: 3×10 ml (sat NaHCO$_3$), 3×10 ml (H$_2$O) and dried over Na$_2$SO$_4$. The organic layer was evaporated in vacuo to yield 15b. HRMS found: ESI+[M+Na]$^+$ 1054.35 $^{31}$P-NMR o$_P$ (d$_3$-ACN) 67.00, 67.05 (FIG. 31).

Figure 32:
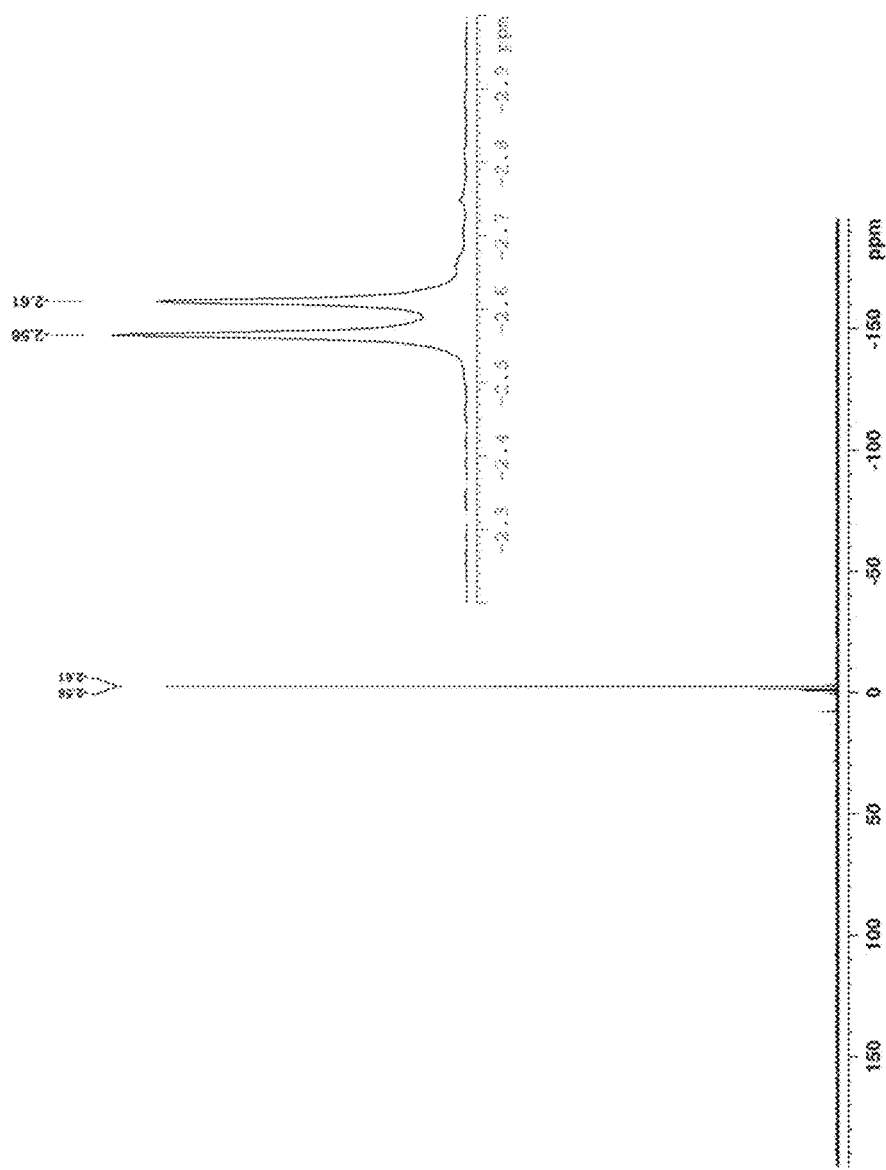
FIG. 32: shows $^{31}$P NMR spectrum of partially protected phosphate triester dimer 16 after purification with zoom of relevant peaks.

Example 8. Detritylation of Dinucleoside Phosphotriesters Using Vibrational Ball Milling 5'-OH dTdT-3'-TBDMS phosphotriester 16: 12a (169 mg, 0.224 mmol, 2 eq), ETT (47 mg, 0.336 mmol, 3 eq) 13 (41 mg, 0.112 mmol, 1 eq) were added to 15 ml Teflon jar with a 10 mm steel ball. The jar was placed under vacuum for 15 minutes before being closed and was milled at 30 Hz for 30 minutes. The jar was opened and $I_2$ (30 mg, 0.112 mmol, 1 eq), $H_2O$ (4 μl, 0.224 mmol, 2 eq) and pyridine (18 μl, 0.224 mmol, 2 eq) were added. The new mixture was milled at 30 Hz for 20 minutes. Finally, trichloroacetic acid (36 mg, 0.224 mmol, 2 eq) and MeOH (20 μl) were added, and the reaction was milled for 10 minutes at 30 Hz. The resulting solid was dissolved in EtOAc:ACN (50:50) and washed with: 3×10 ml ($H_2O$), brine (10 ml) and dried over $Na_2SO_4$. The dried organic layer was evaporated in vacuo. The crude material was purified through column chromatography (EtOAc (100%)—EtOAc:MeoH (96:4)). Yielding a white solid, 16 (47 mg, 60%). HRMS calc: [M+Na]736.24. HRMS found: ESI+[M+Na]$^+$ 736.24 $^{31}$P-NMR $\delta_P$ ($d_3$-ACN) −2.56, −2.61 (FIG. 32).

Although preferred embodiments of the invention have been described herein, it will be understood by those skilled in the art that variations may be made thereto without departing from the spirit of the invention or the scope of the appended claims. All documents disclosed herein, including those in the following reference list, are incorporated by reference.

The invention claimed is:

1. A process for synthesizing an oligonucleotide of Formula 3,

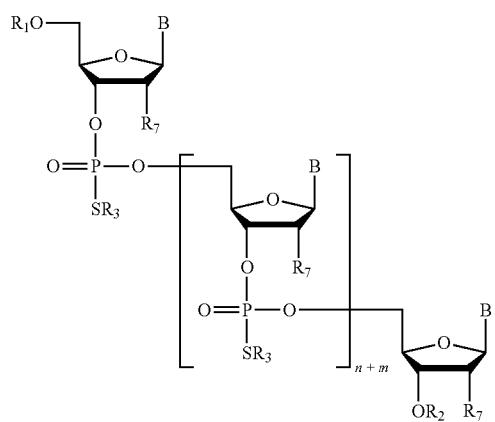

Formula 3 comprising reacting the nucleic acid of Formula 1,

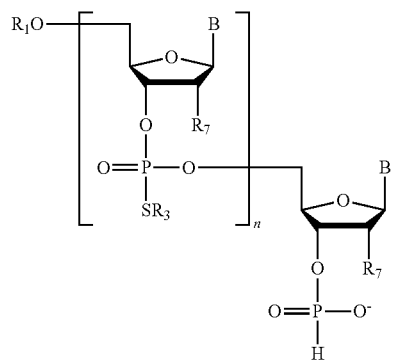

Formula 1 with the nucleic acid of Formula 2,

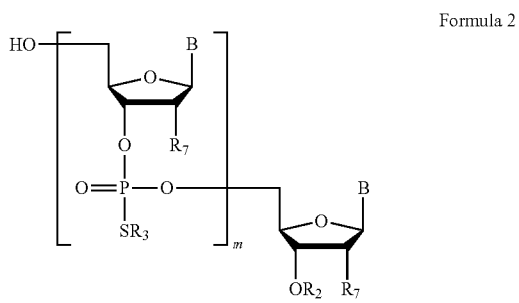

Formula 2 in the presence of an activator and a sulfur transfer reagent having an SR3 moiety, and using mechanochemistry or mechanical activation to induce chemical reaction between the reagents;

wherein n is an integer from 0 to 20;

m is an integer from 0 to 20;

$R_1$ is a 5' protecting group;

$R_2$ is a 3' protecting group;

$R_3$ is $CH_2CH_2CN$, phenyl, chlorophenyl, or alkyl;

$R_7$ is H, F, Ome, O-methoxyethyl, or' in either the ribose or arabinose configuration and wherein R' is a 2' protecting group;

B is a nitrogen-containing base;

and $R_1$, $R_2$, $R_3$, $R_7$, and B can be the same or different in each nucleotide in the oligonucleotide.

2. The process of claim 1, further comprising deprotecting the oligonucleotide of Formula 3 to remove any protecting groups.

3. A process for synthesizing an oligonucleotide of Formula 4,

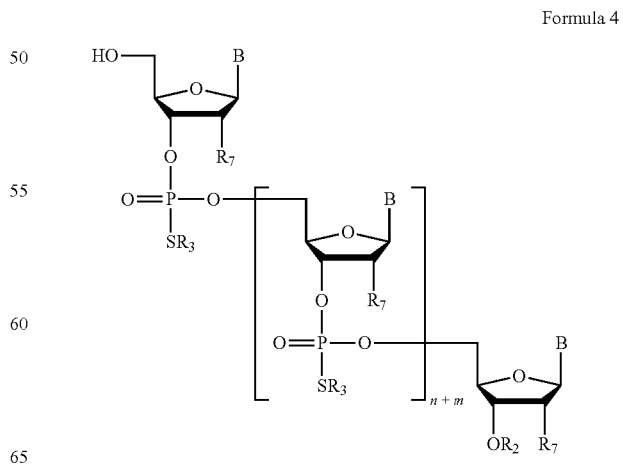

Formula 4 comprising reacting the nucleic acid of Formula 1,

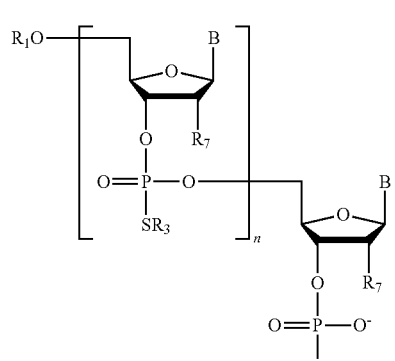
Formula 1 with the nucleic acid of Formula 2,

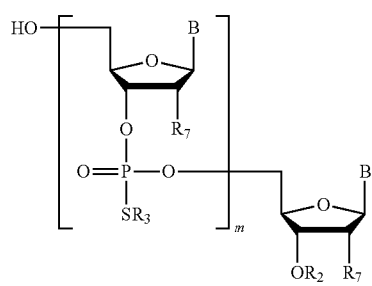
Formula 2 in the presence of an activator and a sulfur transfer reagent having an SR3 moiety, and using mechanochemistry or mechanical activation to induce chemical reaction between the reagents;

wherein n is an integer from 0 to 20;

m is an integer from 0 to 20;

$R_1$ is a 5' protecting group;

$R_2$ is a 3' protecting group;

$R_3$ is $CH_2CH_2CN$, phenyl, chlorophenyl, or alkyl;

$R_7$ is H, F, Ome, O-methoxyethyl, or' in either the ribose or arabinose configuration and wherein R' is a 2' protecting group;

B is a nitrogen-containing base; and $R_1$, $R_2$, $R_3$ and B can be the same or different in each nucleotide in the oligonucleotide.

4. The process of claim 1, wherein the sulfur transfer reagent is N-(phenylthio)pthalimide (PTP), N-[(2-cyanoethyl)sulfanyl]pthalimide (CSP), 2-methylsulfanyl-1H-isoindole-1,3(2H)-dione, 2-(4-chlorophenyl)sulfanyl-1H-isoindole-1,3(2H)-dione, N-(phenylsulfanyl)succinimide, or N-[(2-cyanoethyl)sulfanyl]succinimide.

5. A process for synthesizing an oligonucleotide of Formula 7,

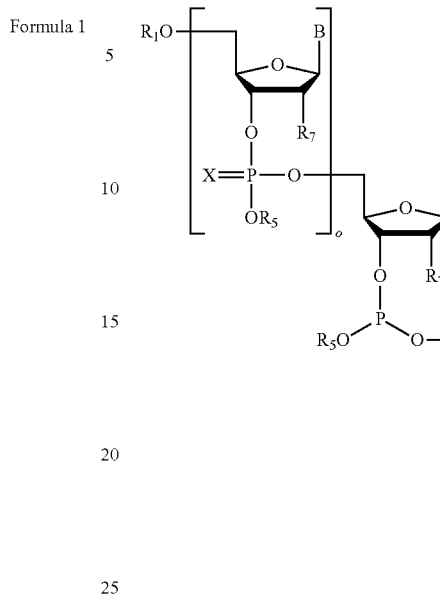
Formula 7 comprising reacting the nucleic acid of Formula 5,

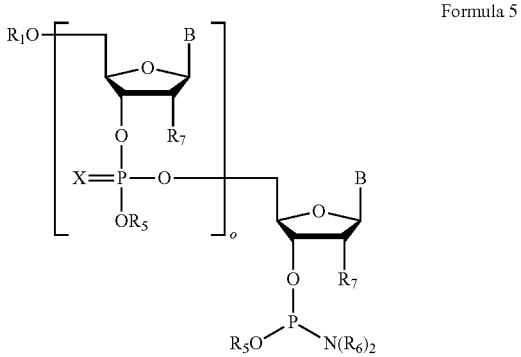
Formula 5 with the nucleic acid of Formula 6,

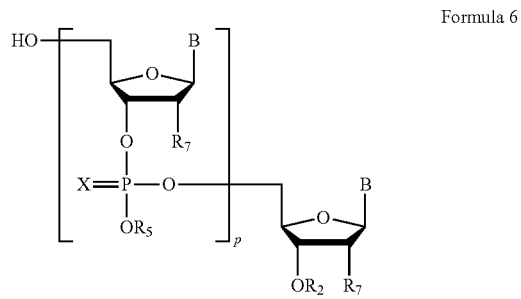
Formula 6 in the presence of an activator and using mechanochemistry or mechanical activation to induce chemical reaction between the reagents;

wherein o is an integer from 0 to 20;

p is an integer from 0 to 20;

$R_1$ is a 5' protecting group;

R₂ is a 3' protecting group;

R₅ is phosphate protecting group;

R₆ is an alkyl group;

R₇ is H, F, Ome, O-methoxyethyl, or' in either the ribose or arabinose configuration and wherein R' is a 2' protecting group;

X is O or S

B is a nitrogen-containing base; and $R_1$, $R_2$, $R_5$, $R_6$, $R_7$, X and B can be the same or different in each nucleotide in the oligonucleotide.

6. The process of claim 5, wherein the activator is 1H-Tetrazole (Tetrazole), 5-Nitrophenyl-1H-tetrazole (NPT), 5-(Bis-3,5-trifluoromethylphenyl)-1H-tetrazole (Activator 42), 5-Ethylthio-1H-tetrazole (ETT), 5-Benzylthio-1H-tetrazole (BTT), 5-Methylthio-1H-tetrazole (MTT), 5-Mercapto-tetrazole (MCT), 4,5-Dicyanoimidazole (DCI), Pyridine Hydrochloride (Py·Cl), Pyridine trifluoroacetate (Py·TFA), 1-Hydroxy-benzotriazole, Nitrotriazole, or carboxylic acids.

7. The process of claim 5, further comprising oxidizing the oligonucleotide of Formula 7 to convert the phosphite triester internucleotide linkage to a phosphate triester internucleotide linkage.

8. The process of claim 7, wherein the oxidizing is performed with Iodine (I₂)/water, Meta-Chloroperoxybenzoic acid (mCPBA), Tert-Butyl peroxide (tBuOOH), or N-Bromosuccinamide dimethylsulfoxide (NBS-DMSO).

9. The process of claim 7, further comprising deprotecting the oligonucleotide to remove all protecting groups.

10. The process of claim 1, wherein the use of mechanochemistry or mechanical activation comprises the use of a pestle and mortar, a ball miller, a mixer mill, a planetary miller, an extruder, a shaker miller, or a gravity miller.

11. The process of claim 1, wherein the 5' protecting group is Dimethoxytrityl (DMTr), Monomethoxytrityl (MMTr), Trityl (Tr), Benzoyl (Bz), Tert-butyldimethylsilyl (TBDMS), Levulinyl (Lev), Pixyl (Px), or (2-Nitrophenyl) propyloxycarbonyl (NPPOC).

12. The process of claim 1, wherein the 3' protecting group is Levulinyl (Lev), Acetyl (Ac), tert-butylsilyl (TBDMS), benzoyl (Bz), or acetallevulinyl (ALE).

13. The process of claim 1, wherein the 2' protecting group is 2'-O-t-butyldimethylsilyl (TBDMS), a silyl protecting group such as 2'-O-TOM (2'-O-triisopropylsilyloxymethyl), a photolabile group such as 2'-(2-nitrophenyl)ethoxycarbonyl, 2'-(2-nitrophenyl)ethylsulfonyl or 2'O-(0-nitrobenzyl), an acid labile acetals such as 2'-tetrahydropyranyl, 2'-O-Fpmp (1-(2-fluorophenyl)-4-methoxypiperidin-4-yl), 2'-O-Cpep (1-(4-chlorophenyl)-4-ethoxypiperidin-4-yl), 2'-O-4-MABOM (2'-O-[4-(N-methylamino)benzyloxy]methyl, or 2'-ACE (2'-O-bis(2-acetoxyethoxy)methyl), levulinyl (Lev) or acetallevulynyl (ALE).

14. The process of claim 1, wherein process is solvent-free.

15. The process of claim 1, wherein the process is performed in the presence of a base.

16. The process of claim 1, further comprising reacting the product with a sulfurizing agent.

17. The process of claim 16, wherein the sulfurizing agent is elemental sulfur (S8), 3-[(dimethylaminomethylene)amino]-3H-1,2,4-dithiazole-5-thione (DDTT), Dimethyl sulfoxide (DMSO), 2,2'-dipyridyl disulfide, Diphenyl disulfide, Dibenzoyl tetrasulfide, Phenylacetyl disulfide, or Beaucage reagent.

18. The process of claim 1, wherein the method further comprises modifying the resulting oligonucleotide to have any of the following internucleotide linkages: Phosphorothioate, Phosphorodithioate, thioalkyl phosphodiester, phosphoramidate, phosphoroselenoate, phosphotriester, alkyl phosphonate, alkyl phosphonothioate, boranophosphate, or phosphoroazolide.

19. The process of claim 1, wherein the activator is diphenyl chlorophosphate (DCP).

20. The process of claim 3, wherein the activator is diphenyl chlorophosphate (DCP).

* * * * *